(12) United States Patent
Momosaki et al.

(10) Patent No.: US 8,019,163 B2
(45) Date of Patent: Sep. 13, 2011

(54) INFORMATION PROCESSING APPARATUS AND METHOD

(75) Inventors: Kohei Momosaki, Kanagawa (JP); Tatsuya Uehara, Tokyo (JP); Kazunori Imoto, Kanagawa (JP); Yasuyuki Masai, Kanagawa (JP); Kazuhiko Abe, Kanagawa (JP); Manabu Nagao, Tokyo (JP); Munehiko Sasajima, Osaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1110 days.

(21) Appl. No.: 11/391,389

(22) Filed: Mar. 29, 2006

(65) Prior Publication Data

US 2006/0239130 A1 Oct. 26, 2006

(30) Foreign Application Priority Data

Mar. 30, 2005 (JP) ................................. 2005-100176
Mar. 3, 2006 (JP) ................................. 2006-058751

(51) Int. Cl.
*H04B 1/20* (2006.01)
(52) U.S. Cl. ............................................ 382/212; 369/1
(58) Field of Classification Search .................. 380/200, 380/30; 386/96, 1, 8, 7, 6, 39, 54; 726/31, 726/24, 30; 709/12, 14
See application file for complete search history.

(56) References Cited

U.S. PATENT DOCUMENTS

| 6,772,125 | B2 * | 8/2004 | Harradine et al. | ............. | 704/278 |
| 7,280,738 | B2 * | 10/2007 | Kauffman et al. | ............. | 386/52 |
| 2003/0175014 | A1 * | 9/2003 | Mori et al. | ............. | 386/94 |
| 2005/0122863 | A1 * | 6/2005 | Kudo | ............. | 369/47.23 |
| 2006/0158979 | A1 * | 7/2006 | Nakamura et al. | ............. | 369/47.1 |
| 2007/0274165 | A1 * | 11/2007 | Tanaka et al. | ............. | 369/30.25 |

FOREIGN PATENT DOCUMENTS

| JP | 8-249343 | 9/1996 |
| JP | 2000-312343 | 11/2000 |
| JP | 2003-36653 | 2/2003 |

OTHER PUBLICATIONS

U.S. Appl. No. 11/232,973, filed Sep. 23, 2005, Taishi Shimomori, et al.
U.S. Appl. No. 11/391,365, filed Mar. 29, 2006, Momosaki et al.
U.S. Appl. No. 11/390,395, filed Mar. 28, 2006, Imoto et al.
U.S. Appl. No. 11/390,394, filed Mar. 28, 2006, Abe et al.
U.S. Appl. No. 11/846,025, filed Aug. 28, 2007, Momosaki et al.

* cited by examiner

*Primary Examiner* — Vivek Srivastava
*Assistant Examiner* — Nega Woldemariam
(74) *Attorney, Agent, or Firm* — Oblon, Spivak, McClelland, Maier & Neustadt, L.L.P.

(57) ABSTRACT

An information processing apparatus is provided in which with respect to video/audio data to be recorded and stored, the determination of division and a control point suitable for viewing and listening and the giving of relevant information can be performed without requiring a manual operation each time. The information processing apparatus includes a recording medium 90, a video data acquisition unit 48, a video data specification unit 47, an audio data separation unit 25, a key creation unit 31, a key relevant data acquisition unit 55, and a key data management unit 10. When a key is created while specifying a section in first audio data, a name and attribute information based on a near division point and control point are stored, and when an audio section similar to an audio pattern of the key is detected from second audio data, in accordance with the stored attribute information, a division point and a control point are determined on the basis of starting and terminal ends of the detected section, and the stored name or a name given in accordance with a naming method is set for the divided section, the control point or the whole audio data.

22 Claims, 47 Drawing Sheets

FIG. 2

| | KEY NAME | TITLE NAME | ATTRIBUTE | CHECK METHOD | PARAMETER |
|---|---|---|---|---|---|
| A | FORTUNETELLING CORNER | MORNING INFORMATION TELEVISION | BGM-1 | FORWARD MATCH | BGM |
| B | OPENING | NIGHT DRAMA SERIES | OPM-1 | COMPLETE MATCH | CLM |
| C | SPORTS CORNER | NEWS AT TEN | CNM-1 | COMPLETE MATCH | RBM |
| D | SWIMMING START SOUND | (NO) | SGE-1 | FORWARD MATCH | RBS |

FIG. 3

| ATTRIBUTE | STARTING END | SECTION | TERMINAL END | TITLE |
|---|---|---|---|---|
| BGM-1 | | MARK: (KEY)[-#] | | |
| OPM-1 | CHAPTER: "OP"-# | | CHAPTER: "MAIN PART"-# | |
| CNM-1 | CHAPTER: (KEY)[-#] | | | |
| SGE-1 | -2s/MARK: (KEY)-# | | | |

FIG.11

|   | KEY NAME | TITLE NAME | ATTRIBUTE | CHECK METHOD | PARAMETER |
|---|---|---|---|---|---|
| E | ROAD CONGESTION INFORMATION | ROAD INFORMATION RADIO | BGM-2 | FORWARD MATCH | BGM |
| F | ENDING | TALK PROGRAM OF MR. X | EDM-2 | BACKWARD MATCH | RBM |
| G | CALTURE CORNER | TRAVEL BONVERSATION | CNM-2 | COMPLETE MATCH | CLM |
| H | METAL BAT SOUND | (NO) | AGE-2 | FORWARD MATCH | RBS |
| J1 | SONG TITLE A" | (NO) | BOM-2 | FORWARD MATCH | CLM |
| J2 | SONG TITLE A" END | (NO) | EOM-2 | BACKWARD MATCH | CLM |

F I G. 12

| ATTRIBUTE | STARTING END | SECTION | TARMINAL END | TITLE |
|---|---|---|---|---|
| BGM-2 | | MARK: (KEY)-(%R) | | × |
| EDM-2 | CHAPTER: ED"[-#] | | CHAPTER: | ○ |
| CNM-2 | CHAPTER: (KEY) | | | ○ |
| AGE-2 | -8s/MARK: (KEY)-# | | | × |
| BOM-2 | CHAPTER: (KEY) | | | × |
| EOM-2 | | | CHAPTER | × |

FIG.21A

<ProgramDescription>
<ProgramInformationTable>
<ProgramInformation programId="Prg1">
<BasicDescription>
<Title> MORNING INFORMATION TELEVISION </Title>
<Synopsis> FULL OF INFORMATION ! MORNING INFORMATION TELEVISION </Synopsis>
<Genre> NEWS・REPORT </Genre>
<Duration>6480000</Duration>
</BasicDescription>
</ProgramInformation>
</ProgramInformationTable>
<SegmentInformationTable>
<SegmentList>
<SegmentInformation segmentId="Seg1">
<Description>
<Title> FORTUNETELLING CORNER-1</Title>
<Synopsis> ANXIOUS TODAY'S FORTUNE </Synopsis>
<Genre> INTEREST </Genre>
<Keyword> HOROSCOPE </Keyword>
</Description>
<SegmentLocator>
<MediaRelIncrTimePoint>3480000</MediaRelIncrTimePoint>
<MediaIncrDuration>120000</MediaIncrDuration>

FIG. 21B

```
</SegmentLocator>
</SegmentInformation>
<SegmentInformation segmentId="Seg2">
<Description>
<Title> FORTUNETELLING CORNER-2</Title>
<Synopsis> ANXIOUS TODAY'S FORTUNE </Synopsis>
<Genre> INTEREST </Genre>
<Keyword> HOROSCOPE </Keyword>
</Description>
<SegmentLocator>
<MediaRelIncrTimePoint>6660000</MediaRelIncrTimePoint>
<MediaIncrDuration>1800000</MediaIncrDuration>
</SegmentLocator>
</SegmentInformation>
</SegmentList>
<SegmentGroupList>
<SegmentGroupInformation groupId="Grp1">
<Description>
<Title>FORTUNETELLING CORNER</Title>
</Description>
<Segments refList="Seg1 Seg2"/>
</SegmentGroupInformation>
</SegmentGroupList>
</SegmentInformationTable>
</ProgramDescription>
--------
```

FIG. 22A

```
<ProgramDescription>
<ProgramInformationTable>
<ProgramInformation programId="Prg2">
<BasicDescription>
<Title>「NIGHT DRAMA STRIES」OF THIS WEEK</Title>
<Synopsis>「NIGHT DRAMA STRIES」OF THIS WEEK</Synopsis>
<Genre> DRAMA </Genre>
<Duration>6000000</Duration>
</BasicDescription>
<AggregationOf type="omnibus">
<AggregatedProgram>"Prg21 Prg22 Prg23 Prg24 Prg25"</AggregatedProgram>
</AggregationOf>
</ProgramInformation>
</ProgramInformationTable>
<SegmentInformationTable>
<SegmentList>
<SegmentInformation segmentId="SegOp1">
<Description>
<Title> OPENING - 1 </Title>
<Synopsis> OPENING </Synopsis>
</Description>
<SegmentLocator>
<MediaRelIncrTimePoint>30000</MediaRelIncrTimePoint>
<MediaIncrDuration>70000</MediaIncrDuration>
</SegmentLocator>
</SegmentInformation>
<SegmentInformation segmentId="SegMc1">
<Description>
<Title> MAIN PART-1 </Title>
<Synopsis>MAIN PART </Synopsis>
```

FIG. 22B

```
</Description>
<SegmentLocator>
<MediaRelIncrTimePoint>100000</MediaRelIncrTimePoint>
<MediaIncrDuration>1115000</MediaIncrDuration>
</SegmentLocator>
</SegmentInformation>
<SegmentInformation segmentId="SegOp2">
<Description>
<Title> OPENING - 2 </Title>
<Synopsis> OPENING </Synopsis>
</Description>
<SegmentLocator>
<MediaRelIncrTimePoint>1215000</MediaRelIncrTimePoint>
<MediaIncrDuration>70000</MediaIncrDuration>
</SegmentLocator>
</SegmentInformation>
<SegmentInformation segmentId="SegMc2">
<Description>
<Title> MAIN PART -2 </Title>
<Synopsis> MAIN PART </Synopsis>
</Description>
<SegmentLocator>
<MediaRelIncrTimePoint>1285000</MediaRelIncrTimePoint>
<MediaIncrDuration>1115000</MediaIncrDuration>
</SegmentLocator>
</SegmentInformation>
</SegmentList>
</SegmentInformationTable>
</ProgramDescription>
---------
```

FIG. 51
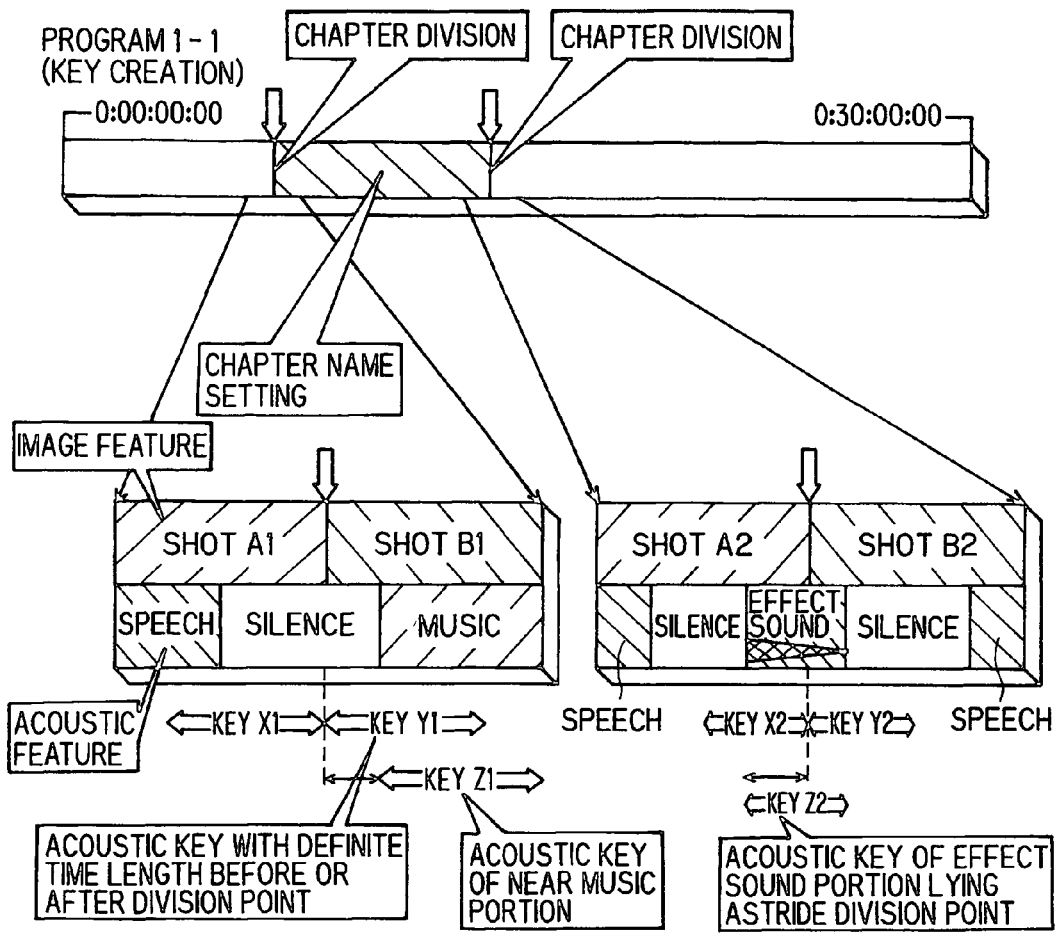
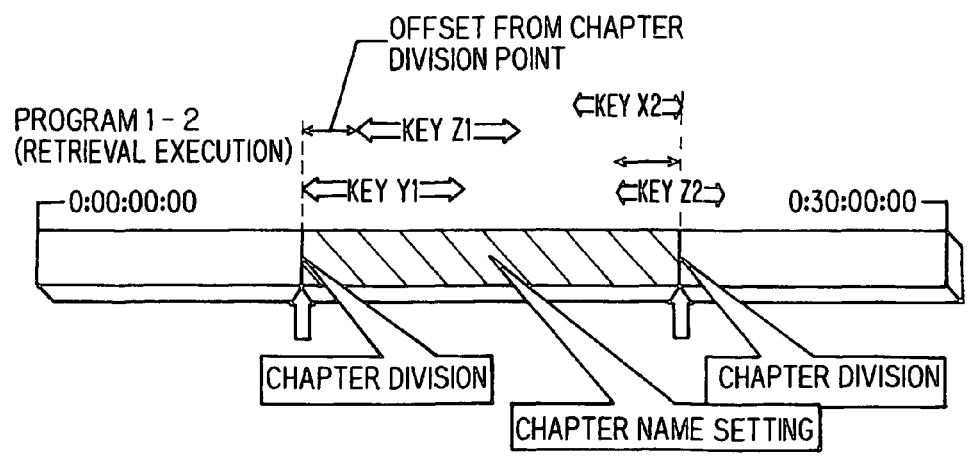

INFORMATION PROCESSING APPARATUS AND METHOD

CROSS-REFERENCE TO RELATED APPLICATIONS

This application is based upon and claims the benefit of priority from the prior Japanese Patent Application No. 2005-100176, filed on Mar. 30, 2005 and No. 2006-58751, filed on Mar. 3, 2006; the entire contents of which are incorporated herein by reference.

TECHNICAL FIELD

The present invention relates to an information processing apparatus for performing a processing of video/audio or audio recording, and an information processing method.

BACKGROUND OF THE INVENTION

In recent years, the dominating equipment for recording audio and video is shifted from a conventional analog magnetic tape to a digital magnetic disk, semiconductor memory or the like. Especially in a video recording and reproducing equipment using a large capacity hard disk, the recordable capacity is remarkably increased. When such an equipment is used, videos of many programs provided by broadcast or communication are stored, and the user can freely select and view them.

Here, in the management of the stored videos, files are formed using titles (programs) as units of programs or the like, names and other information are given, and when they are listed, typical images (thumbnails), names and the like are arranged and can be displayed. Besides, one program (title) is divided into units called chapters (segments), and reproduction and editing can also be performed in chapter units. When chapter names are given, and typical images (thumbnails) of chapters are displayed, a chapter including a favorite scene can be selected and reproduced from a chapter list, or selected chapters can be arranged to create a play list or the like. As regulations on management methods of these, there is a VR (Video Recording) mode of DVD (Digital Versatile Disc).

Incidentally, a marker used for specification of a section and a position in a program (title) includes reproduction time information corresponding to a time position at a time when video and audio content is reproduced, and in addition to a chapter marker expressing a chapter division point, according to a device, there is also a case where an edit marker to specify an object section at an editing operation, or an index marker to specify a point of jump destination at a cue operation is used. Incidentally, the [marker] in the present specification is also used in the above meaning.

With respect to a program name, when program information provided by EPG (Electronic Program Guide) and the like is used, it can be automatically given to a recorded and stored file. With respect to the program information provided by the EPG, there is ARIB (Association of Radio Industries and Businesses) standard (STD-B10).

However, with respect to the inside of one program, although various contrivances, such as information to give a division time position and a name to enable easy identification of each of divided parts, are conceivable as metadata useful in supporting viewing, editing and the like and in performing automation, these are hardly general-purposely provided from the outside. Thus, in an equipment for a general viewer, it is necessary for an apparatus side to create metadata based on the recorded audio and video.

As a general-purpose description format of metadata relating to video and audio content, there is MPEG-7, and there is a method in which metadata is made to correspond to content and is stored in XML (extensible Markup Language) database. Besides, with respect to a transmission system of metadata in broadcasting, there is ARIB (Association of Radio Industries and Businesses) standard (STD-B38), and the metadata can also be recorded in accordance with these.

As what is automatically performed by an apparatus, there is also a case in which a chapter division function by detection of a silent portion, switching (cut) of video, switching of audio-multiplex mode (mono, stereo, dual mono for bilingual broadcast) is provided (see, for example, patent document 1 (JP-A-2003-36653)). However, the division is not necessarily suitably performed, and the user must considerably perform manual operation including the giving of a significance to each of the divided chapters and the giving of a name.

Besides, with respect to metadata creation of automatic keyword extraction or the like using language information obtained by telop image recognition and speech recognition, the use in full-text retrieval becomes possible (see, for example, patent document 2 (JP-A-8-249343)). However, with respect to the portions such as the chapter division and the giving of a name, the whole application is difficult under the present circumstances.

On the other hand, although methods of acoustic retrieval or audio robust matching to retrieve the coincidence or similarity of sounds have been conceived, most of them are used in such a form that a music or the like whose viewing and listening is desired is retrieved and reproduced, and the structure is not suitable for metadata creation of video (see, for example, patent document 3 (JP-A-2000-312343)).

As stated above, in the related art, in the management of a large amount of stored video, especially in the division of one program, there has been a problem that it is impossible to easily perform the division suitable for viewing and listening, the determination of control points and the giving of relevant information.

Then, the present invention has been made in view of the above circumstances, and has an object to provide a data processing apparatus in which with respect to video to be recorded and stored, division suitable for viewing and listening, the determination of control points, and the giving of relevant information can be performed without requiring a manual operation each time.

BRIEF SUMMARY OF THE INVENTION

According to an aspect of the invention, in an information processing apparatus for creating support data to support a user so that when the user reproduces, edits or retrieves use object data including video/audio data or only audio data, the user can perform reproduction, editing or retrieval in a desired operation, the information processing apparatus includes a key audio data acquisition unit configured to acquire key audio data for creating the support data, a key specification information input unit configured to input key specification information for specifying a whole or partial section of the key audio data, a key creation unit configured to create audio pattern data as a retrieval key by cutting the whole or partial section of the key audio data based on the key specification information, a key relevant data acquisition unit configured to acquire key relevant data relevant to the key audio data based on the key specification information, and a support data creation unit configured to create the support data by matching key data including the audio pattern data and the key relevant data against the use object data.

Besides, according to another aspect of the invention, in an information processing apparatus for creating support data to support a user so that when the user reproduces, edits or retrieves use object data including video/audio data or only audio data, the user can perform reproduction, editing or retrieval in a desired operation, the information processing apparatus includes a first support data input unit configured to input first support data relevant to first use object data, a key audio data acquisition unit configured to acquire key audio data relevant to the first support data, a key specification information creation unit configured to create key specification information to select a partial section of the key audio data based on the inputted first support data, a key creation unit configured to create audio pattern data as a retrieval key by cutting the partial section of the key audio data based on the key specification information, a key relevant data acquisition unit configured to acquire key relevant data relevant to the key audio data based on the key specification information, and a second support data creation unit configured to create second support data by matching key data including the audio pattern data and the key relevant data against the use object data.

Further, according to still another aspect of the invention, in an information processing apparatus for creating support data to support a user so that when the user reproduces, edits or retrieves use object data including video/audio data or only audio data, the user can perform reproduction, editing or retrieval in a desired operation, the information processing apparatus includes a key audio data acquisition unit configured to acquire key audio data for creating first support data, a first support data creation unit configured to detect a change point of the key audio data and to create the first support data, a key specification information creation unit configured to create key specification information to select a partial section of the key audio data based on the created first support data, a key creation unit configured to create audio pattern data as a retrieval key by cutting the partial section of the key audio data based on the key specification information, a key relevant data acquisition unit configured to acquire key relevant data relevant to the key audio data based on the key specification information, and a second support data creation unit configured to create second support data by matching key data including the audio pattern data and the key relevant data against the use object data.

According to embodiments of the invention, when a section in the key audio data is specified to cut audio, and the cut audio data or feature-extracted audio pattern data is made the retrieval key, an attribute based on information of the existence of a division point and a control point in the vicinity of the specified section, names given to those, and others is also held.

Besides, according to embodiments of the invention, when the division point and the control point of the use object audio data are set, the section in the vicinity thereof is cut as the key audio data, and the cut audio data or the feature-extracted audio pattern data is made the retrieval key, and the attribute based on the division point and the control point, the names given to those and the other information, together with the retrieval key, is held.

Next, a section similar to the retrieval key is detected from the use object audio data, the division point and the control point are determined in accordance with the attribute held by the retrieval key and on the basis of one of or both of the starting and terminal ends of the detected (audio) section in the use object audio data, and a previously specified name or a name given in accordance with a previously specified naming method is set for a forward or backward (audio) section of the division, the control point or the whole use object audio data.

Accordingly, according to embodiments of the invention, a specific pattern audio appearing every time, such as corner title music, is made a key, and it is possible to perform reproduction from its head, to skip the title music and to perform reproduction from the main part of the corner, to give a chapter name to the time point or the divided chapter, and to give the program name including this corner.

BRIEF DESCRIPTION OF THE DRAWINGS

FIG. 2 is a table showing an example of information, together with retrieval keys, managed in a key data management unit 10 of the first embodiment.

FIG. 3 is a table showing an example of operations made to correspond to attributes and regulated in the first embodiment.

FIG. 11 is a table showing an example of information, together with retrieval keys, managed in a key data management unit 10 of the second embodiment.

FIG. 12 is a table showing an example of operations made to correspond to attributes and regulated in the second embodiment.

FIG. 21 is a view showing an example of metadata recorded on a recording medium by a matching result recording instruction unit when a retrieval key A is detected in a key matching unit.

FIG. 22 is a view showing an example of metadata recorded on a recording medium by the matching result recording instruction unit when a retrieval key B is detected in the key matching unit.

FIG. 51 is a view for explaining an example of a case where a chapter (chapter division and chapter name setting) is treated as support data in the fourteenth embodiment.

DETAILED DESCRIPTION OF THE INVENTION

Hereinafter, embodiments of the invention will be described with reference to the drawings.

First Embodiment

A video/audio processing apparatus according to a first embodiment of the invention will be described with reference to FIGS. 1 to 9. In a case where metadata is created which is support data to support a user so that when the user reproduces, edits or retrieves video/audio data, the reproduction, editing or retrieval can be performed in an operation desired by the user, the video/audio processing apparatus of the embodiment is an apparatus for creating key data, as the origin of the metadata, including retrieval keys and key relevant data.

(1) Structure of the Video/Audio Processing Apparatus

Figure 1:
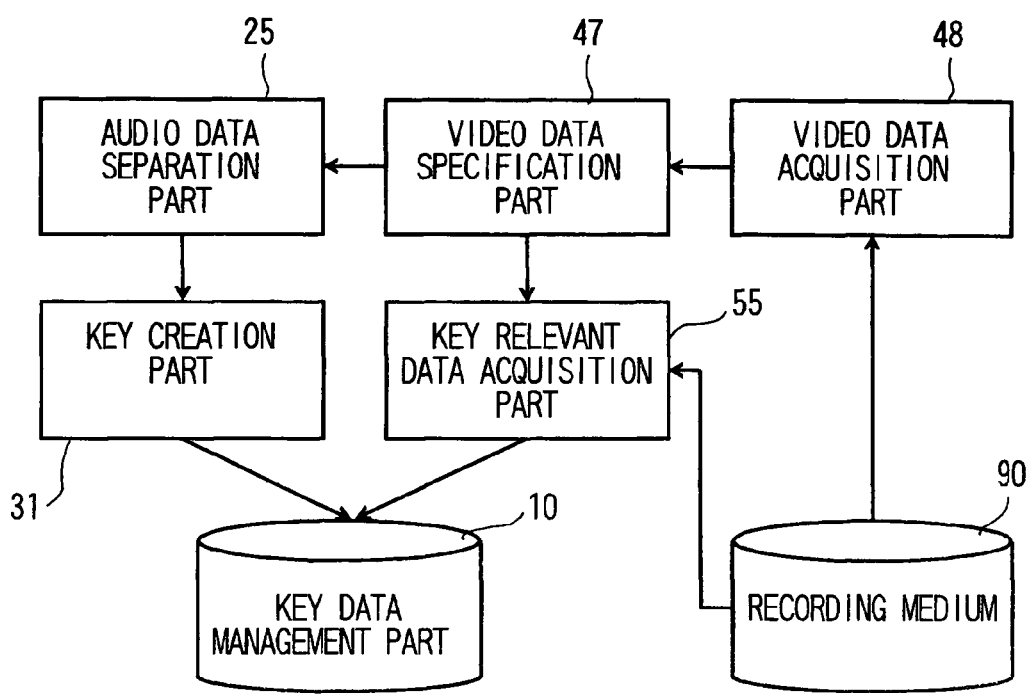
FIG. 1 is a block diagram showing a structure of a first embodiment of a video/audio processing apparatus of the invention.

FIG. 1 shows a structure of the video/audio processing apparatus of the embodiment.

The video/audio processing apparatus shown in FIG. 1 includes a recording medium 90, a video data acquisition unit 48, a video data specification unit 47, an audio data separation unit 25, a key creation unit 31, a key relevant data acquisition unit 55 and a key data management unit 10.

The video/audio data or video/audio signals are previously recorded on the recording medium 90. Besides, information for division into units, such as titles or chapters of video and audio, and information relating to their names, attributes and the like are recorded on the recording medium 90.

The video data acquisition unit 48 reads and acquires video/audio data recorded on the recording medium 90, and delivers it to the video data specification unit 47. Besides, an analog video/audio signal is read and acquired, and is converted into digital video/audio data, and then, it may be delivered to the video data specification unit 47. Incidentally, in addition to these processings, as the need arises, a decryption processing of the video/audio data (for example, B-CAS: BS Conditional Access System), a decode processing (for example, MPEG2), a format conversion processing (for example, TS/PS), a rate (compression rate) conversion processing and the like may be performed.

The video data specification unit 47 specifies a whole or partial section of the video/audio data acquired in the video data acquisition unit 48. In the case where the specified section is acquired by the operation of the user, for example, it is conceivable to use a device such as a mouse or a remote control, however, another method may be used. The video/audio data is reproduced and displayed, and the user may specify the positions of the starting and terminal ends while confirming the video/audio data. Besides, a chapter is selected from a thumbnail image list of chapters, and the whole chapter may be regarded as a specified section.

The audio data separation unit 25 separates the audio data from the video/audio data specified in the video data specification unit 47, and delivers it to the key creation unit 31. For example, the audio data separation unit 25 performs Demux of MPEG2 data, extracts MPEG2 Audio ES including audio data and decodes it (AAC or the like).

The key creation unit 31 creates audio pattern data, which is used in a key matching unit 30 of after-described third to sixth embodiments respectively, based on the audio data delivered from the audio data separation unit 25. Here, the audio pattern data held as the retrieval key may be, for example, reproducible audio data, or what is obtained by feature-extracting the audio data and by parameterizing it.

The key relevant data acquisition unit 55 extracts key relevant data, which is information relevant to the section of the video/audio data specified in the video data specification unit 47, from the recording medium 90.

For example, when there is a title name corresponding to the specified video/audio data or a chapter name corresponding to the specified section, the information is extracted. In the case where a section corresponding to a previous retrieval result is specified, and the key relevant data of the retrieval data is held, key relevant data as shown in FIG. 2 is extracted. Besides, the key relevant data may be externally inputted.

Further, even if there is no direct correspondence to the specified section, when an adjacent chapter or marker is retrieved and found, the information is extracted, and information is given by the positional relation between the specified section and the chapter or marker.

The key data management unit 10 manages, as retrieval keys, plural audio pattern data generated in the key creation unit 31. Besides, with respect to the respective retrieval keys, key relevant data, such as relevant names and attributes, acquired in the key relevant data acquisition unit 55 can be added and managed.

In the present specification, [matching] means that use object data (video/audio data or audio data) and the audio pattern data as the retrieval key are compared with each other, and it is detected which position or section in the user object data corresponds to the audio pattern data. This matching is performed by the key matching unit 30 in the third to sixth embodiments.

In the present specification, [addition] means that the audio pattern data as the retrieval key is related with the key relevant data of the attribute information or the like. This addition is performed by the key data management unit 10.

(2) Information Managed in the Key Data Management Unit 10

FIG. 2 shows an example of information, together with audio pattern data A to D of the retrieval keys created as the processing results, managed in the key data management unit 10. Here, a key name, a title name, an attribute, a matching method, and a parameter are managed. Hereinafter, these data will be called as key relevant data.

With respect to the retrieval key A, information of [fortunetelling corner], [morning information television], [BGM attribute 1 (BGM-1)], [forward match], and [BGM] is managed.

With respect to the retrieval key B, information of [opening], [night drama series], [opening music attribute 1 (OPM-1)], [complete match], and [clean music (CLM)] is managed.

With respect to the retrieval key C, information of [sports corner], [news at ten], [corner music attribute 1 (CNM-1)], [complete match], and [robust music (RBM)] is managed.

With respect to the retrieval key D, information of [swimming start sound], [(nothing)], [competition event start attribute 1 (SGE-1)], Forward match], and [robust effective sound (RBS)] is managed.

FIG. 3 shows an example of recording instruction operations made to correspond to the attributes in FIG. 2 and regulated. Incidentally, this attribute is used, in the third to sixth embodiments, for a recording instruction operation in a matching result recording instruction unit 35 based on a detection result of the key matching unit 30.

The [BGM attribute 1 (BGM-1)] is an attribute added to the retrieval key for a recording instruction operation in which the whole detected section is made a marker section as it is, and the name of the section is set as [(name of key)] (when plural sections are detected, [(name of key)-number]) Incidentally, [#] in FIG. 3 denotes a number.

The [opening music attribute 1 (OPM-1)] is an attribute added to the retrieval key for a recording instruction operation in which a chapter division is made at the starting end and the terminal end of the detected section, the name of a chapter sandwiched between the starting and terminal ends is set as [[opening]-number], the name of a backward chapter divided at the terminal end is set as [[main part]-number], and in case the title name has not been set, [name of title] related to the key is set as the title name.

The [corner music attribute 1 (CNM-1)] is an attribute added to the retrieval key for a recording instruction operation in which a chapter division is made at the starting end of a detected section, the name of a divided backward chapter is set as [(name of key)] (plural sections are detected, [(name of key)-number]), and in case the title name has not been set, [name of title] related to the key is set as the title name.

The [competition start event attribute 1 (SGE-1)] is an attribute added to the retrieval key for a recording instruction operation in which a point two seconds before the starting end of the detected section is made a marker point, and the name of the marker is set as [(name of key)-number].

(3) Addition of Attribute Information to the Retrieval Key A

With reference to a schematic view of FIG. 4, a description will be given as to how an attribute is added when a portion of video/audio data recorded on the recording medium 90 is specified in order to create the retrieval key A (audio pattern data A). Incidentally, this attribute is information inputted from the key relevant data acquisition unit 55. How to acquire this attribute will be described later in detail based on the processing of the key relevant data acquisition unit 55.

Figure 4:
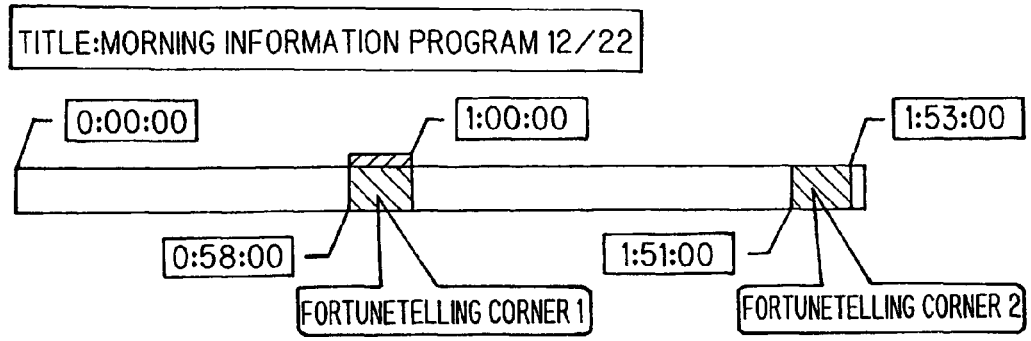
FIG. 4 is a schematic view showing an example in which [BGM attribute 1] or attribute information corresponding thereto is set in a key relevant data acquisition unit 55 of the first embodiment.

An oblique line portion in a band shown in FIG. 4 indicates a section in which a marker is recorded, a balloon indicates the name of the marker, and a dense mark adjacent on the band indicates a section specified to create the retrieval key A.

In the case where the key is created by specifying the maker [fortunetelling corner-1] portion in the title [morning information television 12/22] in which the [morning information television] program (one hour and 54 minutes) broadcast on December 22 is recorded, the coincidence between the key specification portion and the marker portion is judged, and based on the name of the marker and the like, the operation at the time of detection is added as the attribute information of the retrieval key A.

For example, the program name [morning information television] is obtained from [morning information television 12/22], the key name [fortunetelling corner] is obtained from [fortunetelling corner-1] respectively, and the attribute is added by which the whole detected section is made the marker section as it is, and the name of the section is made [[fortunetelling corner]-number] is added.

Besides, the starting and terminal ends of the marker [fortunetelling corner-1] and the starting and terminal ends of the key specification portion are compared with each other, and in the case where only the starting ends are substantially the same points, and the terminal ends are different points, the matching method is set as [forward match].

Incidentally, setting may be made as [BGM attribute 1 (BGM-1)] including these as regulated operations.

(4) Addition of Attribute Information to the Retrieval Key B

With reference to a schematic view of FIG. 5, a description will be given as to how an attribute is added when a portion in the video/audio data recorded on the recording medium 90 is specified in order to create the retrieval key B (audio pattern data B). Incidentally, this attribute is information inputted from the key relevant data acquisition unit 55. How to acquire this attribute will be described later in detail based on the processing of the key relevant data acquisition unit 55.

Figure 5:
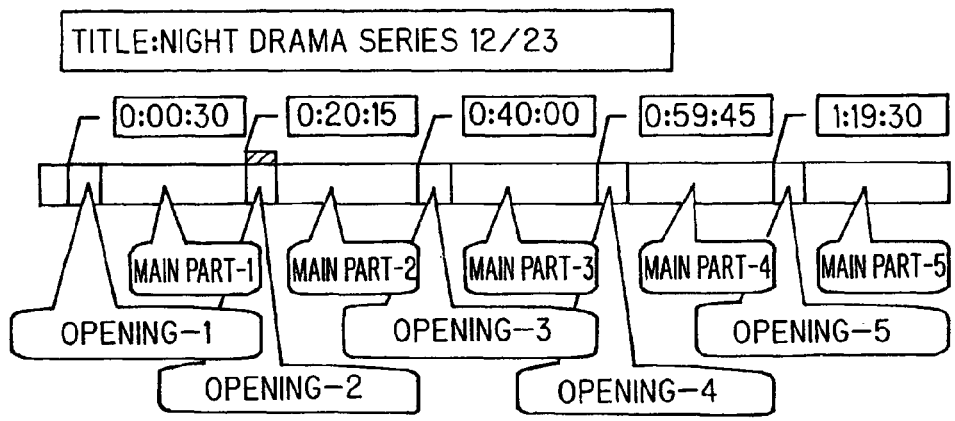
FIG. 5 is a schematic view showing an example in which [opening music attribute 1] or attribute information corresponding thereto is set in the key relevant data acquisition unit 55 of the first embodiment.

A vertical line in a band shown in FIG. 5 indicates a point where a chapter division is made, a balloon indicates a chapter name, and a dense mark adjacent on the band indicates a portion specified to create the retrieval key B.

In the case where the key is created by selecting the chapter [opening-2] in the title [night drama series 12/23] in which the five-story series rebroadcast (one hour and 40 minutes) of [night drama series] broadcast on December 23 is recorded, based on the specified chapter [opening-2], the name of the adjacent chapter [main part-2] having the same suffix [-2] and the like, the operation at the time of detection is added as the attribute information of the retrieval key B.

For example, the program name [night drama series] is obtained from [night drama series 12/23], the key name [opening] is obtained from [opening-2] respectively, a chapter division is made at the starting and terminal ends of the detected section, and the attribute is added by which the name of the chapter sandwiched between the starting and terminal ends is made [[opening]-number], and the name of a backward chapter, when the division is made at the terminal end, is made [[main part]-number].

Incidentally, setting may be made as [opening music attribute-1 (OPM-1)] including these as the regulated operation.

Besides, the information of genre [drama], storage destination medium [HDD], storage destination folder [my drama], final storage rate (compression rate) [low] and the like, which are set in the title name [night drama series 12/23], are set together, and at the time of recording the title in which the retrieval key B is detected, instead of the title name, or in addition to the title name, the genre [drama] may be set, the storage destination disk may be made [my drama] folder of the HDD, or the storage may be made after the quality is lowered to [low] rate in accordance with the final storage rate.

Further, in the case where there is a play list [night drama series-main part] in which chapters [main part] of the program [night drama series] are collected, a new chapter [[main part]-number] is added to the play list [night drama series-main part], and the chapter name on the play list may be made [12/23 broadcast-number].

In case the start of the opening music is such that the sound gradually becomes large (fade-in), the starting end of the retrieval key is shifted back, and a stable section may be specified as a retrieval key. Also in that case, since the positional relation between the key section and the chapter is considered, the chapter division in the detected section is normally made irrespective of the time in which the starting end is shifted.

(5) Addition of Attribute Information to the Retrieval Key C

With reference to a schematic view of FIG. 6, a description will be given as to how an attribute is added when a portion in the video/audio data recorded on the recording medium 90 is specified in order to create the retrieval key C (audio pattern data C). Incidentally, this attribute is information inputted from the key relevant data acquisition unit 55. How to acquire this attribute will be described later in detail based on the processing of the key relevant data acquisition unit 55.

Figure 6:
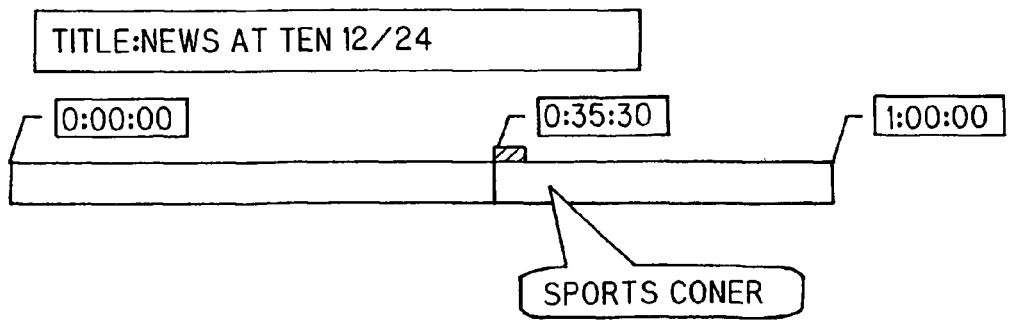
FIG. 6 is a schematic view showing an example in which [corner music attribute 1] or attribute information corresponding thereto is set in the key relevant data acquisition unit 55 of the first embodiment.

A vertical line in a band shown in FIG. 6 indicates a point where a chapter division is made, a balloon indicates a chapter name, and a dense mark adjacent on the band indicates a portion specified to create the retrieval key C.

In the case where the key is created by selecting the first corner music portion of the chapter [sports corner] in the title [news at ten 12/24] in which [news at ten] (60 minutes) broadcast on December 24 is recorded, by using that the starting end of the specified section is adjacent to the starting end of the chapter [sports corner], the operation at the time of detection is added as the attribute information of the retrieval key C.

For example, a chapter division is made at the starting end of the detected section, and the attribute is added by which the backward chapter name is made [sports corner], and the title name is made [news at ten]. Setting may be made as [corner music attribute 1 (CNM-1)] including these as the regulated operation.

(6) Addition of Attribute Information to the Retrieval Key D

With reference to a schematic view of FIG. 7, a description will be given as to how an attribute is added when a portion in the video/audio data recorded on the recording medium 90 is specified in order to create the retrieval key D (audio pattern data D). Incidentally, this attribute is information inputted from the key relevant data acquisition unit 55. How to acquire this attribute will be described later in detail based on the processing of the key relevant data acquisition unit 55.

Figure 7:
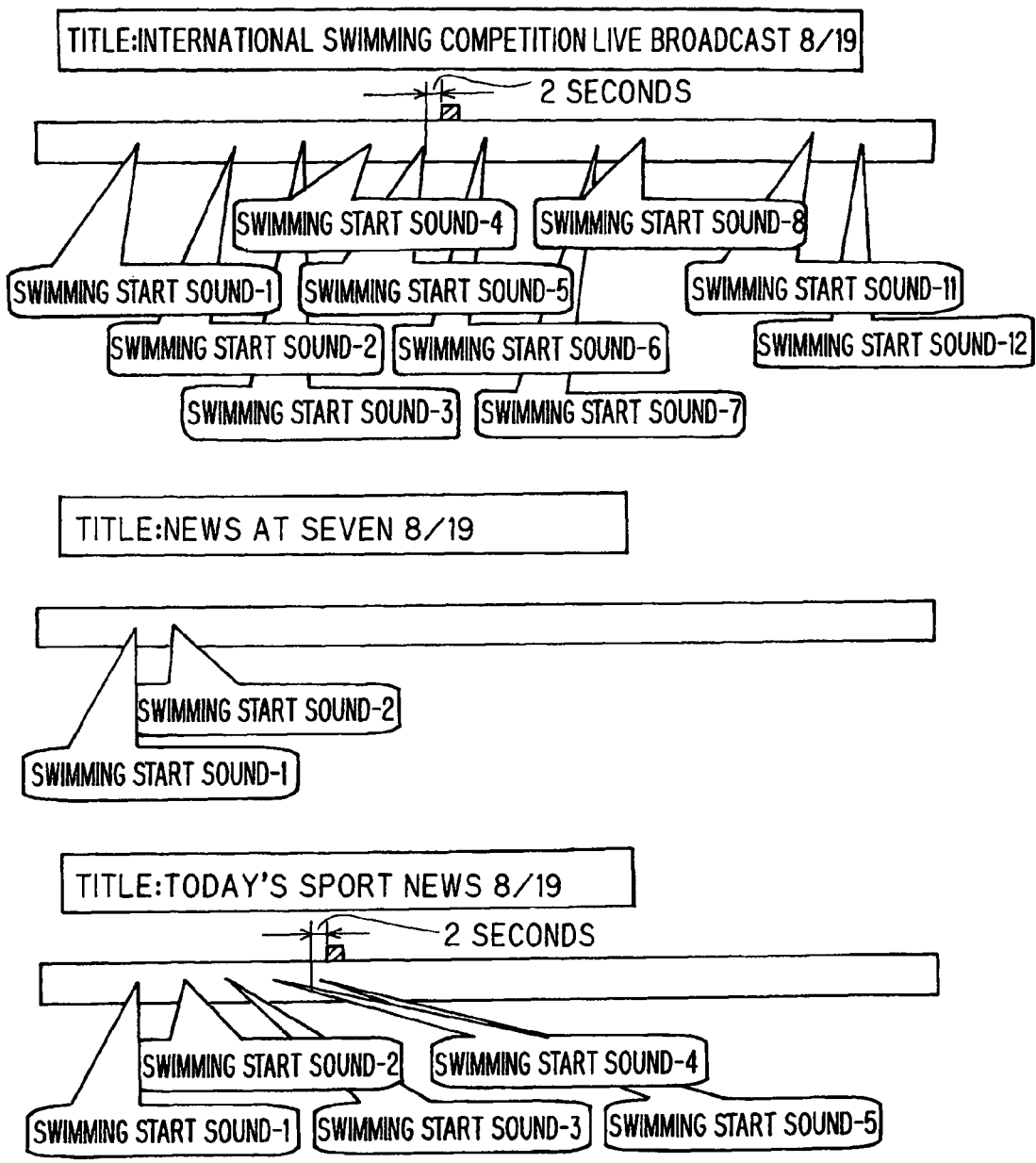
FIG. 7 is a schematic view showing an example in which [competition start event attribute 1] or attribute information corresponding thereto is set in the key relevant data acquisition unit 55 of the first embodiment.

A balloon in a band shown in FIG. 7 indicates a marker point and its name, and a dense mark on the band indicates a portion specified to create the retrieval key D.

In the case where a key is created by specifying portions of start sounds of swimming in the title [international swimming competition live broadcast 08/19] in which [international swimming competition live] broadcast on August 19 is recorded, [news at seven 08/19], and [today's sports news 08/19], by using that the marker [swimming start sound-5] exists two seconds before the starting end of the specified section, the operation at the time of detection is added as the attribute information of the retrieval key D.

For example, a point two seconds before the starting end of the detected section is made the marker point, and an attribute by which the name of the marker is made [[swimming start sound]-number] is added.

Besides, with respect to the title name, setting can be made such that it is not given at the time of detection. Setting may be made as [competition start event attribute 1 (SGE-1)] including these as the regulated operation.

(7) Processing at the Key Relevant Data Acquisition Unit 55

Next, a flow of processing in the key relevant data acquisition unit 55 will be described with reference to a flowchart of FIG. 8.

As stated above, the key relevant data acquisition unit 55 extracts key relevant data (chapter name and marker) relevant to the section of the video/audio data specified in the video data specification unit 47 from the recording medium 90, and the extraction processing will be described in sequence.

First, as information relating to the section of the video/audio data specified in the video data specification unit 47, a starting end time Tsb of the specification section and a terminal end time Tse are acquired (step S101).

Next, the information of a chapter boundary existing at the starting end time Tsb and a marker is acquired (step S111). With respect to a first time width t1 regarded as substantially the same time, for example, 200 milliseconds, the vicinity of Tsb is examined. Information acquired with respect to the chapter boundary includes a chapter boundary time Tbc, a forward chapter Cbf of the chapter boundary, a backward chapter Cbl and the like. Information acquired with respect to the marker includes a point marker time Tbm, a starting end time Tbp of a section marker, a point marker Mbm, a section marker Mbp, and the like.

Similarly, the information of the chapter boundary and the marker existing at the terminal end time Tse is acquired (step S112). With respect to the first time width t1 regarded as substantially the same time, the vicinity of Tse is examined. Information acquired with respect to the chapter boundary includes a chapter boundary time Tec, a forward chapter Cef of the chapter boundary, a backward chapter Cel, and the like. Information acquired with respect to the marker includes a point marker time Tem, a starting end time Tep of a sectional marker, a point marker Mem, a section marker Mep, and the like.

At step S111 and step S112, when the information of existing chapters and markers is acquired, among them, a chapter Cc and a section marker Mcp in which both the starting and terminal ends are coincident with the specified section, are acquired (step S113).

Besides, at step S111, in the case where a chapter or a marker existing at the starting end time Tsb is not acquired, with respect to a second time width t2 regarded as being relevant to the specified section, for example, 10 seconds, the vicinity of Tsb is examined (step S121).

At this time, since the backward portion (between Tsb+t1 and Tsb+t2) of Tsb is included in the selected section, priority may be given. Similarly to step S111, information acquired with respect to the chapter boundary includes a chapter boundary time Tbc', a forward chapter Cbf' of the chapter boundary, a backward chapter Cbl' and the like. Information acquired with respect to the marker includes a point marker time Tbm', a starting end time Tbp' of the section marker, a point marker Mbm', a section marker Mbp' and the like.

At step S112, in the case where a chapter existing at the terminal end time Tse and a marker are not acquired, with respect to a second time width t2 regarded as being relevant to the specified section, the vicinity of Tse is examined (step S122). At this time, since the forward portion (between Tse−t2 and Tse−t1) of Tse is included in the selected section, priority may be given. Similarly to step S112, information acquired with respect to the chapter boundary includes a chapter boundary time Tec', a forward chapter Cef' of the chapter boundary, a backward chapter Cel' and the like. Information acquired with respect to the marker includes a point marker time Tem', a starting end time Tep' of the section marker, a point marker Mem', a section marker Mep', and the like.

Incidentally, at step S121 or step S122, in the case where the chapter boundary or the marker is found, reference is made to the history of section specification, and in the case where there is one close to the chapter or the marker found in this specified section, the chapter or the marker may not be adopted (step S123).

Next, based on the information of the chapter and the marker found by the processing from step S111 to step S123, the attribute of the key corresponding to the specified section is set (step S131).

Finally, the set attribute is compared with the existing attribute (step S141), and in the case where the set attribute portion is coincident with the existing attribute, the existing attribute including another attribute is set (step S142), and in the case of inconsistency, the individual attribute is set as it is (step S143).

(8) Attribute Setting Processing of Key

Figure 9:
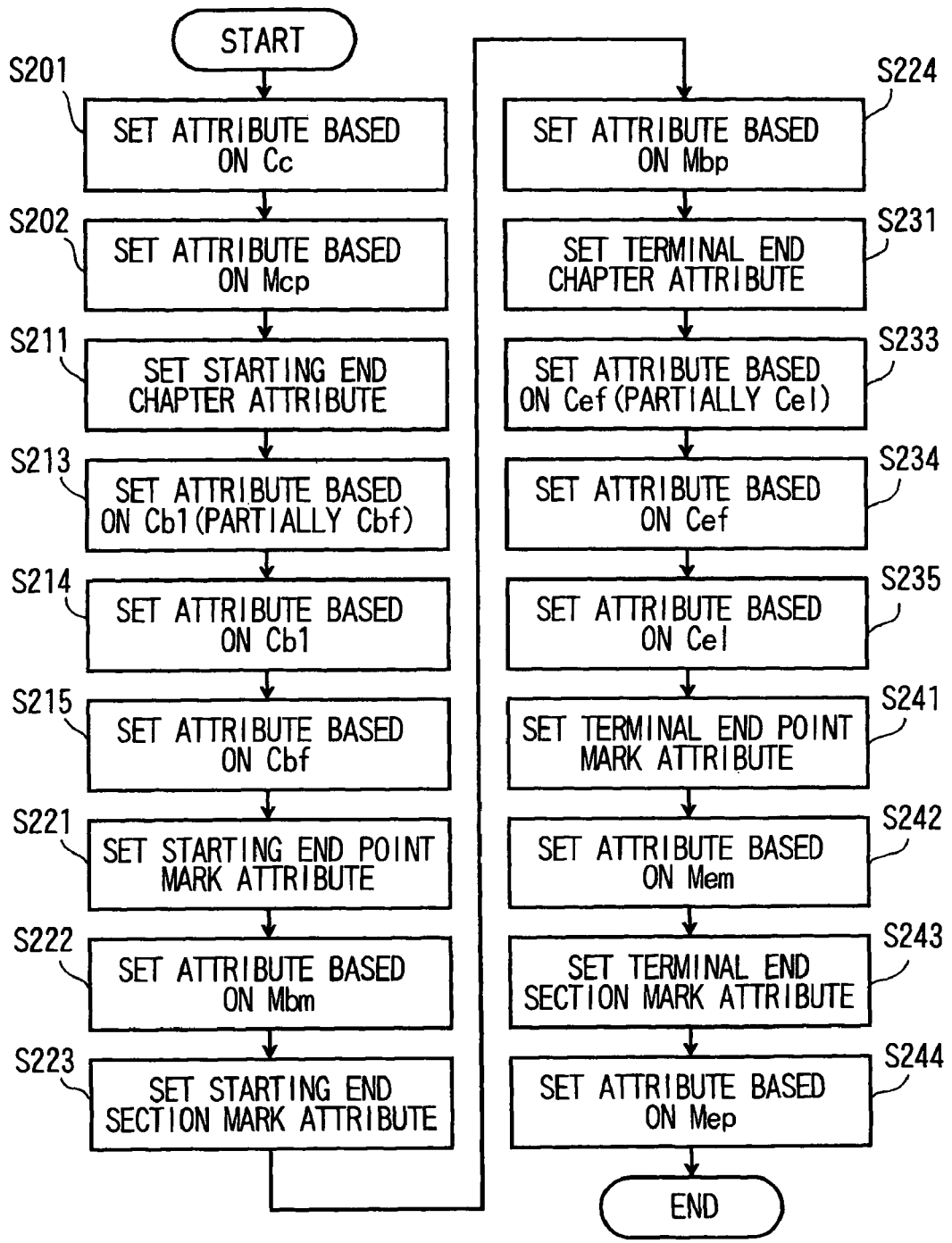
FIG. 9 is a flowchart showing a flow of detailed processing in a key attribute setting processing at step S131 of FIG. 8.

Next, the details of the attribute setting processing of the key at step S131 will be described with reference to a flowchart of FIG. 9.

(8-1) When Chapter Cc Coincident with Starting and Terminal Ends is Acquired

Figure 8:
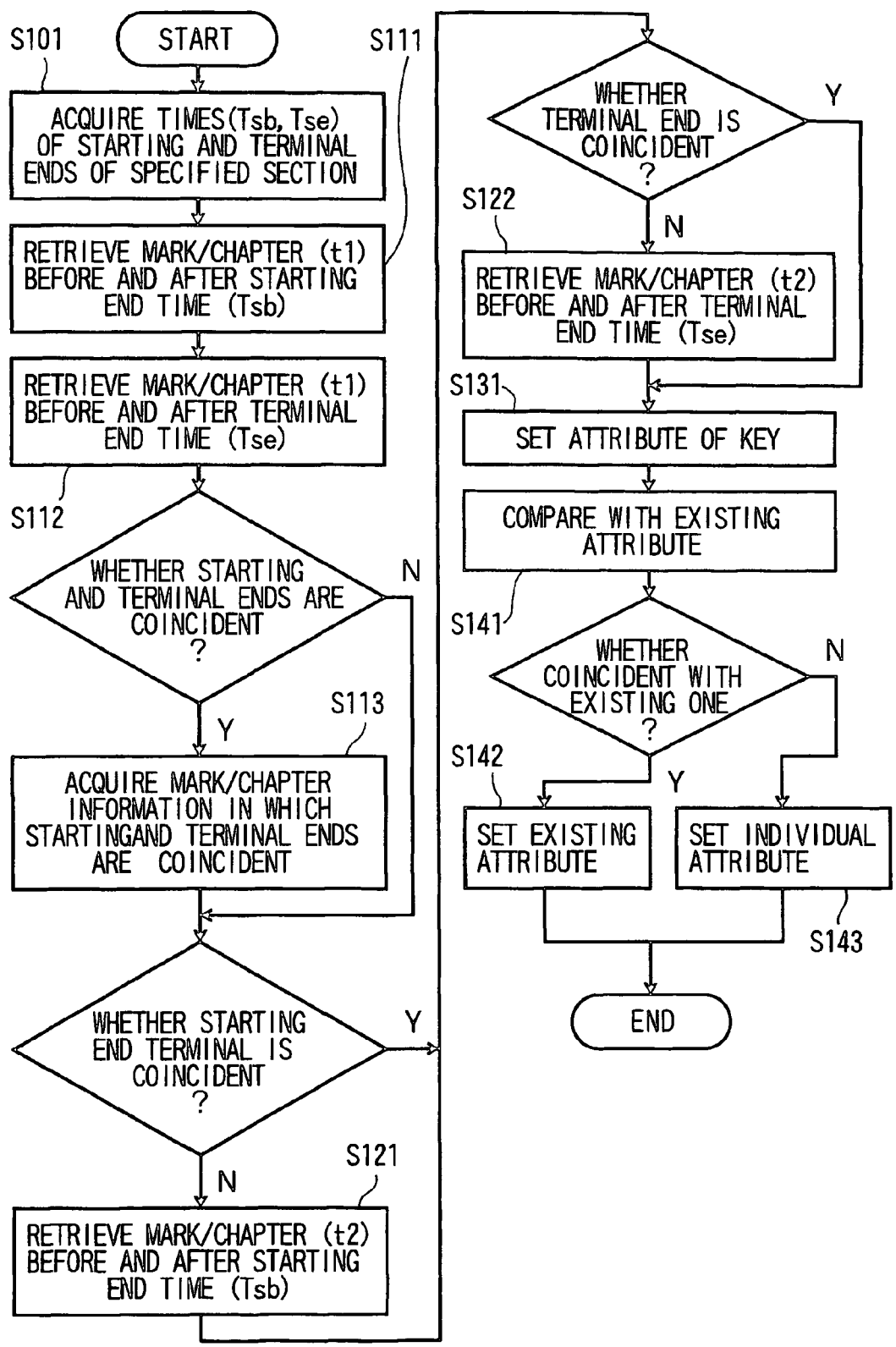
FIG. 8 is a flowchart showing a flow of processing in the key relevant data acquisition unit 55 of the first embodiment.

At step S113 of FIG. 8, when the chapter Cc coincident with the starting and terminal ends is acquired, attributes of key name=base name (chapter name (Cc)), matching method=complete match, operation=chapter, chapter starting end=detected section starting end, chapter terminal end=detected section terminal end, and chapter name=existing name rule (key name) are respectively set (step S201).

(8-2) When Section Marker Mcp Coincident with Starting and Terminal Ends is Acquired At step S113, when the section marker Mcp coincident with the starting and terminal ends is acquired, attributes of key name=base name (marker name (Mcp)), matching method=complete match, operation=section marker, marker starting end=detected section starting end, marker terminal end=detected section end, and marker name=existing name rule (key name) are respectively set (step S202).

(8-3) When There is a Chapter Boundary Coincident with Starting End

At step S111 of FIG. 8, when there is a chapter boundary coincident with the starting end, attributes of matching method=forward match, operation=chapter, and chapter division point=detected section starting end are respectively set (step S211).

Further, it is judged whether both the forward chapter Cbf and the backward chapter Cbl have names and suffixes are the same, and in the case of the same, attributes of key name=base name (chapter name (Cbl)), forward chapter name=existing name rule (base name (chapter name (Cbf)), and backward chapter name=existing name rule (key name) are respectively set (step S213).

In the case where the suffixes are not the same or there is no suffix, and in the case where there is no name only in the forward chapter, attributes of key name=base name (chapter name (Cbl)), and backward chapter name=existing name rule (key name) are respectively set (step S214). In the case where there is no name only in the backward chapter, attributes of key name=base name (chapter name (Cbf)), and forward chapter name=existing name rule (key name) are respectively set (step S215).

(8-4) When a Point Marker Mbm Coincident with the Starting End is Acquired

At step S111 of FIG. 8, when the point marker Mbm coincident with the starting end is acquired, attributes of matching method=forward match, operation=point marker, and marker point=detected section starting end are respectively set (step S221).

Further, in the case where the point marker Mbm has a name, attributes of key name=base name (marker name (Mbm)), and marker name=existing name rule (key name) are respectively set (step S222).

Besides, when the section marker Mbp coincident with the starting end is acquired, attributes of matching method=forward match, operation=section marker, and marker section=detected section starting end−marker length (Mbp) are respectively set (step S223).

Further, in the case where the section marker Mbp has a name, attributes of key name=base name (marker name (Mbp)), and marker name=existing name rule (key name) are respectively set (step S224).

(8-5) When There is a Chapter Boundary Coincident with a Terminal End

At step S112 of FIG. 8, when there is a chapter boundary coincident with a terminal end, attributes of matching method=backward match, operation=chapter, and chapter division point=detected section terminal end are respectively set (step S231).

Further, it is judged whether both the forward chapter Cef and the backward chapter Cel have names, and suffixes are the same, and in the case of the same, attributes of key name=base name (chapter name (Cef)), forward chapter name=existing name rule (key name), and backward chapter name=existing name rule (base name (chapter name (Cel)) are respectively set (step S233).

In the case where the suffixes are not the same, in the case where there is no suffix, and in the case where there is no name only in the backward chapter, attributes of key name=base name (chapter name (Cef)), and backward chapter name=existing name rule (key name) are respectively set (step S234) In the case where there is no name only in the forward chapter, attributes of key name=base name (chapter name (Cel)), and forward chapter name=existing name rule (key name) are respectively set (step S235).

(8-6) When a Point Marker Mem Coincident with a Terminal End is Acquired

At step S112 of FIG. 8, when the point marker Mem coincident with the terminal end is acquired, attributes of matching method=backward match, operation=point marker, and marker point=detected section terminal end are respectively set (step S241).

Further, in the case where the point marker Mem has a name, attributes of key name=base name (marker name (Mem)), and marker name=existing name rule (key name) are respectively set (step S242).

(8-7) When a Section Marker Mep Coincident with a Terminal End is Acquired

At step S112 of FIG. 8, when the section marker Mep coincident with the terminal end is acquired, attributes of matching method=backward match, operation=section marker, and marker section=detected section terminal end−marker length (Mep) are respectively set (step S243).

Further, in the case where the section marker Mep has a name, attributes of key name=base name (marker name (Mep)), and marker name=existing name rule (key name) are respectively set (step S244).

Second Embodiment

An audio processing apparatus according to a second embodiment of the invention will be described with reference to FIGS. 10 to 12.

A different point between this embodiment and the first embodiment is that although video/audio data is processed in the first embodiment, only audio data is processed in this embodiment.

(1) Structure of Audio Processing Apparatus

Figure 10:
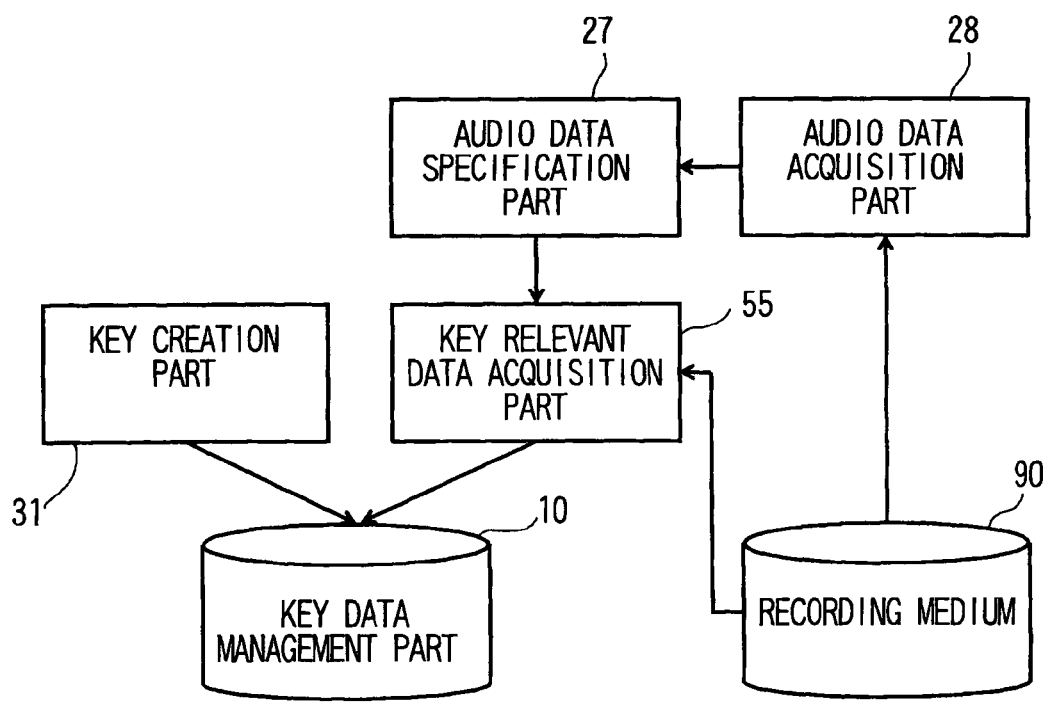
FIG. 10 is a block diagram showing a structure of a second embodiment of an audio processing apparatus of the invention.

FIG. 10 shows a structure of an audio processing apparatus of this embodiment.

The audio processing apparatus shown in FIG. 10 includes a recording medium 90, an audio data acquisition unit 28, an audio data specification unit 27, a key creation unit 31, a key relevant data acquisition unit 55 and a key data management unit 10.

Audio data, audio signals or video/audio signals are previously recorded on the recording medium 90. Besides, information for division into units, such as titles of audio data and chapters, and key relevant data relating to those names, attributes and the like are recorded on the recording medium 90.

The audio data acquisition unit 28 reads and acquires the audio data recorded on the recording medium 90, and delivers it to the audio data specification unit 27. Besides, analog audio signals recorded on the recording medium 90 are read and acquired, or analog video/audio signals recorded on the recording medium 90 are read and only the audio signals are acquired, and after they are converted into digital audio data, they may be delivered to the audio data specification unit 27. Incidentally, in addition to these processings, as the need arises, a decryption processing of audio data, a decode processing, a format conversion processing, a rate conversion processing, and the like may be performed.

The audio data specification unit 27 specifies a whole or partial section of the audio data acquired in the audio data acquisition unit 28. In the case where the specified section is acquired by the operation of the user, for example, although it is conceivable to use a device such as a mouse or a remote control, another method may be used. The audio data is reproduced, and while confirming the audio data, the user may specify the positions of the starting and terminal ends. Besides, a chapter is selected from a chapter name list or the like, and the whole chapter may be regarded as the specified section.

The key creation unit 31 creates audio pattern data to be used in the key matching unit 30 of the third to sixth embodiments from the audio data delivered from the audio data specification unit 27. Here, the audio pattern data held as the key may be, for example, reproducible audio data or what is obtained by feature-extracting the audio data and by parameterizing it.

The key relevant data acquisition unit 55 extracts the key relevant data relevant to the section of the audio data specified in the audio data specification unit 27 from the recording medium 90.

For example, when there is a title name corresponding to the specified audio data or a chapter name corresponding to the specified section, the key relevant data is extracted. Besides, in the case where the section corresponding to the previous retrieval result is specified, and the key data of the retrieval result is stored, the key data as shown in FIG. 11 is extracted. Besides, the key relevant data may be externally inputted.

Further, even if direct correspondence to the specified section is not obtained, when a close chapter or marker is found by retrieval, the key relevant data is extracted, and information is given by positional relation between the specified section and the chapter or marker.

Similarly to the first embodiment, the key data management unit 10 manages plural audio pattern data created in the key creation unit 31 as retrieval keys. Besides, with respect to the respective retrieval keys, the key relevant data such as a relevant name and attribute acquired in the key relevant data acquisition unit 55 can be managed together.

(2) Information Managed in the Key Data Management Unit 10

FIG. 11 shows an example of key relevant data, together with the audio pattern data of the retrieval keys created as the processing result, managed in the key data management unit 10 of this embodiment.

Here, a key name, a title name, an attribute, a matching method and a parameter are managed as the key relevant data.

With respect to a retrieval key E (audio pattern data E), the information of [road congestion information], [road information radio], [BGM attribute 2 (BGM-2) ], [forward match], and [BGM] is managed.

With respect to a retrieval key F (audio pattern data F), the information of [ending], [talk program of Mr. X], [ending music attribute 2 (EDM-2], [backward match] and [robust music (RBM)] is managed.

With respect to a retrieval key G (audio pattern data G), the information of [culture corner], [travel conversation], [corner music attribute 2 (CNM-2) ], [complete match] and [clean music (CLM)] is managed.

With respect to a retrieval key H (audio pattern data H), the information of [metal bat sound], [(no title)], [competition noted event attribute 2 (AGE-2)], [forward match], and [robust effective sound (RBS)] is managed.

Further, with respect to retrieval keys J1 and J2 operating in a pair (audio pattern data J1 and J2), the information of [song title "A"], [(no title)], [beginning of music attribute 2 (BOM-2)], Forward match] and [clean music (CLM)], and [song title "A" end], [(no title)], [end of music attribute 2 (EOM-2)], [backward match] and [clean music (CLM)] is managed.

FIG. 12 shows an example of the regulated recording instruction operations made to correspond to the attributes in FIG. 11. Incidentally, in the third to sixth embodiments, the attribute is used for the recording instruction operation in the matching result recording unit 35 based on the detection result of the key matching unit 30.

The [BGM attribute 2 (BGM-2)] is an attribute added to a retrieval key for a recording instruction operation in which the whole detected section is made a marker section as it is, the broadcast time of a detected place is acquired as [HH: MM] (00 to 23 hours, 00 to 59 minutes), and then, the name of the section is set as [(name of key)-time]. Incidentally, [% R] in FIG. 12 indicates time information in a [HH:MM] format.

The [ending music attribute 2 (EDM-2)] is an attribute added to a retrieval key for a recording instruction operation in which a chapter division is made at the starting end and the terminal end of a detected section, the name of a chapter sandwiched between the starting and terminal ends is made [[ending]] (in the case where plural sections are detected, [[ending]-number]), and in case the title name has not been set, [name of title] related to the key is set as the title name.

The [corner music attribute 2 (CNM-2)] is an attribute added to a retrieval key for a recording instruction operation in which a chapter division is made at the starting end of a detected section, the name of a divided backward chapter is made [(name of key)], and in case the title name has not been set, [name of title] related to the key is set as the title name.

The [competition noted event attribute 2 (AGE-2)] is an attribute added to a retrieval key for a recording instruction operation in which a point eight seconds before the starting end of a detected section is made a marker point, and the name of a marker is set as [(name of key)-number].

The [beginning of music attribute 2 (BOM-2)] is an attribute added to a retrieval key for a recording instruction operation in which a chapter division is made at the starting end of a detected section, and the name of a divided backward chapter is set as [(name of key)].

The [end of music attribute 2 (EOM-2)] is an attribute added to a retrieval key for a recording instruction operation in which a chapter division is made at the terminal end of a detected section.

(3) Addition of Attribute Information to the Retrieval Key E

A description will be given as to how the attribute is added when a portion of the audio data recorded on the recording medium 90 is specified in order to create the retrieval key E (audio pattern data E). Incidentally, this attribute is information inputted from the key relevant data acquisition unit 55.

For example, an operation at the time when a portion of the audio recorded on the recording medium 90 is specified in order to create the retrieval key E, is as described below.

In the case where a marker [road congestion information-10:28] portion in the title in which the [road information ratio] program is recorded is specified and the key is created, the coincidence between the key specification portion and the marker portion is judged, and based on the name of the marker, the operation at the time of detection is added as the attribute information of the key.

For example, the key name [road congestion information] is obtained from the marker [road congestion information-10:28], the whole detected section is made the marker section as it is, and the attribute is added by which the name of the section is made [[road congestion information]-time]. Besides, the starting and terminal ends of the marker [road congestion information-10:28] and the starting and terminal ends of the key specification portion are compared with each other, and in the case where only the starting ends are substantially the same points, and the terminal ends are different points, a matching method is set as [forward match].

Incidentally, setting may be made as [BGM attribute 2 (BGM-2)] including these as the regulated operation.

(4) Addition of Attribute Information to the Retrieval Key H

A description will be given as to how the attribute is added when a portion of the audio data recorded on the recording medium 90 is specified in order to create the retrieval key H (audio pattern data H). Incidentally, this attribute is information inputted from the key relevant data acquisition unit 55.

In the case where the key is created by specifying a portion of a metal bat sound in the title in which the [high school baseball tournament] program is recorded, by using that the marker [metal bat sound-3] exists eight seconds before the specified section, the operation at the time of detection is added as the attribute information of the key.

For example, a point eight seconds before the detected place is made a marker point, and the attribute is added by which the name of the marker is made [[metal bat sound]-number].

Besides, with respect to the title name, setting can be made such that it is not given at the time of detection. Setting may be made as [competition noted event attribute 2 (AGE-2)] including these as the regulated operation.

(5) Addition of Attribute Information to the Retrieval Keys J1 and J2

A description will be given as to how the attribute is added when a portion of the audio data recorded on the recording medium 90 is specified in order to create the retrieval key J1 (audio pattern data J1) and the retrieval key J2 (audio pattern data J2). Incidentally, this attribute is information inputted from the key relevant data acquisition unit 55.

In the case where the key is created while specifying the start portion of the music of the song title "A" in the title in which a music program is recorded, the operation at the time of detection is added as the attribute information of the key by using the existence of the chapter of the song title "A" starting from substantially the same point as the starting end of the specified section. For example, a chapter division is made at the starting end of the detected section, and the attribute is added by which the backward chapter name is made [song title "A"].

Similarly, in the case where the end portion of the same music is specified and the key is created, the operation at the time of detection is added as the attribute information of the key by using the existence of the chapter of [song title "A"] ending at substantially the same point as the terminal end of the specified section. For example, a chapter division is made at the terminal end of a detected section, and the attribute is added by which the forward chapter name is made [song title "A"]. Besides, with respect to the title name, setting can be made such that it is not given at the time of detection. Setting may be made as [beginning of music attribute 2 (BOM-2)] and [end of music attribute 2 (EOM-2)] including these as regulated operations respectively.

Third Embodiment

A video/audio processing apparatus according to a third embodiment of the invention will be described with reference to FIGS. 13 to 17.

The video/audio processing apparatus according to the first embodiment is the apparatus for creating the key data, as the origin of the metadata, including the retrieval key and the key relevant data in the case where the metadata is created as the support data to support the user so that when the user reproduces, edits or retrieves video/audio data, the user can perform the reproduction, editing or retrieval in a desired operation. The video/audio processing apparatus of this embodiment has, in addition to the above function, a function to record the metadata as the support data into the video/audio data as the use object data based on the key data.

(1) Structure of the Video/Audio Processing Apparatus

Figure 13:
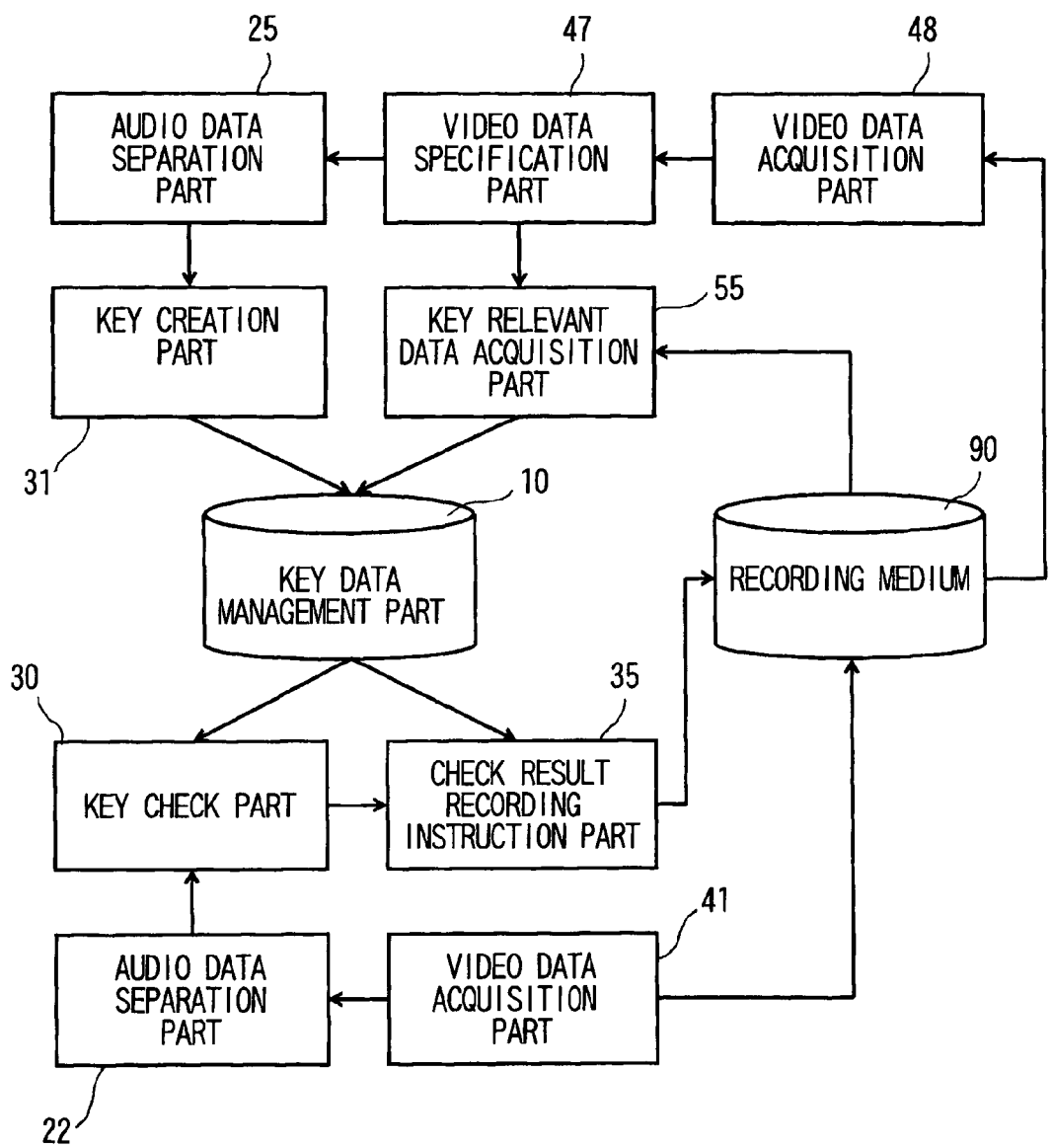
FIG. 13 is a block diagram showing a structure of a third embodiment of a video/audio processing apparatus of the invention.

FIG. 13 shows a structure of the video/audio processing apparatus according to this embodiment.

The video/audio processing apparatus shown in FIG. 13 includes, as structural elements relating to key creation, a video data acquisition unit 48, a video data specification unit 47, an audio data separation unit 25, a key creation unit 31 and a key relevant data acquisition unit 55. Besides, as structural elements relating to key retrieval, it includes a video data acquisition unit 41, an audio data separation unit 22, a key matching unit 30 and a matching result recording instruction unit 35. Further, as common structural elements, it includes a recording medium 90 and a key data management unit 10.

The structural elements relating to the key creation are the same as those of the first embodiment, and their description will be omitted.

The video data acquisition unit 41 relating to the key retrieval acquires video/audio data inputted from an external digital video camera, a receiving tuner of digital broadcast or the like, or another digital equipment, records it on the recording medium 90, and delivers it to the audio data separation unit 22. Besides, an analog video/audio signal inputted from an external video camera, a broadcast receiving tuner or another equipment is acquired, and after it is converted into digital video/audio data, it may be recorded on the recording medium 90 or may be delivered to the audio data separation unit 22. Incidentally, in addition to these processings, as the need arises, a decryption processing of the video/audio data (for example, B-CAS), a decode processing (for example, MPEG2), a format conversion processing (for example, TS/PS), a rate (compression rate) conversion processing and the like may be performed.

The audio data separation unit 22 separates audio data from the video/audio data acquired in the video data acquisition unit 41, and delivers it to the key matching unit 30.

Similarly to the first embodiment, the key data management unit 10 manages plural audio pattern data as retrieval keys. Besides, with respect to the respective retrieval keys, information such as relevant names and attributes can be managed together. As a result of key creation, information as shown in FIG. 2 is managed.

The key matching unit 30 matches previously selected one or plural audio pattern data among the audio pattern data managed as the retrieval keys in the key data management unit 10 against the audio data separated in the audio data separation unit 22, and detects a similar section.

(2) Description of Key Retrieval

With respect to the retrieval key A, in accordance with information of [forward match] and [BGM], an algorism is used in which attention is paid to a music component of BGM by masking the frequency region of human voice to evaluate a coincidence degree, and detection is made from the head of the retrieval key to a portion where patterns become coincident while the terminal end is free.

With respect to the retrieval key B, in accordance with information of [complete match] and [clean music], an algorithm is used in which importance is attached to a music component to evaluate a coincidence degree, and a place where the whole pattern of the retrieval key becomes coincident is detected.

With respect to the retrieval key C, in accordance with information of [complete match] and [robust music], an algorithm is used in which some noise is allowed while importance is attached to a music component, a coincidence degree is evaluated, and a place where the whole pattern of the retrieval key becomes coincident.

With respect to the retrieval key D, in accordance with the information of [forward match] and [robust effect sound], an algorithm is used in which attention is paid to a spectrum peak to evaluate a coincidence degree, and detection is made from the head of the retrieval key to a portion where patterns become coincident while the terminal end is free.

Incidentally, although it is assumed that the respective information of FIG. 2, together with retrieval keys, is previously set and managed, when selection and setting is made to the key matching unit 30 for actual detection and retrieval, partial or whole information may be changed and used. For example, although the retrieval key B generally has [complete match] and [clean music (CLM)], when it is used as [forward match] and [BGM], it becomes suitable for retrieval and detection of a preview of the program.

(3) Matching Result Recording Instruction Unit 35

The matching result recording instruction unit 35 acquires the key data detected in the key matching unit 30 from the key data management unit 10. In accordance with the attribute of the retrieval key in this key data, it is recorded as metadata on the recording medium 90 so that reproduction, editing and retrieval can be easily performed. The metadata recorded on the recording medium 90 has a structure regulated by, for example, the VR (Video Recording) mode of DVD (Digital Versatile Disc).

An example of recording instruction operations made to correspond to attributes and regulated in the matching result recording instruction unit 35 will be described with reference to FIG. 3.

With respect to [BGM attribute 1 (BGM-1)], the matching result recording instruction unit 35 performs the recording instruction operation to the recording medium 90 so that the whole detected section is made a marker section as it is, and the name of the section is set as [(name of key)] (in the case where plural sections are detected, [(name of key)-number]), and the recording medium 90 records it as metadata based on the recording instruction operation. Incidentally, [#] in FIG. 3 denotes a number.

With respect to [opening music attribute 1 (OPM-1)], the matching result recording instruction unit 35 performs a recording instruction operation to the recording medium 90, so that a chapter division is made at the starting end and the terminal end of a detected section, the name of a chapter sandwiched between the starting and terminal ends is set as [[opening]-number], the name of a backward chapter, when a division is made at the terminal end, is set as [main part-number], and in case the title name has not been set, [name of title] related to the key is set as the title name, and the recording medium 90 makes a record as the metadata based on the recording instruction operation.

With respect to [corner music attribute 1 (CNM-1)], the matching result recording instruction unit 35 performs a recording instruction operation to the recording medium 90, so that a chapter division is made at the starting end of the detected section, the name of a backward chapter of the division is set as [(name of key)] (plural sections are detected, [(name of key)-number]), and in case the title name has not been set, [name of title] related to the key is set as the title name, and the recording medium 90 makes a record as the metadata based on the recording instruction operation.

With respect to [competition start event attribute 1 (SGE-1)], the matching result recording instruction unit 35 performs a recording instruction operation to the recording medium 90, so that a point two seconds before the starting of a detected section is made a marker point, and the name of the marker is set as [(name of key)-number], and the recording medium 90 makes a record as the metadata based on the recording instruction.

(4) Recording Instruction Operation when the Retrieval Key A is Detected

Figure 14:
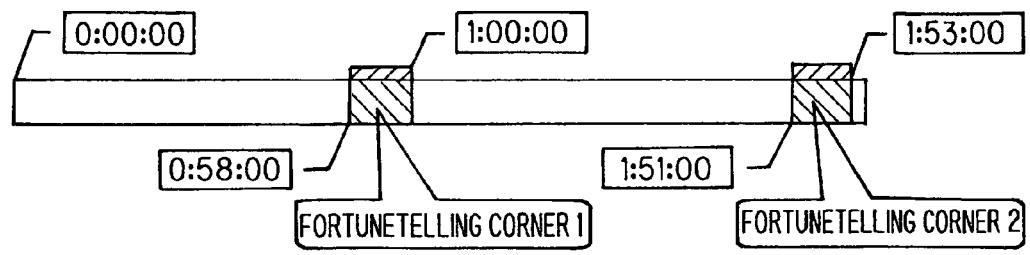
FIG. 14 is a schematic view showing an example of information recorded in accordance with a regulated operation of [BGM attribute 1] in a matching result recording instruction unit 35 of the third embodiment.

When the retrieval key A is detected in the key matching unit 30, the matching result recording instruction unit 35 performs the recording instruction operation to the recording medium 90 in accordance with the regulated operation of [BGM attribute 1], and FIG. 14 is a schematic view showing information recorded on the recording medium 90.

The section of the [fortunetelling corner] in the [morning information television] program (1 hour and 54 minutes) broadcast on December 22 is detected twice at a time of 58 minutes from the start of the broadcast and at a time of 1 hour and 51 minutes (indicated by dense marks on a band), and markers (portions indicated by oblique lines in the band) of names [fortunetelling corner 1] and [fortunetelling corner 2] are given.

By this, it becomes possible that for example, only the portion of the fortunetelling corner is extracted, is re-encoded at high compression, and is transferred to a portable equipment.

Figure 15:
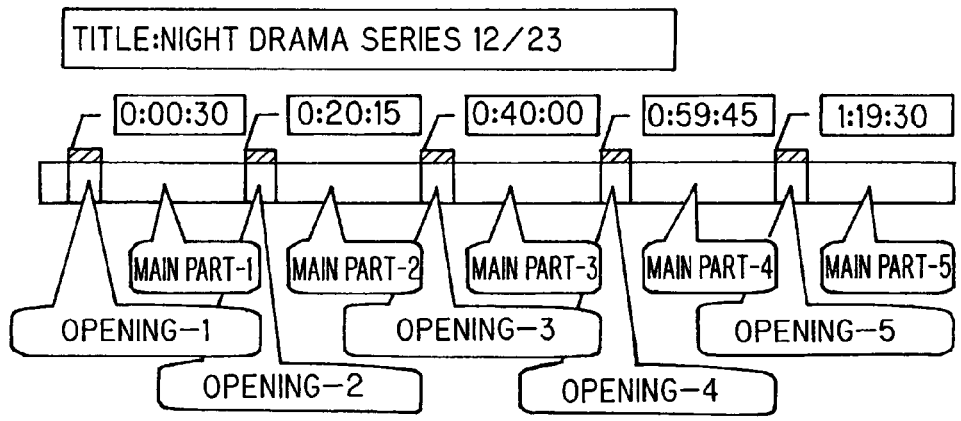
FIG. 15 is a schematic view showing an example of information recorded in accordance with a regulated operation of [opening music attribute 1] in the matching result recording instruction unit 35 of the third embodiment.

(5) Recording Instruction Operation at the Time when the Retrieval Key B is Detected When the retrieval key B is detected in the key matching unit 30, the matching result recording instruction unit 35 performs the recording instruction operation to the recording medium 90 in accordance with the regulated operation of [opening music attribute 1], and FIG. 15 is a schematic view showing information recorded on the recording medium 90.

The section of [opening] in the five-story series rebroadcast program (1 hour and 40 minutes) of [night drama series] broadcast on December 23 is detected five times in total at a time of 0 minute and 30 seconds, a time of 20 minutes and 15 seconds and the like (indicated by dense marks on a band), and divisions (indicated by vertical lines in the band) are made into chapters such as a chapter (no name) before first [opening], the first [opening-1], [main part-1] subsequent to the first opening, second [opening-2], [main part-2] subsequent to the second opening and the like. Besides, the title name [night drama series] is set. Here, in relation to the retrieval key B, in case genre [drama], storage destination media [HDD], storage destination folder [my drama], final storage rate (compression rate) [low], and a play list [night drama series-main part] are set in addition to the title name, when the retrieval key B is detected, instead of the title name or in addition to the title name, the genre [drama] may be set, the storage destination disk may be made [my drama] folder of HDD, the storage may be made after conversion to the [low] rate in which the quality is lowered in accordance with the final storage rate, or a new chapter [[main part]-number] may be added to the play list [night drama series-main part].

By this, for example, in the case where only the third story of the rebroadcast on Wednesday is desired to be watched, [opening-3] is selected from the chapter list and is reproduced, or by performing an operation of [jump to next chapter] during the opening reproduction, only the main parts can be collectively watched without watching the same opening many times. Besides, title name setting independent on the EPG, and the automation of genre setting, storage destination folder setting and the like become possible.

Figure 16:
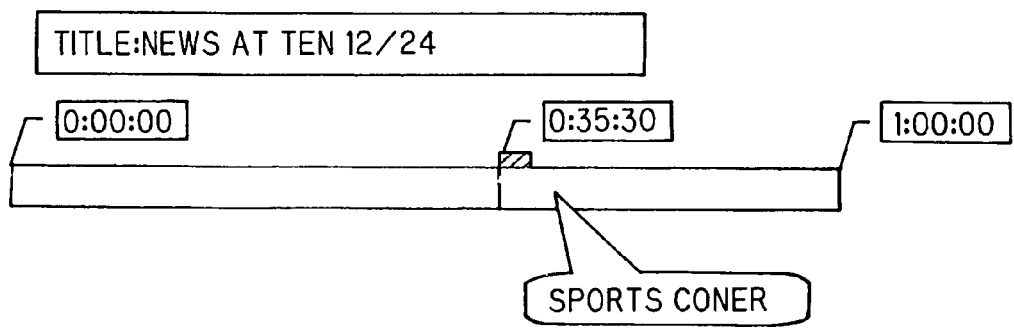
FIG. 16 is a schematic view showing an example of information recorded in accordance with a regulated operation of [corner music attribute 1] in the matching result recording instruction unit 35 of the third embodiment.

(6) Recording Instruction Operation at the Time when the Retrieval Key C is Detected When the retrieval key C is detected in the key matching unit 30, the matching result recording instruction unit 35 performs the recording instruction operation to the recording medium 90 in accordance with the regulated operation of the [corner music attribute 1], and FIG. 16 is a schematic view showing information recorded on the recording medium 90.

The music of [sports corner] in [news at ten] (60 minutes) broadcast on December 24 is detected, a chapter division is made at the head (35 minutes and 30 seconds) of the corner music, and the chapter name of [sports corner] is given. By this, for example, the user interested in only sports can select and reproduce [sports corner] from the chapter list. Besides, it becomes possible to perform viewing and listening in such a manner that after the main news is watched for a while from the head of the program, when interest is lost, an operation of [jump to next chapter] or the like is performed, so that a halfway portion to the [sports corner] is omitted.

(7) Recording Instruction Operation when the Retrieval Key D is Detected

Figure 17:
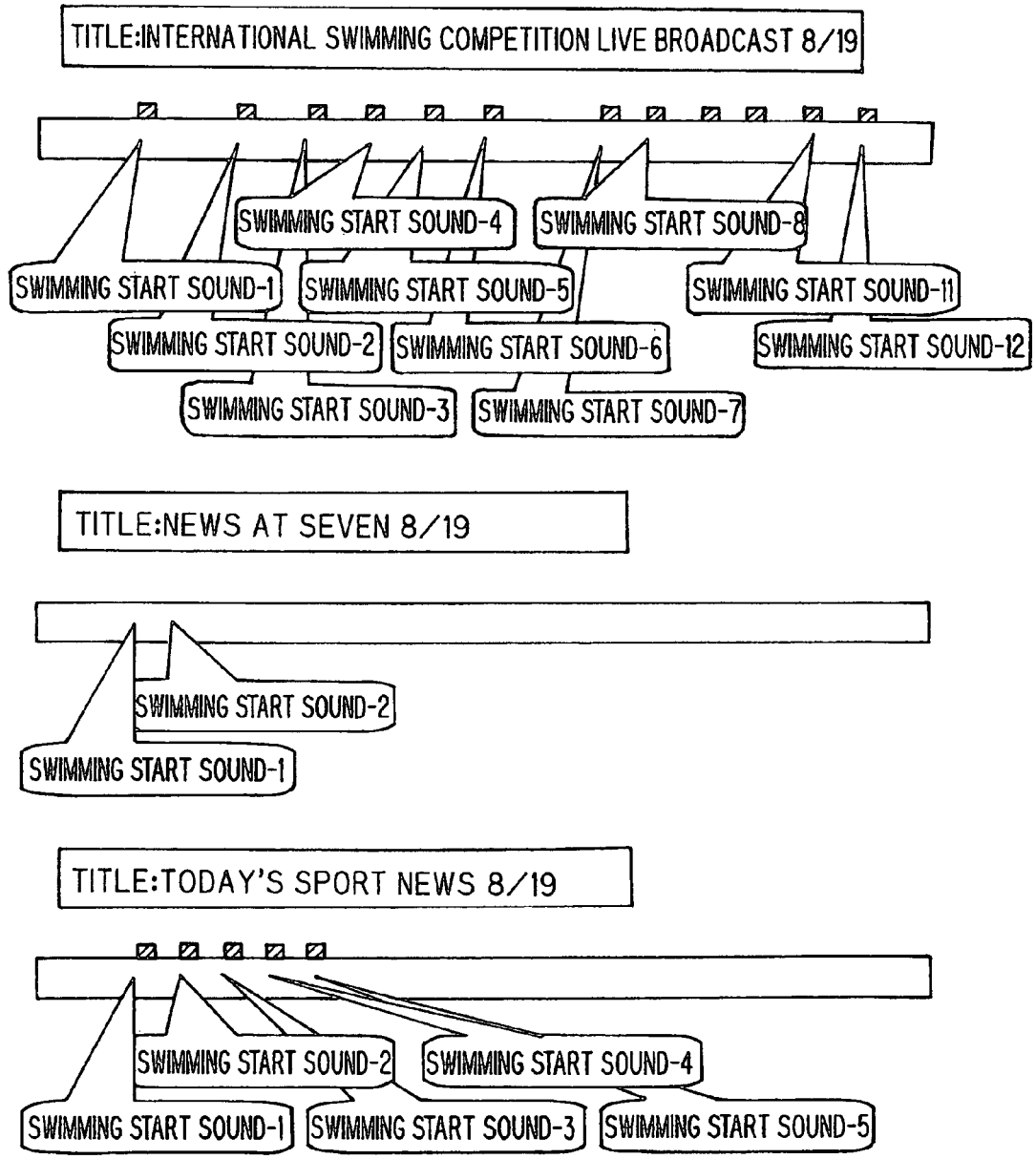
FIG. 17 is a schematic view showing an example of information recorded in accordance with a regulated operation of [competition start event attribute 1] in the matching result recording instruction unit 35 of the third embodiment.

When the retrieval key D is detected in the key matching unit 30, the matching result recording instruction unit 35 performs the recording instruction operation to the recording medium 90 in accordance with the regulated operation of the [competition start event attribute 1], and FIG. 17 is a schematic view showing information recorded on the recording medium 90.

The [swimming start sound] in the [international swimming competition live broadcast] program is detected twelve times, is detected twice in the [news at seven] program broadcast on the same day, and is detected five times in the [today's sports news] program, and a marker such as [swimming start sound-1] or [swimming start sound-2] is given to a portion two second before each of them. By this, the scene of the start of each race can be accessed by performing the operation of [jump to next marker] or the like, and for example, in the case where there is a race desired to be watched since a specific player enters, it becomes possible that a jump is successively made while watching the reproduced video, and the desired race is found.

Incidentally, the video data acquisition unit 41 and the audio data separation unit 22 as the structural elements relating to the key retrieval perform similar processings to the video data acquisition unit 48 and the audio data separation unit 25 as the structural elements relating to the key creation, and they may be made common.

Fourth Embodiment

An audio processing apparatus according to a fourth embodiment of the invention will be described with reference to FIG. 18.

A different point between this embodiment and the third embodiment is that although the video/audio data is processed in the third embodiment, only audio data is processed in this embodiment.

(1) Structure of Audio Processing Apparatus

Figure 18:
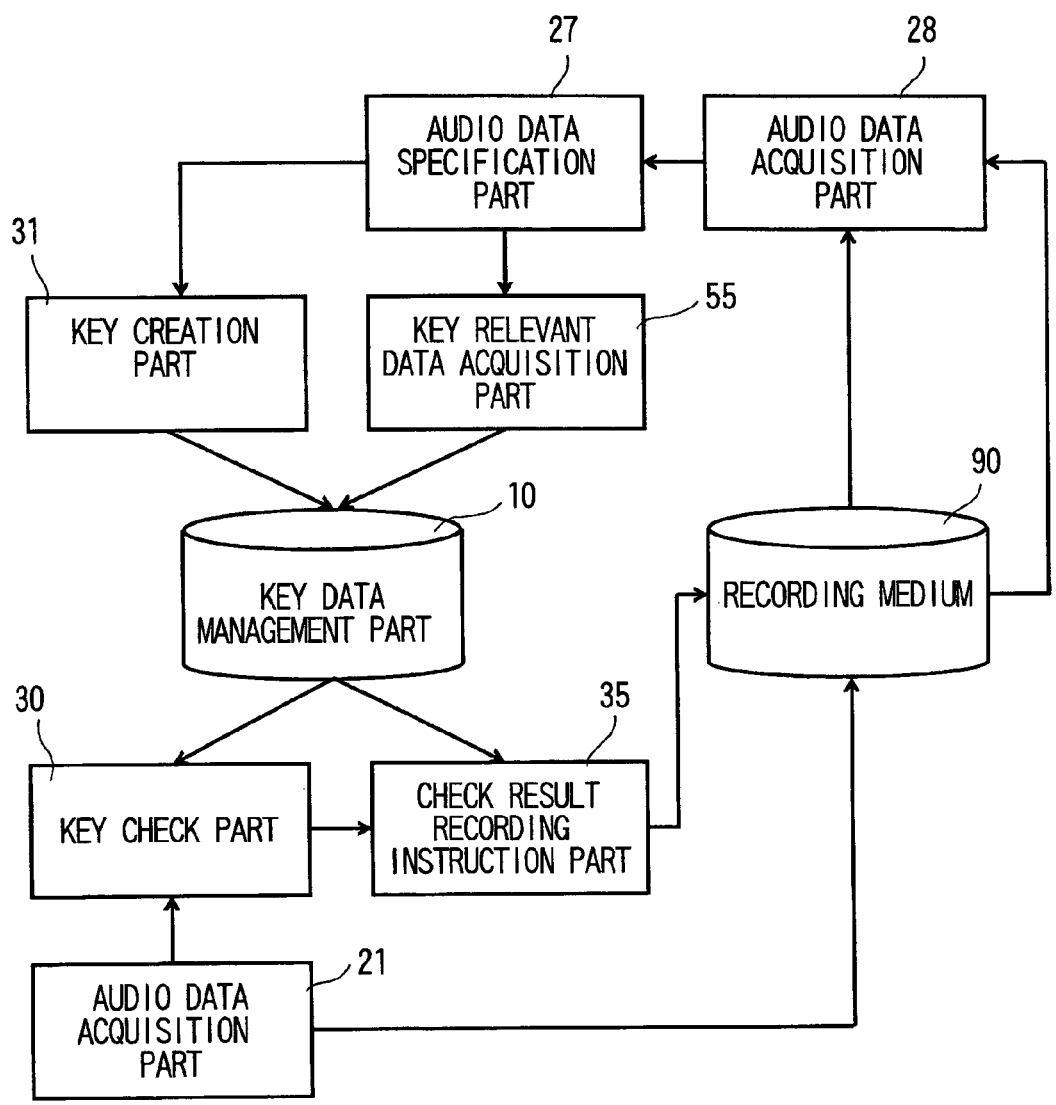
FIG. 18 is a block diagram showing a structure of a fourth embodiment of an audio processing apparatus of the invention.

FIG. 18 shows a structure of the audio processing apparatus according to this embodiment.

The audio processing apparatus shown in this drawing includes, structural elements relating to key creation, an audio data acquisition unit 28, an audio data specification unit 27, a key creation unit 31, and a key relevant data acquisition unit 55. Besides, as structural elements relating to key retrieval, it includes an audio data acquisition unit 21, a key matching unit 30, and a matching result recording instruction unit 35. Further, as common structural elements, it includes a recording medium 90 and a key data management unit 10.

The structural elements relating to the key creation are similar to those of the second embodiment, and their description will be omitted.

The audio data acquisition unit 21 relating to the key retrieval acquires audio data inputted from an external digital microphone, a receiving tuner of digital broadcast or the like, or another digital equipment, records it on the recording medium 90, and delivers it to the key matching unit 30. Besides, an analog audio signal inputted from an external microphone, a broadcast receiving tuner, or another equipment is acquired, and after it is convert into digital audio data, it may be record on the recording medium 90 or delivered to the key matching unit 30. Besides, as the need arises, a decryption processing of audio data, a decode processing, a format conversion processing, a rate conversion processing or the like may be performed in addition to these processings.

Similar to the second embodiment, the key data management unit 10 manages plural audio pattern data as retrieval keys. Besides, with respect to the respective retrieval keys, information of relevant names, attributes and the like can be managed together.

(2) Description of Key Retrieval

It is assumed that information as shown in FIG. 11 is managed as a result of key creation, and a description of key retrieval will be made.

The key matching unit 30 matches previously selected one or plural audio pattern data among the audio pattern data managed as the retrieval keys in the key data management unit 10 against audio data acquired in the audio data acquisition unit 21, and detects a similar section.

With respect to the retrieval key E, in accordance with the information of [forward match] and [BGM], an algorithm is used in which attention is paid to the music component of the BGM by masking the frequency region of human voice to evaluate a coincidence degree, and detection is made from the head of the retrieval key to a portion where patterns become coincident while the terminal end is free.

With respect to the retrieval key F, in accordance with the information of [backward match] and [robust music], an algorithm is used in which some noise is allowed while importance is attached to a music component, a coincidence degree is evaluated, and detection is made from the end of the retrieval key to a portion where patterns become coincident while the starting end is free.

With respect to the retrieval key G, in accordance with the information of [complete match] and [clean music], an algorithm is used in which importance is attached to a music component to evaluate a coincidence degree, and a place where the whole pattern of the retrieval key becomes coincident is detected.

With respect to the retrieval key H, in accordance with the information of [forward match] and [robust effect sound], an algorithm is used in which attention is paid to a spectrum peak to evaluate a coincidence degree, and detection is made from the head of the retrieval key to a portion where patterns become coincident while the terminal end is free.

With respect to the retrieval key J1, in accordance with the information of [forward match] and [clean music], an algorithm is used in which importance is attached to a music component to evaluate a coincidence degree, and detection is made from the head of the retrieval key to a portion where patterns become coincident while the terminal end is free.

With respect to the retrieval key J2, in accordance with the information of [backward match] and [clean music], an algorithm is used in which importance is attached to a music component to evaluate a coincidence degree, and detection is made from the end of the retrieval key to a portion where patterns become coincident while the terminal end is free.

Incidentally, although it is assumed that the respective information shown in FIG. 11, together with the retrieval keys, is previously set and managed, when selection and setting is made to the key matching unit 30 for actual detection and retrieval, partial or whole information may be changed and used. For example, although the retrieval key J1 has generally [clean music (CLM)], when it is used as [BGM], it becomes suitable for the retrieval and detection in a music program or CM (commercial message) with a format in which a narration is put at the beginning of the music.

(3) Matching Result Recording Instruction Unit 35

The matching result recording instruction unit 35 acquires key data detected in the key matching unit 30 from the key data management unit 10. It is recorded as metadata on the recording medium 90 so that reproduction, editing and retrieval can be easily performed in accordance with the attribute of the retrieval key in this key data.

FIG. 12 shows an example of recording instruction operations made to correspond to the attributes and regulated at the matching result recording instruction unit 35. Since the contents are the same as the second embodiment, the description will be omitted.

(4) When the Retrieval Key E is Detected

For example, when the retrieval key E is detected, in accordance with the regulated operation of [BGM attribute 2], the section of [road congestion information] in the [road information radio] program is detected plural times, and in accordance with the time of the broadcast, markers of names of [road congestion information-9:55], [road congestion information-10:28], [road congestion information-10:56] and the like are attached to the detected sections. By this, for example, it becomes possible to extract only the road congestion information from the newest information in sequence and to listen to it.

(5) When the Retrieval Key H is Detected

When the retrieval key H is detected, in accordance with the regulated operation of [competition noted event attribute 2], [metal bat sound] in the [high school baseball tournament] program is detected, and since a marker is put eight seconds before each detected place, it becomes possible to sequentially reproduce only the batting from just before the pitching motion.

(6) When the Retrieval Keys J1 and J2 are Detected

When the retrieval keys J1 and J2 are detected, in accordance with the combination of the regulated operations of [music beginning attribute 2] and [music end attribute 2], a chapter division is made at both the beginning and the end of the music of [song title "A"], and the section of the music becomes the chapter of [song title "A"].

Fifth Embodiment

A video/audio processing apparatus according to a fifth embodiment of the invention will be described with reference to FIG. 19.

A different point between this embodiment and the third embodiment is that the recording and processing is not performed on the video/audio data acquired from the outside, but the processing is performed on video/audio data which has been already recorded.

Figure 19:
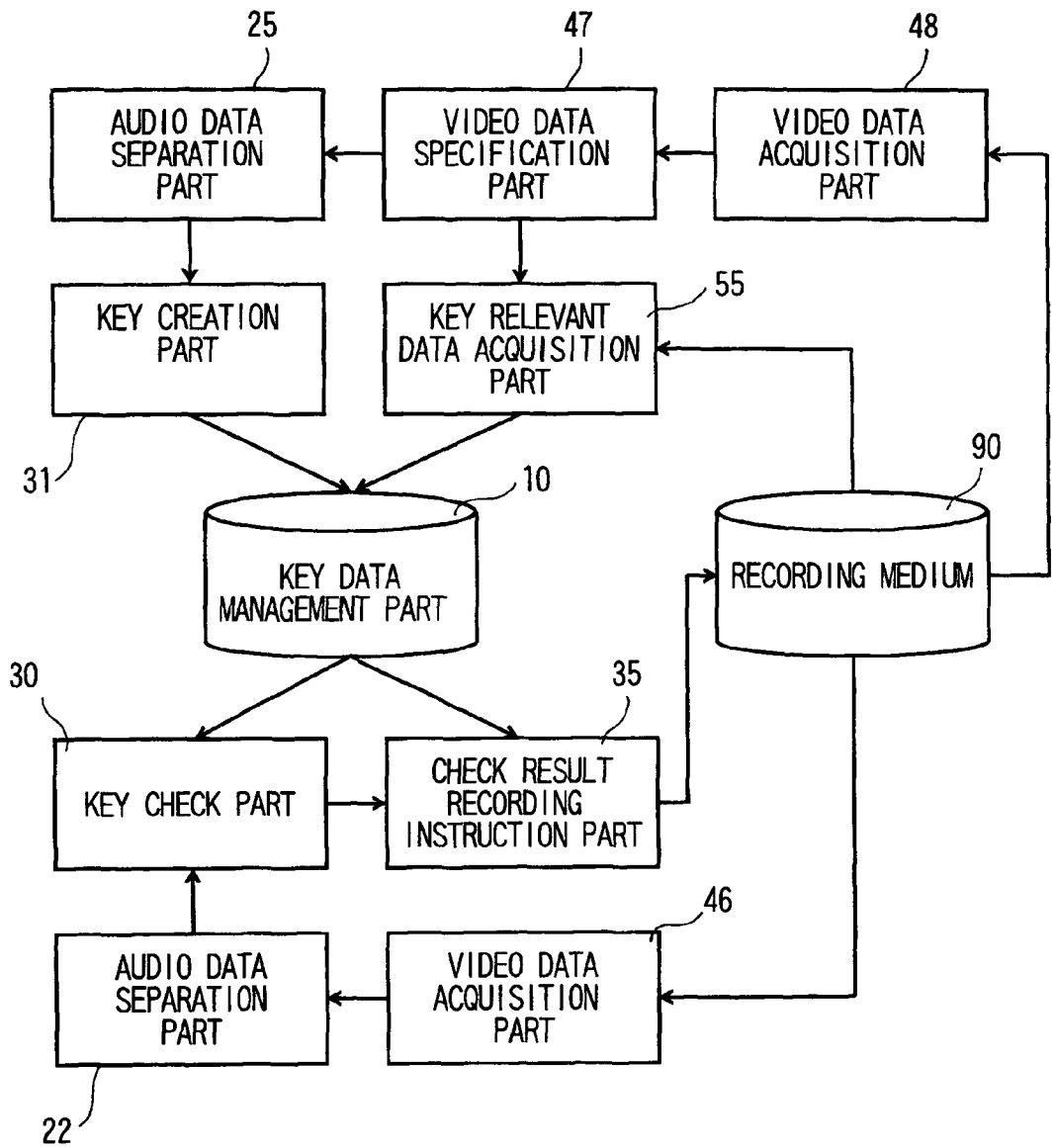
FIG. 19 is a block diagram showing a structure of a fifth embodiment of an audio processing apparatus of the invention.

FIG. 19 shows a structure of a video audio processing apparatus of this embodiment.

The video audio processing apparatus shown in FIG. 19 includes, as structural elements relating to key creation, a video data acquisition unit 48, a video data specification unit 47, an audio data separation unit 25, a key creation unit 31 and a key relevant data acquisition unit 55. Besides, as structural elements relating to key retrieval, it includes a video data acquisition unit 46, an audio data separation unit 22, a key matching unit 30, and a matching result recording instruction unit 35. Further, as common structural elements, it includes a recording medium 90 and a key data management unit 10.

The structural elements relating to the key creation are similar to those of the first embodiment, and their description will be omitted.

Video/audio data or video/audio signals are previously recorded on the recording medium 90. Besides, information for division into units, such as titles of video and audio and chapters, and information relating to the names, attributes and the like are recorded on the recording medium 90.

The video data acquisition unit 46 relating to the key retrieval reads and acquires the video/audio data recorded on the recording medium 90, and delivers it to the audio data separation unit 22. Besides, an analog video audio signal is read and acquired, and after it is converted into digital video/audio data, it may be delivered to the audio data separation unit 22. Besides, as the need arises, a decryption processing of the video/audio data, a decode processing, a format conversion processing, a rate conversion processing and the like may be performed in addition to these processings.

The audio data separation unit 22 separates the audio data from the video/audio data acquired in the video data acquisition unit 46 and delivers it to the key matching unit 30. For example, MPEG2 data is demuxed to extract MPEG2 Audio ES including the audio data, and is decoded (AAC or the like).

Similarly to the third embodiment, the key data management unit 10 manages plural audio pattern data as retrieval keys. Besides, with respect to the respective retrieval keys, information of relevant names and attributes can be managed together.

For example, as shown in FIG. 2, with respect to the retrieval key A, [fortunetelling corner], [morning information television], [BGM attribute 1] and the like, with respect to the retrieval key B, [opening], [night drama series], [opening music attribute 1] and the like are managed as the key relevant information.

The key matching unit 30 matches previously selected one or plural audio pattern data among the audio pattern data managed as the retrieval keys in the key data management unit 10 against the audio data acquired in the audio data acquisition unit 26, and detects a similar section.

The matching result recording instruction unit 35 acquires the key data detected in the key matching unit 30 from the key data management unit 10. It is recorded as metadata on the recording medium 90 so that reproduction, editing and retrieval can be easily performed in accordance with the attribute of the retrieval key in this key data.

Similarly to FIG. 3, recording instruction operations are regulated for the respective attributes, for example, with respect to [BGM attribute 1] of the retrieval key A, the whole detected section is set as [(name of key)], with respect to [opening music attribute 1] of the retrieval key B, a portion between the starting and terminal ends of the detected section is set as [opening], a backward section of the terminal end is set as [main part], and the title name is set.

Besides, in the matching result recording instruction unit 35, the metadata recorded on the recording medium 90 has a structure regulated by, for example, ARIB STD-B38.

FIG. 21 shows an example of metadata recorded on the recording medium 90 by the matching result recording instruction unit 35 when the retrieval key A is detected in the key matching unit 30. Two segments of [fortunetelling corner-1] of 120 seconds from 3480 second (58 minutes) after the start of the program and [fortunetelling corner-2] of 180 seconds from 6660 seconds (1 hour 51 minutes), and a segment group of [fortunetelling corner] in which these fortunetelling corners are extracted are recorded.

FIG. 22 shows an example of metadata recorded on the recording medium 90 by the matching result recording instruction unit 35 when the retrieval key B is detected in the key matching unit 30. With respect to the program, the information of the name (title name) [night drama series], genre [drama] and the like, and segments of [opening-1] of 70 seconds from 30 seconds after the start of the program, [opening-2] from 1215 seconds (20 minutes and 15 seconds), [main part-1] and [main part-2] between them, and the like are recorded.

Sixth Embodiment

An audio processing apparatus according to a sixth embodiment of the invention will be described with reference to FIG. 20.

A different point between this embodiment and the fourth embodiment is that the recording and processing is not performed on the audio data acquired from the outside, but the processing is performed on the audio data which has already been recorded.

Figure 20:
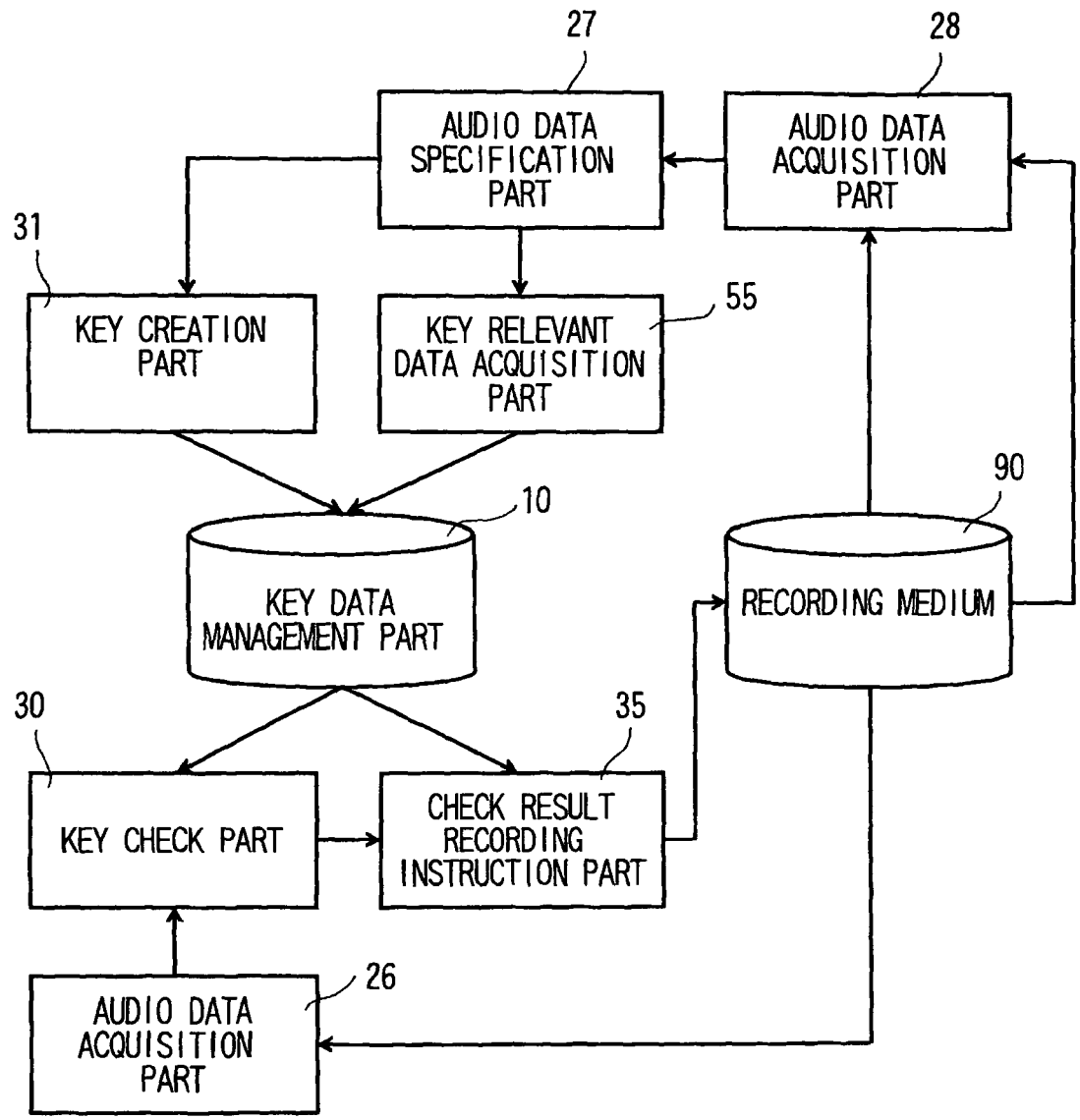
FIG. 20 is a block diagram showing a structure of a sixth embodiment of an audio processing apparatus of the invention.

FIG. 20 shows a structure of the audio processing apparatus of this embodiment.

The audio processing apparatus shown in this drawing includes, as structural elements relating to key creation, an audio data acquisition unit 28, an audio data specification unit 27, a key creation unit 31, and a key relevant data acquisition unit 55. Besides, as structural elements relating to key retrieval, it includes an audio data acquisition unit 26, a key matching unit 30 and a matching result recording instruction unit 35. Further, as common structural elements, it includes a recording medium 90 and a key data management unit 10.

The structural elements relating to the key creation are similar to those of the second embodiment, and their description will be omitted.

Similarly to the fourth embodiment, the key data management unit 10 manages plural audio pattern data as retrieval keys. Besides, with respect to the respective retrieval keys, information of relevant names, attributes and the like can be managed together.

Audio data, audio signals or video/audio signals are previously recorded on the recording medium 90. Besides, information for division into units, such as titles of audio data and chapters, and information of their names, attributes and the like are recorded on the recording medium 90.

The audio data acquisition unit 26 relating to the key retrieval reads and acquires the audio data recorded on the recording medium 90 and delivers it to the key matching unit 30.

The audio data acquisition unit 26 reads and acquires an analog audio signal recorded on the recording medium 90, or reads an analog video/audio signal recorded on the recording medium 90 and acquires only the audio signal, and after it is converted into digital audio data, it may be delivered to the key matching unit 30. Incidentally, as the need arises, a decryption processing of audio data, a decode processing, a format conversion processing, a rate conversion processing and the like may be performed in addition to these processings.

Similarly to the fourth embodiment, the key data management unit 10 manages plural audio pattern data as retrieval keys. Besides, with respect to the respective retrieval keys, information of relevant names, attributes and the like can be managed together.

It is assumed that information as shown in FIG. 11 is managed as a result of key creation, and a description of key retrieval will be made.

The key matching unit 30 matches previously selected one or plural audio pattern data among the audio pattern data managed as the retrieval keys in the key data management unit 10 against audio data acquired in the audio data acquisition unit 26, and detects a similar section.

The matching result recording instruction unit 35 acquires key data detected in the key matching unit 30 from the key data management unit 10. It is recorded as metadata on the recording medium 90 so that reproduction, editing and retrieval can be easily performed in accordance with the attribute of the retrieval key in the key data.

Seventh Embodiment

A video/audio processing apparatus according to a seventh embodiment of the invention will be described with reference to FIGS. 23 and 24.

The video/audio processing apparatus of this embodiment is an apparatus for creating key data including a retrieval key and key relevant data, which is the source of metadata, in the case of creating the metadata as support data to support a user so that when the user reproduces, edits or retrieves video/audio data, the user can perform reproduction, editing or retrieval in a desired operation.

A different point between this embodiment and the first embodiment is that a section which is made a retrieval key is not specified from the outside, but is determined based on the input of first support data.

(1) Structure of the Video/Audio Processing Apparatus

Figure 23:
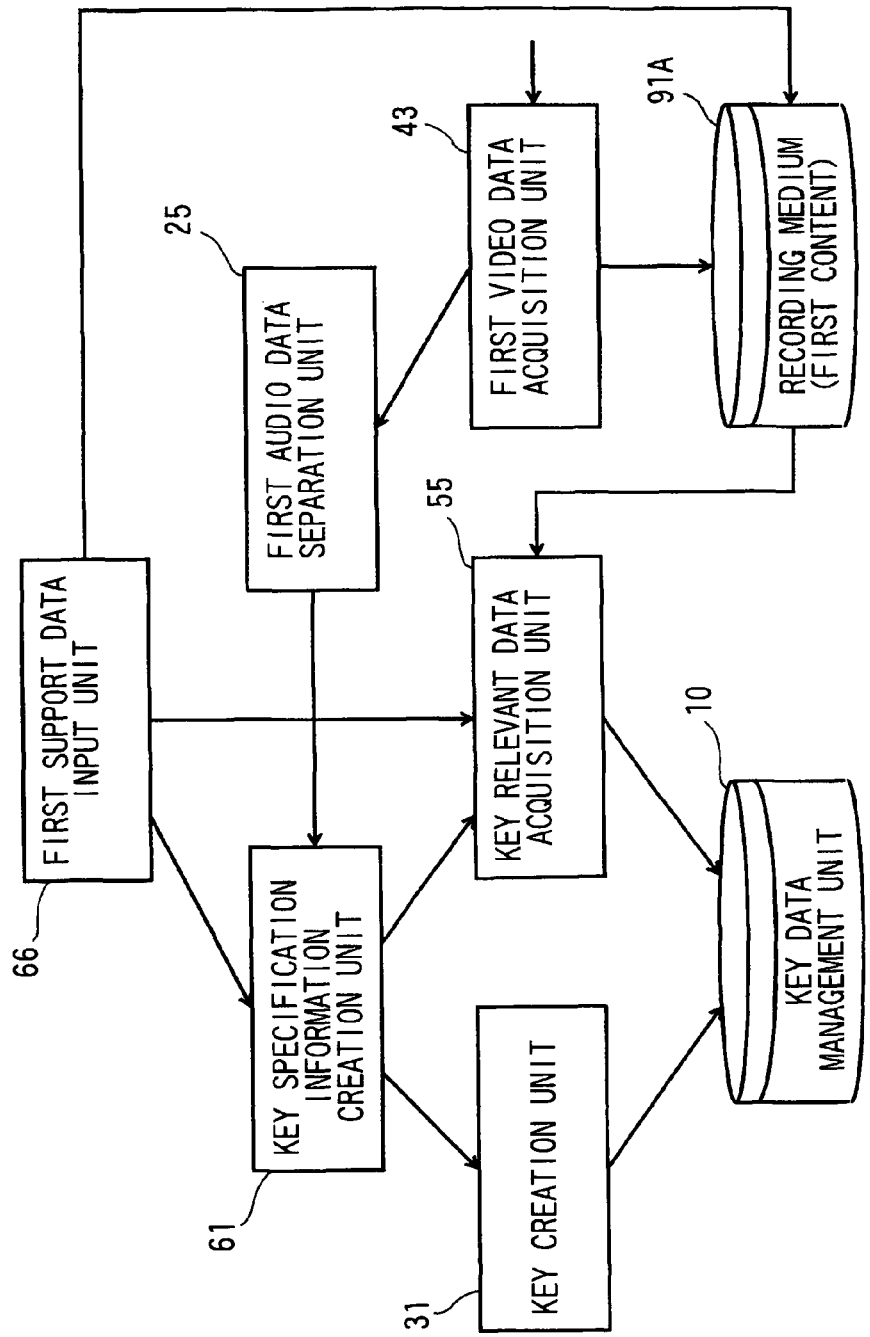
FIG. 23 is a block diagram showing a structure of a seventh embodiment of a video/audio processing apparatus of the invention.

FIG. 23 is a block diagram showing the structure of the video/audio processing apparatus of this embodiment.

The video/audio processing apparatus shown in FIG. 23 includes a first video data acquisition unit 43, a first audio data separation unit 25, a first support data input unit 66, a key specification information creation unit 61, a key creation unit 31, a key relevant data acquisition unit 55, a recording medium 91A, and a key data management unit 10.

The first video data acquisition unit 43 acquires video/audio data of first content relating to key creation from the outside and records it on the recording medium 91A.

The first audio data separation unit 25 separates audio data from the video/audio data acquired in the first video data acquisition unit 43 and delivers it to the key specification information creation unit 61. For example, the first audio data separation unit performs Demux of MPEG2 data, extracts MPEG2 Audio ES including audio data and decodes it (ACC or the like).

The first support data input unit 66 inputs support data relating to the first content and records it on the recording medium 91A.

The key specification information creation unit 61 determines a section, which is made a retrieval key, in the audio data delivered from the first audio data separation unit 25 on the basis of the time of the support data inputted in the first support data input unit 66.

The key relevant data acquisition unit 55 acquires key relevant data relevant to the section of the video/audio data specified in the key specification information creation unit 61. As the key relevant data, there exists the support data recorded on the recording medium 91A or the support data inputted in the first support data input unit 66. These first support data may include information relating to a program of the first content acquired from an electronic program guide or metadata provided by broadcast or from the outside, for example, as attributes of the program, a program title, a genre, broadcast date and time (a day of the week, time, date), a broadcast channel (broadcast station), a production source, a program group (program series, derivation source program) and the like.

Similarly to the first embodiment, the key creation unit 31 creates audio pattern data used in the key matching unit 30 of the third to sixth embodiments and the undermentioned respective embodiments based on the audio data in the section determined in the key specification information creation unit 61. Here, the audio pattern data to be held as the retrieval key may be, for example, reproducible audio data, or may be such that audio data is feature-extracted and is parameterized.

Similarly to the first embodiment, the key data management unit 10 manages plural audio pattern data created in the key creation unit 31 as retrieval keys. Besides, with respect to each of the retrieval keys, key relevant data, such as a relevant name and an attribute, acquired in the key relevant data acquisition unit 55 are added and management can be performed.

(2) Another Structure of the Video/Audio Processing Apparatus

Figure 24:
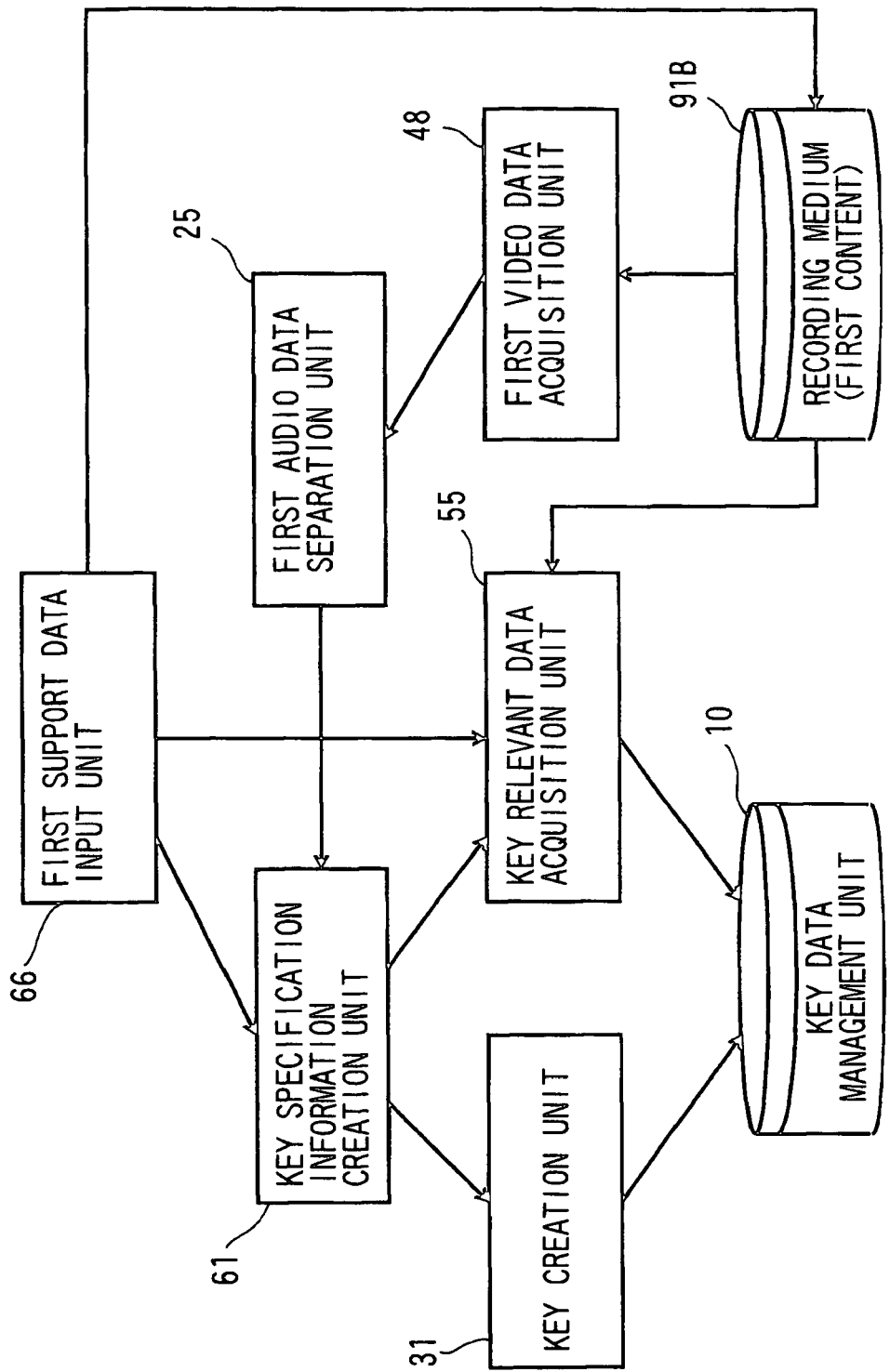
FIG. 24 is a block diagram showing another structure of the seventh embodiment.

FIG. 24 is a block diagram showing another structure of this embodiment.

A first video data acquisition unit 48 of FIG. 24 is different from the first video data acquisition unit 43 of FIG. 23 in that recording and processing are not performed on video/audio data acquired from the outside, but processing is performed on video/audio data recorded on a recording medium 91B.

The video/audio data of first content or video/audio signals are recorded on the recording medium 91B in advance. Besides, information for division into units, such as video/audio titles and chapters, and information relating to those names and attributes are recorded on the recording medium 91B.

Eighth Embodiment

A video/audio processing apparatus according to an eighth embodiment of the invention will be described with reference to FIGS. 25, 26 and 27.

(1) First Structure of the Video/Audio Processing Apparatus

Figure 25:
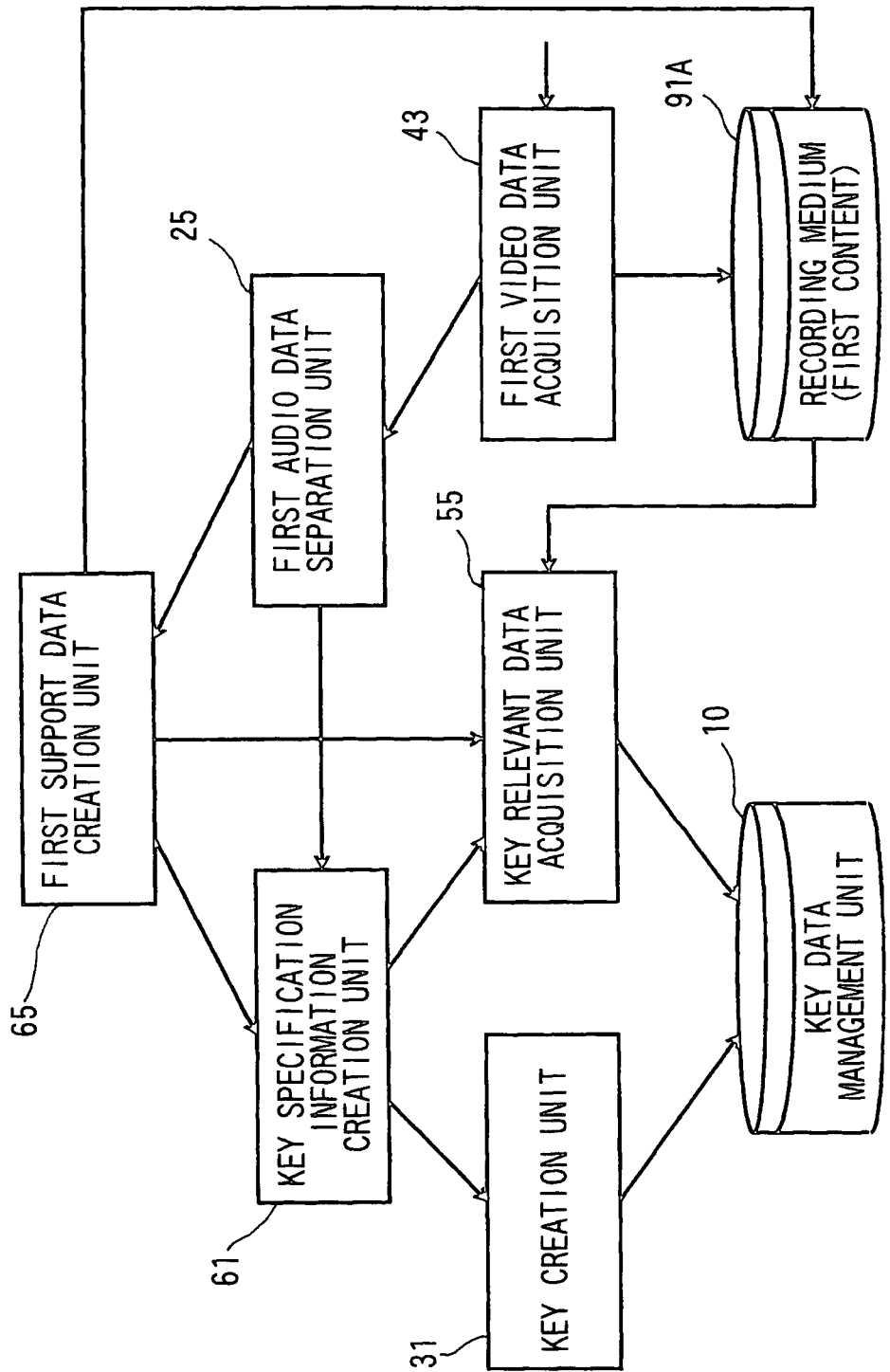
FIG. 25 is a block diagram showing a structure of an eighth embodiment of a video/audio processing apparatus of the invention.

FIG. 25 is a block diagram showing a first structure of the video/audio processing apparatus of this embodiment.

The video/audio processing apparatus shown in FIG. 25 includes a first video data acquisition unit 43, a first audio data separation unit 25, a first support data creation unit 65, a key specification information creation unit 61, a key creation unit 31, a key relevant data acquisition unit 55, a recording medium 91A, and a key data management unit 10.

A different point between this embodiment and the seventh embodiment is that instead of the first support data input unit 66, the first support data creation unit 65 is provided.

The first support data creation unit 65 detects a change point of audio data separated in the first audio data separation unit 25, creates first support data, and records it on the recording medium 91A. For example, a silence section is detected, and a division is made at its start point, end point, intermediate point or the like. Besides, switching of a sound-multiplex mode is detected, and division may be made at a boundary between a main part portion of a monaural mode and a CM portion of a stereo mode.

The key specification information creation unit 61 determines a section, which is made a retrieval key, in the audio data delivered from the first audio data separation unit 25 on the basis of the time of the support data created in the first support data creation unit 65.

The key relevant data acquisition unit 55 acquires key relevant data relevant to the section of the video/audio data specified in the key specification information creation unit 61. As the key relevant data, there exists the support data recorded on the recording medium 91A or the support data created in the first support data creation unit 65.

The first video data acquisition unit 43, the first audio data separation unit 25, the key creation unit 31, the recording medium 91A, and the key data management unit 10 are the same as those of the seventh embodiment, and their description will be omitted.

Incidentally, similarly to FIG. 24 in the seventh embodiment, also in this embodiment, instead of the first video data acquisition unit 43 to perform the recording and processing on the video/audio data acquired from the outside, the first video data acquisition unit 48 to perform the processing on the video/audio data recorded on the recording medium 91B may be provided.

(2) Second Structure of the Video/Audio Processing Apparatus

Figure 26:
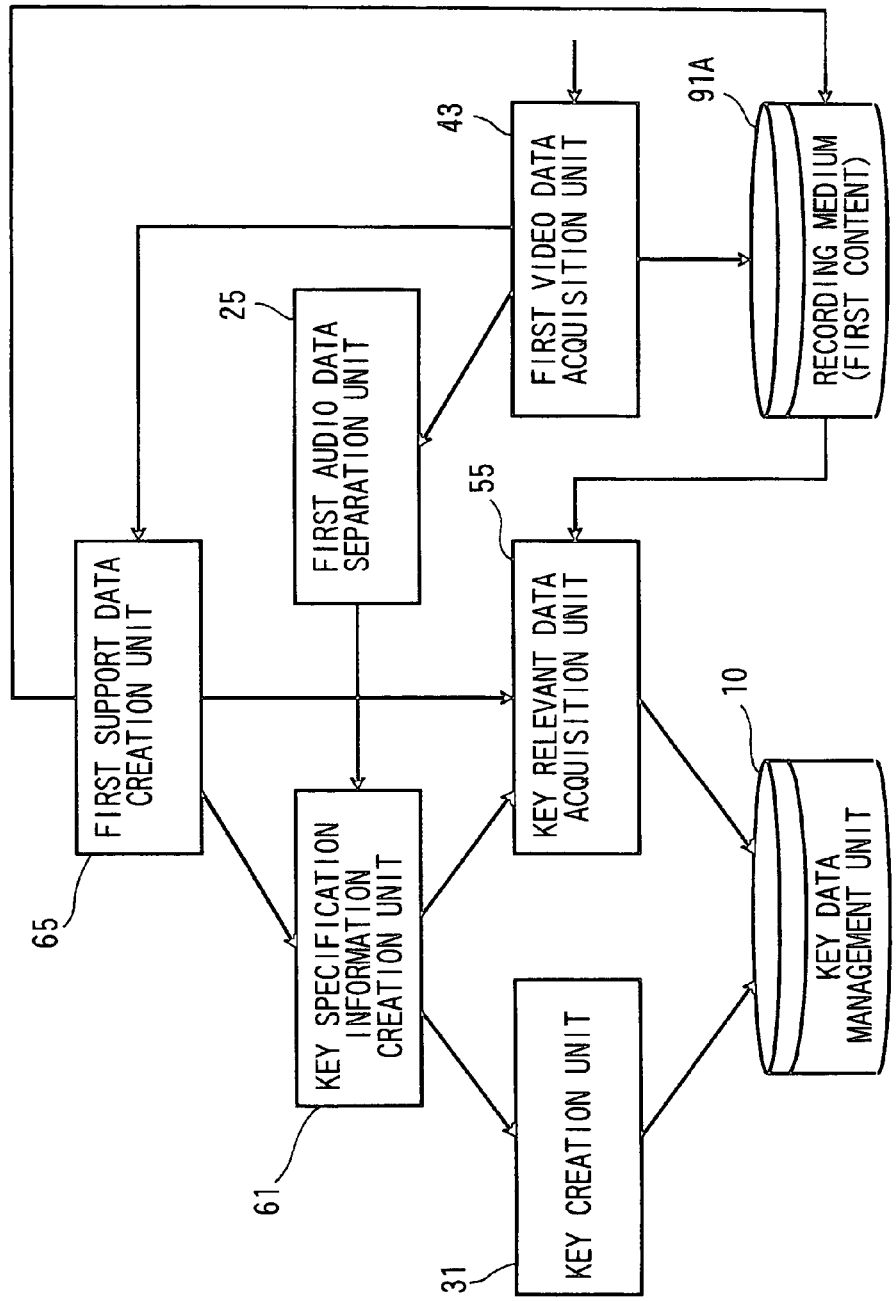
FIG. 26 is a block diagram showing a second structure of the video/audio processing apparatus of the eighth embodiment.

FIG. 26 is a block diagram showing a second structure of this embodiment.

A first support data creation unit 65 of FIG. 26 is different from the first support data creation unit 65 of FIG. 25 in that first support data is created based on video/audio data acquired in a first video data acquisition unit 43, not audio data separated in a first audio data separation unit 25. For example, switching (cut) of a video image is detected, and a division is made. By using audio data at the same time, a division may be made at a cut of a silence portion. Besides, a division based on the similarity among video images may be made as in JP-A-2005-130416.

(3) Third Structure of the Video/Audio Processing Apparatus

Figure 27:
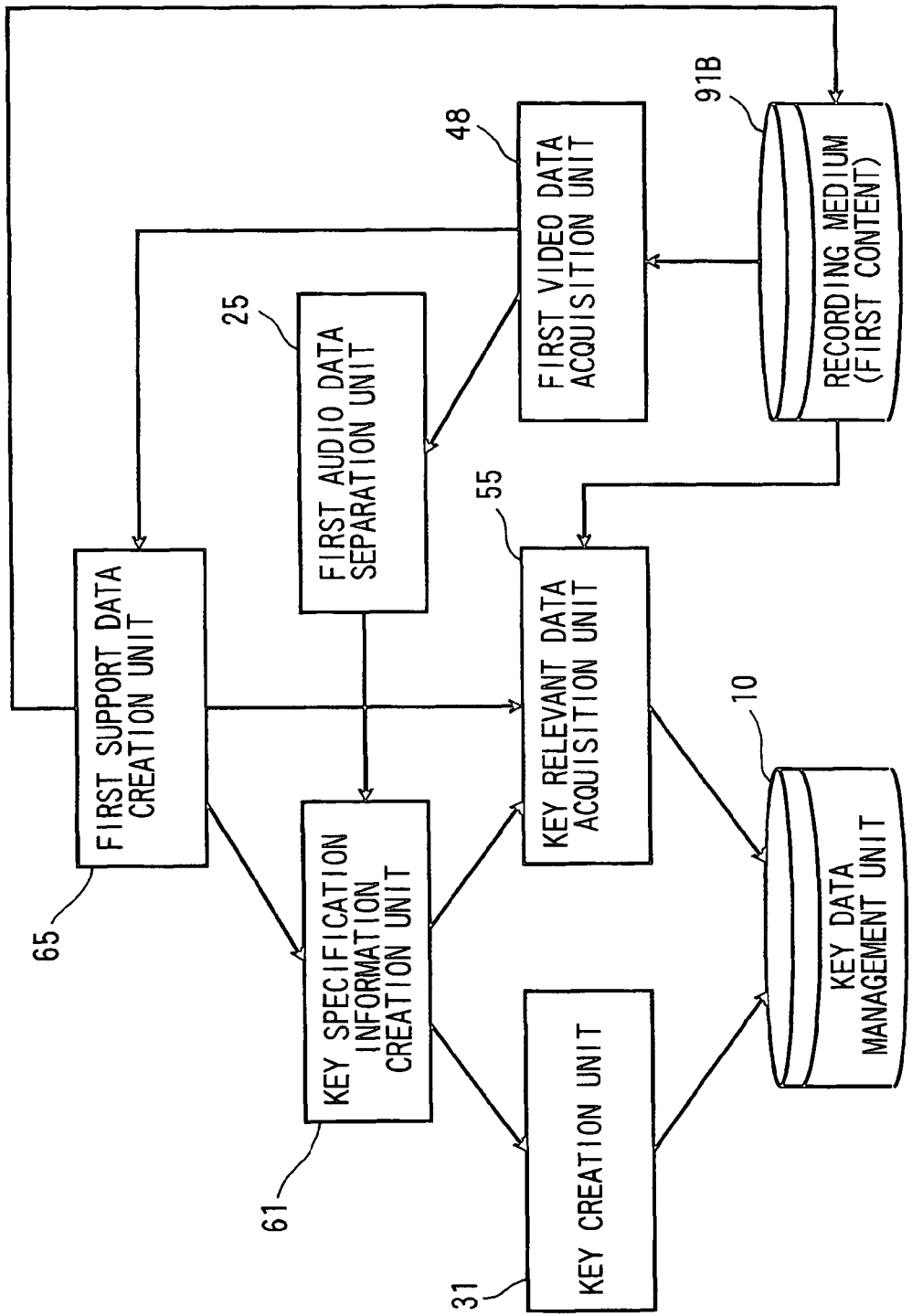
FIG. 27 is a block diagram showing a third structure of the video/audio processing apparatus of the eighth embodiment.

FIG. 27 is a block diagram showing a third structure of this embodiment.

A first support data creation unit 65 in FIG. 27 is different from the first support data creation unit 65 in FIG. 25 in that first support data is created based on video/audio data acquired in a first video data acquisition unit 48, not audio data separated in a first audio data separation unit 25.

Besides, the first video data acquisition unit 48 in FIG. 27 is different from the first video data acquisition unit 43 in FIG. 26 in that recording and processing are not performed on video/audio data acquired from the outside, but processing is performed on video/audio data recorded on a recording medium 91B.

Ninth Embodiment

A video/audio processing apparatus according to a ninth embodiment of the invention will be described with reference to FIGS. 28 and 29.

(1) Structure of the Video/Audio Processing Apparatus

Figure 28:
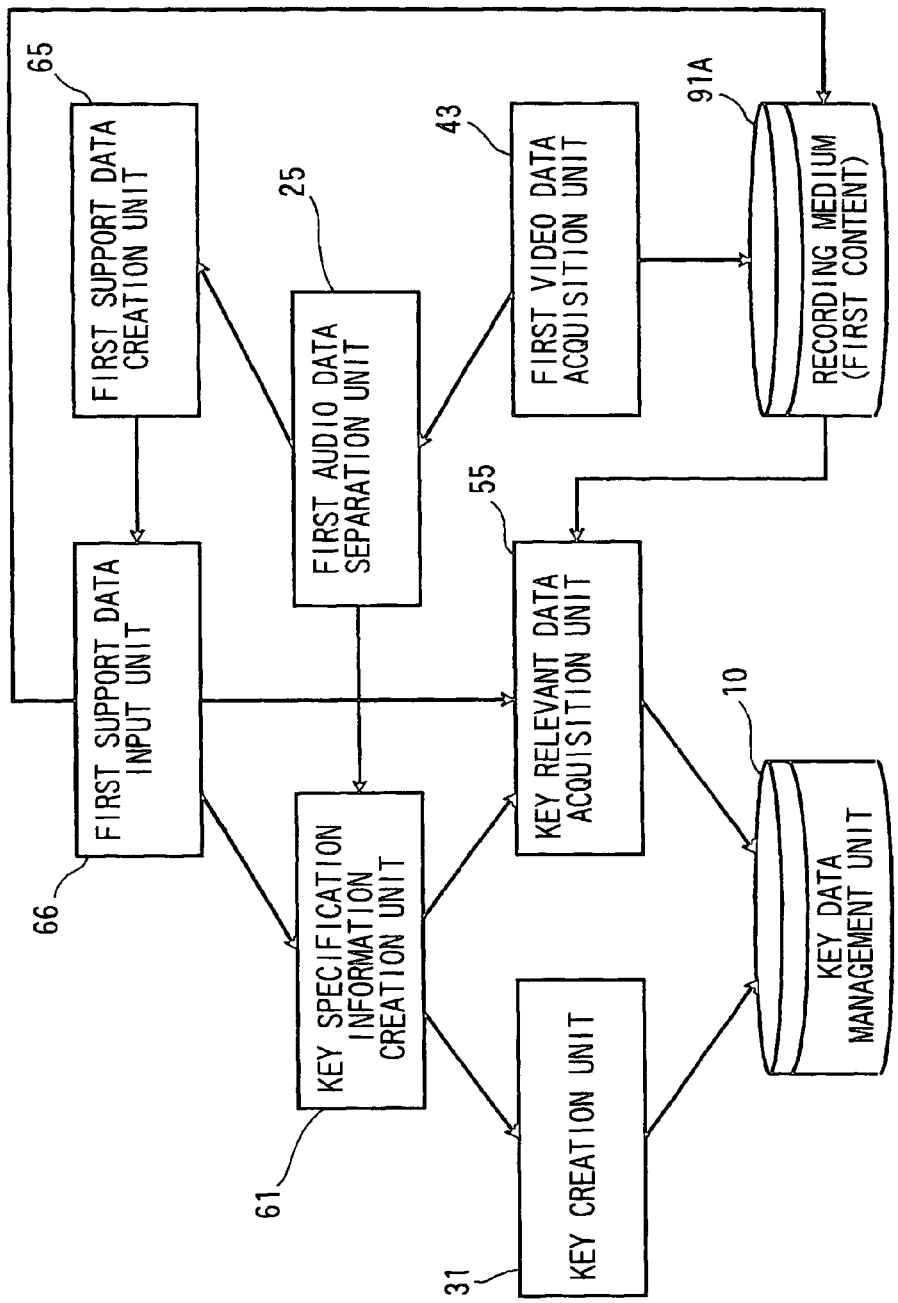
FIG. 28 is a block diagram showing a structure of a ninth embodiment of a video/audio processing apparatus of the invention.

FIG. 28 is a block diagram showing the structure of the video/audio processing apparatus of this embodiment.

The video/audio processing apparatus shown in FIG. 28 includes a first video data acquisition unit 43, a first audio data separation unit 25, a first support data creation unit 65, a first support data input unit 66, a key specification information creation unit 61, a key creation unit 31, a key relevant data acquisition unit 55, a recording medium 91A, and a key data management unit 10.

A different point between this embodiment and the seventh and the eighth embodiments is that both the first support data input unit 66 and the first support data creation unit 65 are provided.

The first support data creation unit 65 detects a change point of audio data separated in the first audio data separation unit 25 and creates support data. For example, a silence section is detected, and a division is made at its start point, end point, intermediate point or the like. Besides, switching of a sound-multiplex mode is detected, and a division may be made at a boundary between a main part portion of a monaural mode and a CM portion of a stereo mode.

The first support data input unit 66 inputs support data relating to first content based on or in addition to the support data created in the first support data creation unit 65, and records it on the recording medium 91A. The support data created in the first support data creation unit 65 may be displayed as a reference value on an input screen, or may be adopted as an initial value or a set value in the case where there is no input. For example, text information, such as a name of a CM, is inputted to a CM portion divided in the first support data creation unit 65.

The key specification information creation unit 61 determines a section, which is made a retrieval key, in the audio data delivered from the first audio data separation unit 25 on the basis of the time of the support data created in the first support data creation unit 65 or inputted in the first support data input unit.

The key relevant data acquisition unit 55 acquires key relevant data relevant to the section of the video/audio data specified in the key specification information creation unit 61. As the key relevant data, there exists the support data recorded on the recording medium 91A, the support data inputted in the first support data input unit 66, or the support data created in the first support data creation unit 65.

The first video data acquisition unit 43, the first audio data separation unit 25, the key creation unit 31, the recording medium 91A, and the key data management unit 10 are the same as those of the seventh embodiment, and their description will be omitted.

Incidentally, similarly to FIG. 24 in the seventh embodiment, also in this embodiment, instead of the first video data acquisition unit 43 to perform the recording and processing on the video/audio data acquired from the outside, the first video data acquisition unit 48 to perform the processing on the video/audio data recorded on the recording medium 91B may be provided.

(2) Another Structure of the Video/Audio Processing Apparatus

Figure 29:
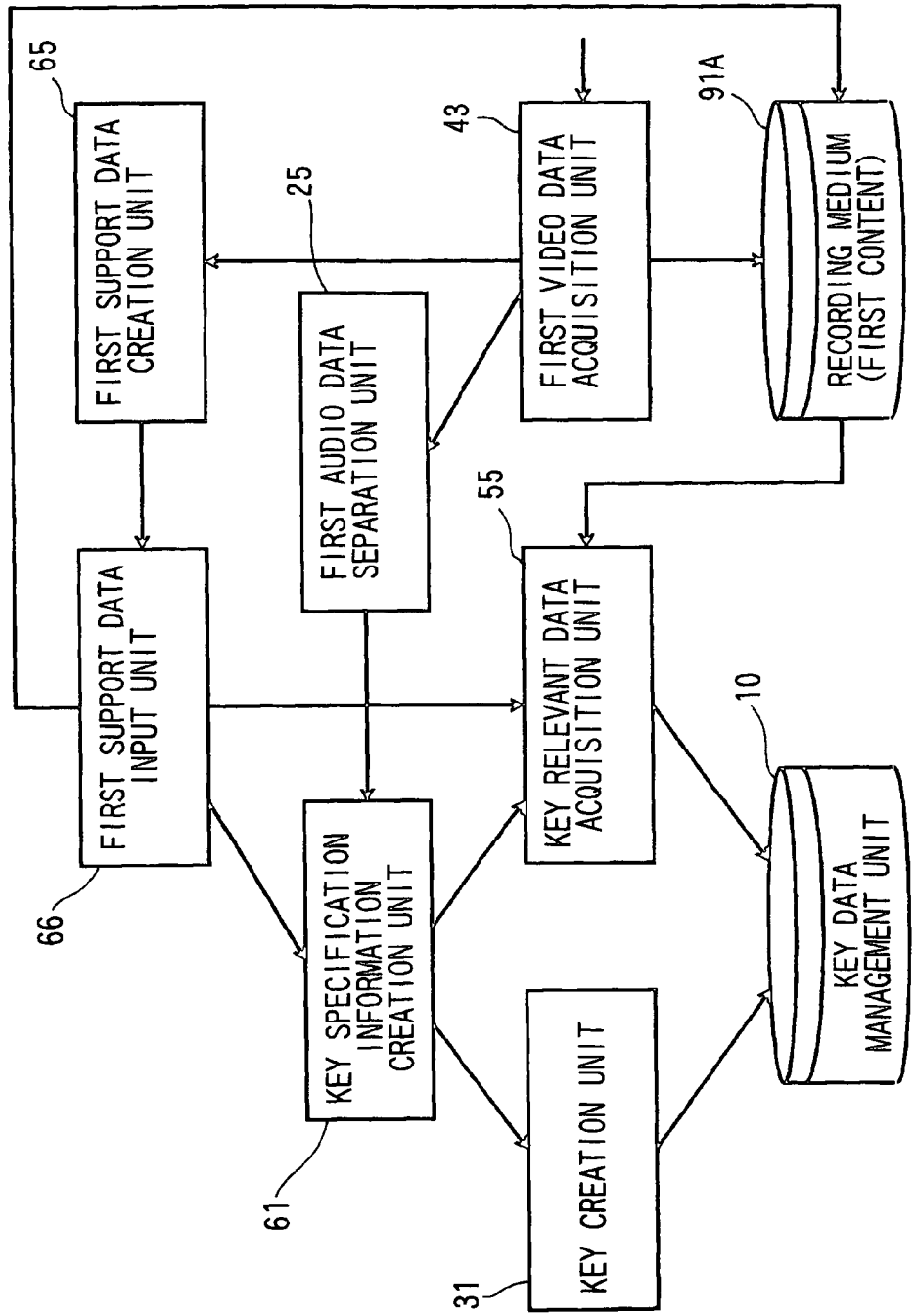
FIG. 29 is a block diagram showing another structure of the ninth embodiment.

FIG. 29 is a block diagram showing another structure of the video/audio processing apparatus of this embodiment.

Similarly to FIG. 26 in the eighth embodiment, a first support data creation unit 65 in FIG. 29 is different from the first support data creation unit 65 in FIG. 28 in that first support data is created based on video/audio data acquired in a first video data acquisition unit 43, not audio data separated in a first audio data separation unit 25. For example, switching (cut) of a video image is detected, and a division is made. By using audio data at the same time, a division may be made at a cut of a silence portion. Besides, as in JP-A-2005-130416, a division based on a similarity between video images may be made. Besides, in the case where a portion divided in the first support data creation unit 65 based on the similarity of video images is a topic unit, the first support data input unit 66 inputs text information such as a topic or a corner name.

Incidentally, similarly to FIG. 27 in the eighth embodiment, instead of the first video data acquisition unit 43 to perform the recording and processing on the video/audio data acquired from the outside, the first video data acquisition unit 48 to perform the processing on the video/audio data recorded on the recording medium 91B may be provided.

Tenth Embodiment

An audio processing apparatus according to a tenth embodiment of the invention will be described with reference to FIGS. 30 and 31.

A different point between this embodiment and the seventh embodiment is that although the video/audio data is processed in the seventh embodiment, only audio data is processed in this embodiment.

(1) Structure of the Audio Processing Apparatus

Figure 30:
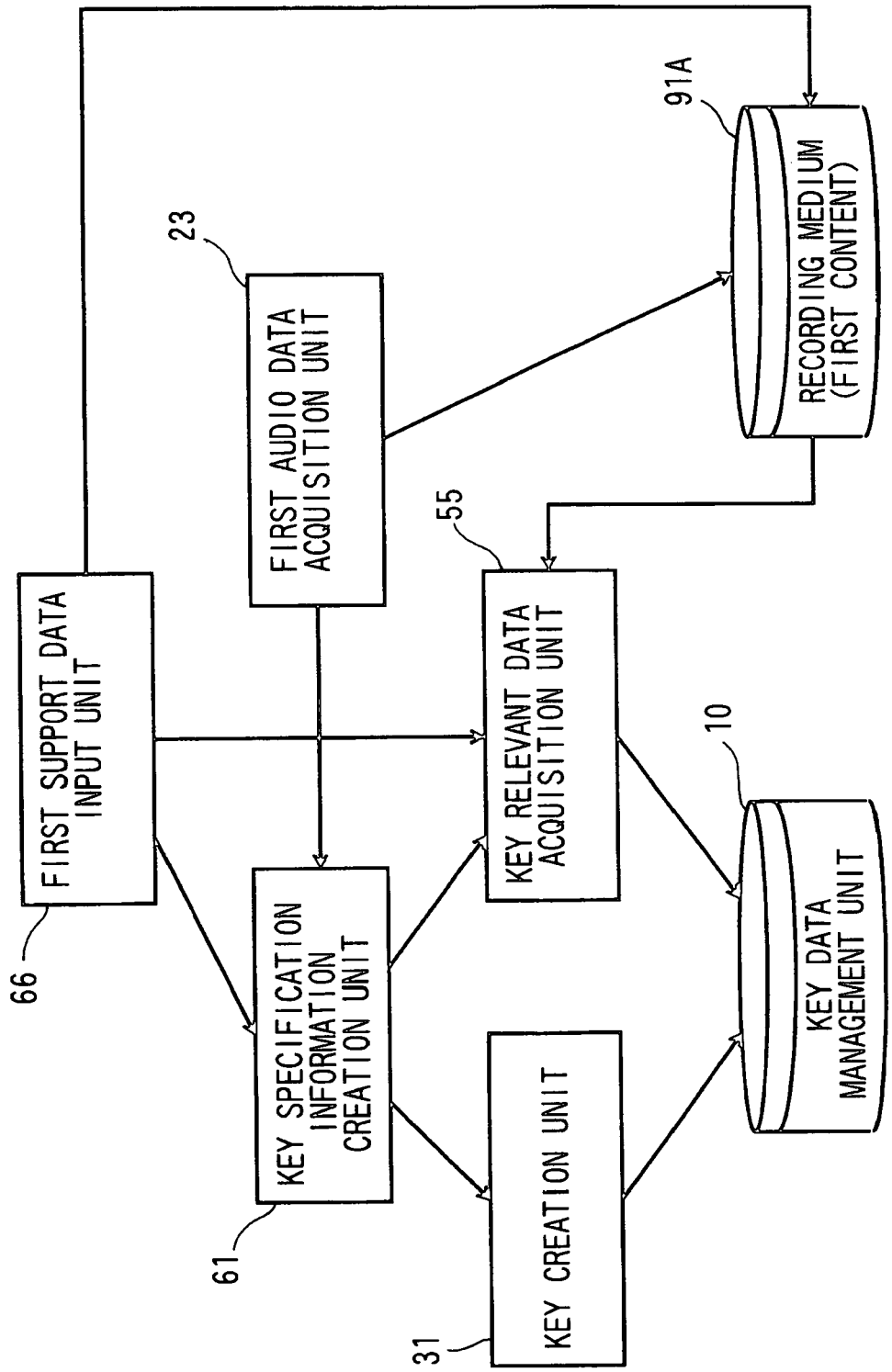
FIG. 30 is a block diagram showing a structure of a tenth embodiment of an audio processing apparatus of the invention.

FIG. 30 is a block diagram showing the structure of the audio processing apparatus of this embodiment.

The audio processing apparatus shown in FIG. 30 includes a first audio data acquisition unit 23, a first support data input unit 66, a key specification information creation unit 61, a key creation unit 31, a key relevant data acquisition unit 55, a recording medium 91A, and a key data management unit 10.

The first audio data acquisition unit 23 acquires audio data of first content relating to key creation from the outside, records it on the recording medium 91A, and delivers it to the key specification information creation unit 61.

The first support data input unit 66 inputs support data relating to the first content, and records it on the recording medium 91A.

The key specification information creation unit 61 determines a section, which is made a retrieval key, in the audio data delivered from the first audio data acquisition unit 23 on the basis of the time of the support data inputted in the first support data input unit 66.

The key relevant data acquisition unit 55 acquires key relevant data relevant to the section of the audio data specified in the key specification information creation unit 61. As the key relevant data, there exists the support data recorded on the recording medium 91A or the support data inputted in the first support data input unit 66. These first support data may include information relating to a program of the first content acquired from an electronic program guide or metadata provided by broadcast or from the outside, for example, as attributes of the program, a program title, a genre, broadcast date and time (a day of the week, time, date), a broadcast channel (broadcast station), a production source, a program group (program series, derivation source program) and the like.

The key creation unit 31, the recording medium 91A and the key data management unit 10 are the same as those of the seventh embodiment, and their description will be omitted.

(2) Another Structure of the Audio Processing Apparatus

Figure 31:
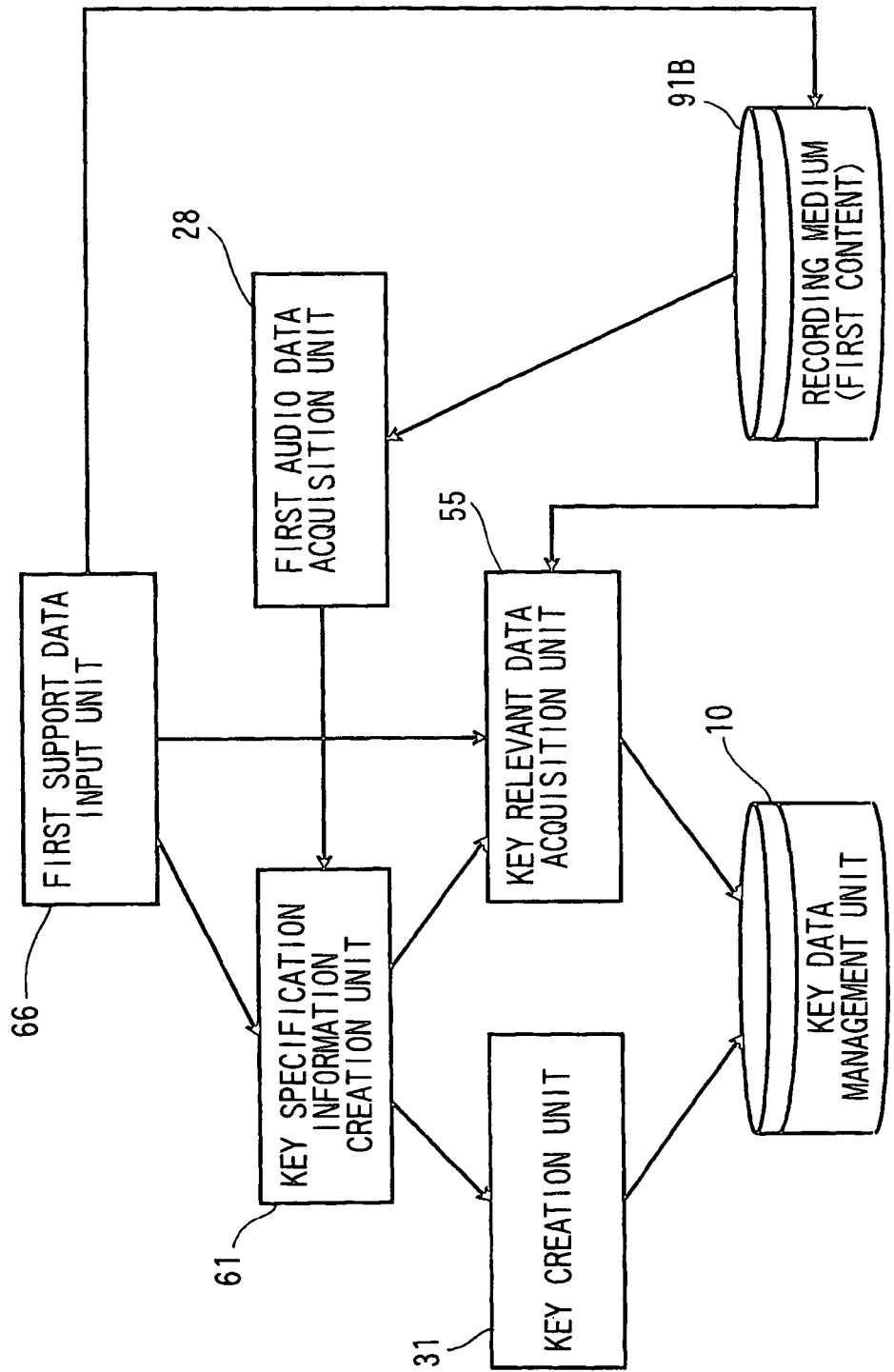
FIG. 31 is a block diagram showing another structure of the tenth embodiment.

FIG. 31 is a block diagram showing another structure of this embodiment.

A first audio data acquisition unit 28 in FIG. 31 is different from the first audio data acquisition unit 23 in FIG. 30 in that recording and processing are not performed on audio data acquired from the outside, but processing is performed on audio data recorded on a recording medium 91B.

The audio data or audio signals of first content are recorded on the recording medium 91B in advance. Besides, information for division into units, such as audio titles and chapters, and information relating to names of those, attributes and the like are recorded on the recording medium 91B.

Eleventh Embodiment

An audio processing apparatus according to an eleventh embodiment of the invention will be described with reference to FIG. 32.

A different point between this embodiment and the eighth embodiment is that although video/audio data is processed in the eighth embodiment, only audio data is processed in this embodiment.

Figure 32:
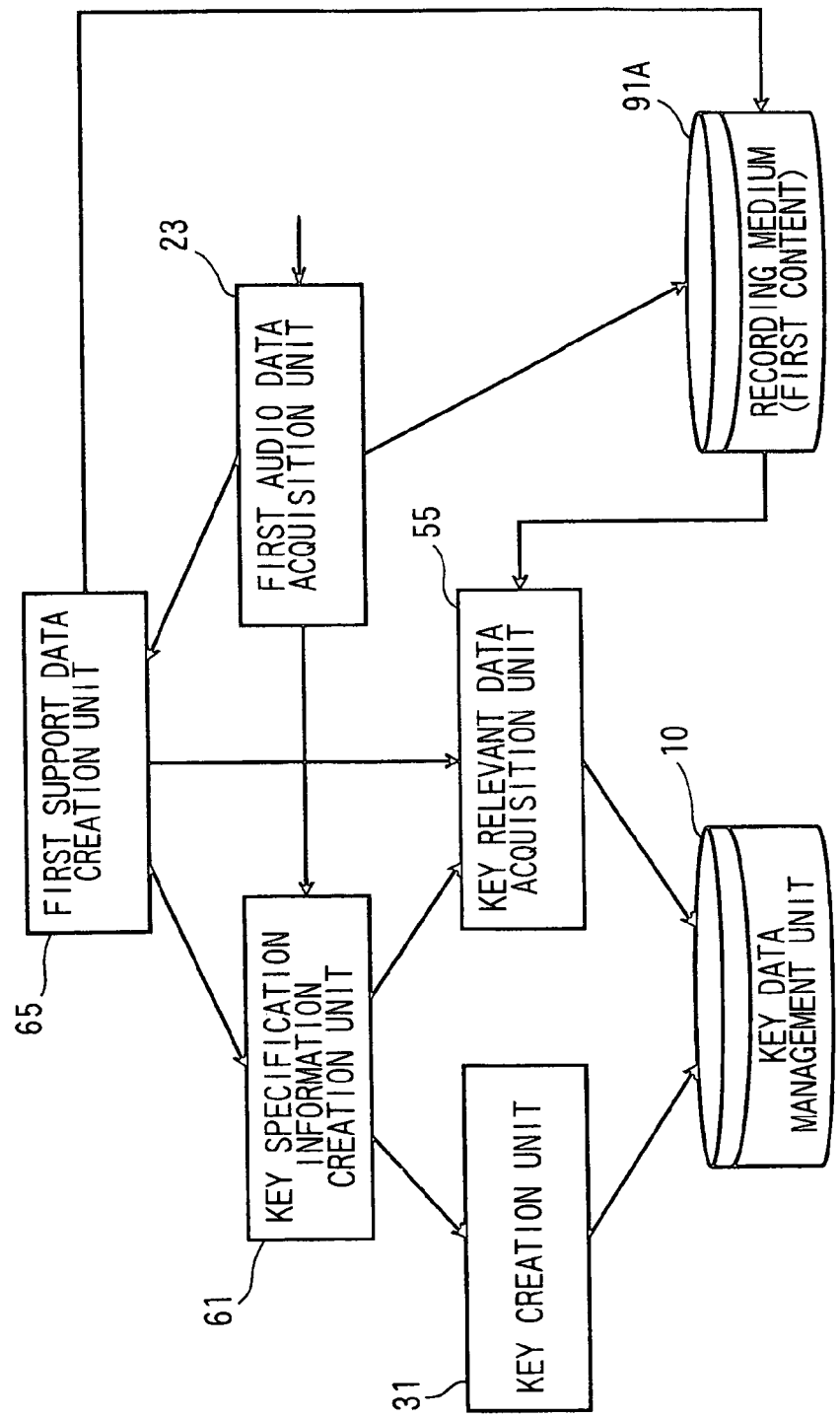
FIG. 32 is a block diagram showing a structure of an eleventh embodiment of an audio processing apparatus of the invention.

FIG. 32 is a block diagram showing the structure of the audio processing apparatus of this embodiment.

The audio processing apparatus shown in FIG. 32 includes a first audio data acquisition unit 23, a first support data creation unit 65, a key specification information creation unit 61, a key creation unit 31, a key relevant data acquisition unit 55, a recording medium 91A, and a key data management unit 10.

A different point between this embodiment and the tenth embodiment is that instead of the first support data input unit 66, the first support data creation unit 65 is provided.

The first support data creation unit 65 detects a change point of audio data acquired in the first audio data acquisition unit 23, creates first support data, and records it on the recording medium 91A. For example, a silence section is detected, and a division is made at its start point, end point, intermediate point or the like. Besides, switching of a sound-multiplex mode is detected, and a division may be made at a boundary between a main part portion of a monaural mode and a CM portion of a stereo mode.

The key specification information creation unit 61 determines a section, which is made a retrieval key, in the audio data delivered from the first audio data acquisition unit 23 on the basis of the time of the support data created in the first support data creation unit 65.

The key relevant data acquisition unit 55 acquires key relevant data relevant to the section of the audio data specified in the key specification information creation unit 61. As the key relevant data, there exists the support data recorded on the recording medium 91A or the support data created in the first support data creation unit 65.

The first audio data acquisition unit 23, the key creation unit 31, the recording medium 91A and the key data management unit 10 are the same as those of the tenth embodiment, and their description will be omitted.

Incidentally, similarly to FIG. 31 in the tenth embodiment, also in this embodiment, instead of the first audio data acquisition unit 23 to perform the recording and processing on the audio data acquired from the outside, the first audio data acquisition unit 28 to perform the processing on the audio data recorded on the recording medium 91B may be provided.

Twelfth Embodiment

An audio processing apparatus according to a twelfth embodiment of the invention will be described with reference to FIG. 33.

A different point between this embodiment and the ninth embodiment is that although video/audio data is processed in the ninth embodiment, only audio data is processed in this embodiment.

Figure 33:
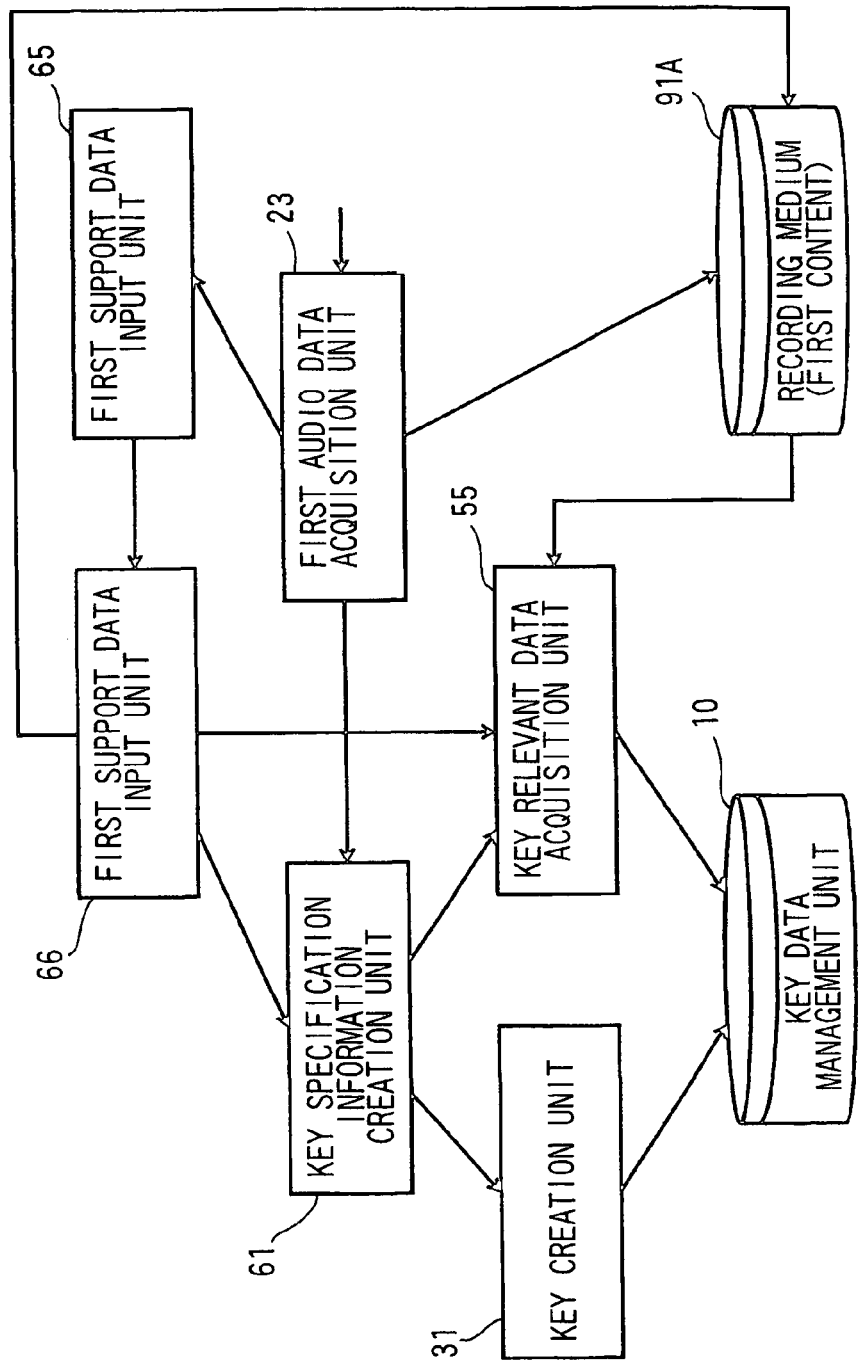
FIG. 33 is a block diagram showing a structure of a twelfth embodiment of an audio processing apparatus of the invention.

FIG. 33 is a block diagram showing the structure of the audio processing apparatus of this embodiment.

The audio processing apparatus shown in FIG. 33 includes a first audio data acquisition unit 23, a first support data creation unit 65, a first support data input unit 66, a key specification information creation unit 61, a key creation unit 31, a key relevant data acquisition unit 55, a recording medium 91A, and a key data management unit 10.

A different point between this embodiment and the tenth and the eleventh embodiments is that both the first support data input unit 66 and the first support data creation unit 65 are provided.

The first support data creation unit 65 detects a change point of audio data acquired in the first audio data acquisition unit 23 and creates support data. For example, a silence section is detected and a division is made at its start point, end point, intermediate point or the like. Besides, switching of a sound-multiplex mode is changed, and a division may be made at a boundary between a main part portion of a monaural mode and a CM portion of a stereo mode.

The first support data input unit 66 inputs support data relating to first content based on or in addition to the support data created in the first support data creation unit 65, and records it on the recording medium 91A. The support data created in the first support data creation unit 65 may be displayed as a reference value on an input screen, or may be adopted as an initial value or a set value in the case where there is no input. For example, text information, such as the name of a CM, is inputted to a CM portion divided in the first support data creation unit 65.

The key specification information creation unit 61 determines a section, which is made a retrieval key, in the audio data delivered from the first audio data acquisition unit 23 on the basis of the time of the support data created in the first support data creation unit 65 or inputted in the first support data input unit.

The key relevant data acquisition unit 55 acquires key relevant data relevant to the section of the video/audio data specified in the key specification information creation unit 61. As the key relevant data, there exists the support data recorded on the recording medium 91A, the support data inputted in the first support data input unit 66, or the support data created in the first support data creation unit 65.

The first audio data acquisition unit 23, the key creation unit 31, the recording medium 91A and the key data management unit 10 are the same as those of the tenth embodiment, and their description will be omitted.

Incidentally, similarly to FIG. 31 in the tenth embodiment, also in this embodiment, instead of the first audio data acquisition unit 23 to perform the recording and processing on the audio data acquired from the outside, the first audio data acquisition unit 28 to perform the processing on the audio data recorded on the recording medium 91B may be provided.

Thirteenth Embodiment

A video/audio processing apparatus according to a thirteenth embodiment of the invention will be described with reference to FIGS. 34, 35, 36 and 37.

The video/audio processing apparatus according to the thirteenth embodiment is an apparatus for creating key data, as the source of metadata, including a retrieval key and key relevant data in the case where the metadata is created as support data to support a user so that when the user reproduces, edits or retrieves video/audio data, the user can perform the reproduction, editing or retrieval in a desired operation. The video/audio processing apparatus of this embodiment has, in addition to the function, a function to cause the metadata as the support data to be recorded in the video/audio data as the use object data based on the key data.

A different point between this embodiment and the third embodiment is that a section which is made the retrieval key is not specified from the outside, but is determined based on the input of first support data.

(1) Structure of the Video/Audio Processing Apparatus

Figure 34:
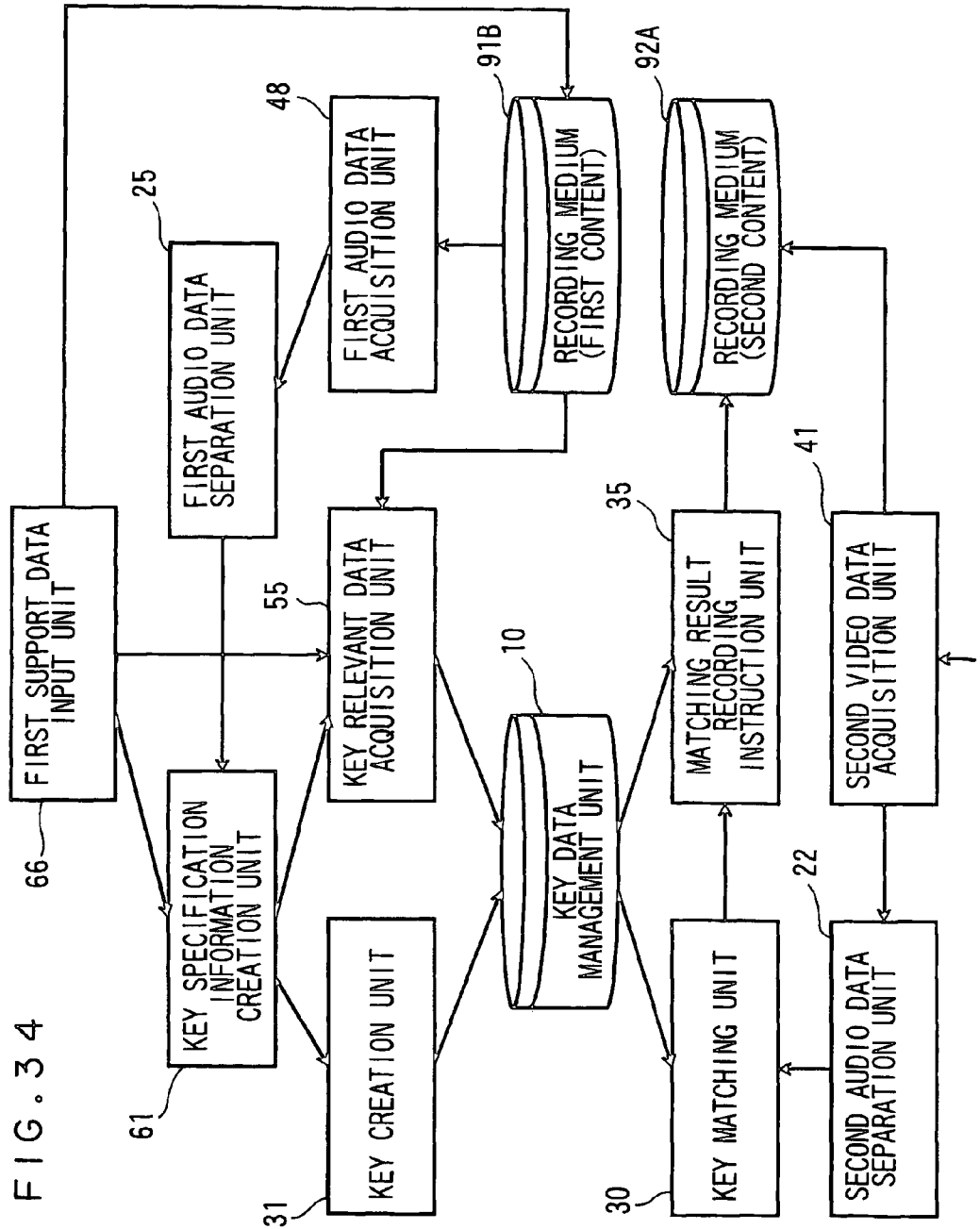
FIG. 34 is a block diagram showing a structure of a thirteenth embodiment of a video/audio processing apparatus of the invention.

FIG. 34 shows the structure of the video/audio processing apparatus of this embodiment.

The video/audio processing apparatus shown in FIG. 34 includes, as structural elements relating to key creation, a first video data acquisition unit 48, a first audio data separation unit 25, a first support data input unit 66, a key specification information creation unit 61, a key creation unit 31, a key relevant data acquisition unit 55, and a recording medium 91B on which first content is recorded. Besides, as structural elements relating to key retrieval, there are provided a second video data acquisition unit 41, a second audio data separation unit 22, a key matching unit 30, a matching result recording instruction unit 35, and a recording medium 92A for recording a second content. Further, as a common structural element, a key data management unit 10 is provided.

(2) Structural Elements Relating to the Key Creation

Although the structural elements relating to the key creation in this structure are the same as those of FIG. 24 of the seventh embodiment, the structure shown in FIG. 23 may be adopted.

Besides, the structural elements relating to the key creation in this embodiment may have the structure described in the eighth embodiment. In this case, a difference occurs in that instead of the first support data input unit 66, the first support data creation unit 65 is provided.

Further, the structural elements relating to the key creation in this embodiment may have the structure described in the ninth embodiment. In this case, a difference occurs in that both the first support data input unit 66 and the first support data creation unit 65 are provided.

Figure 35:
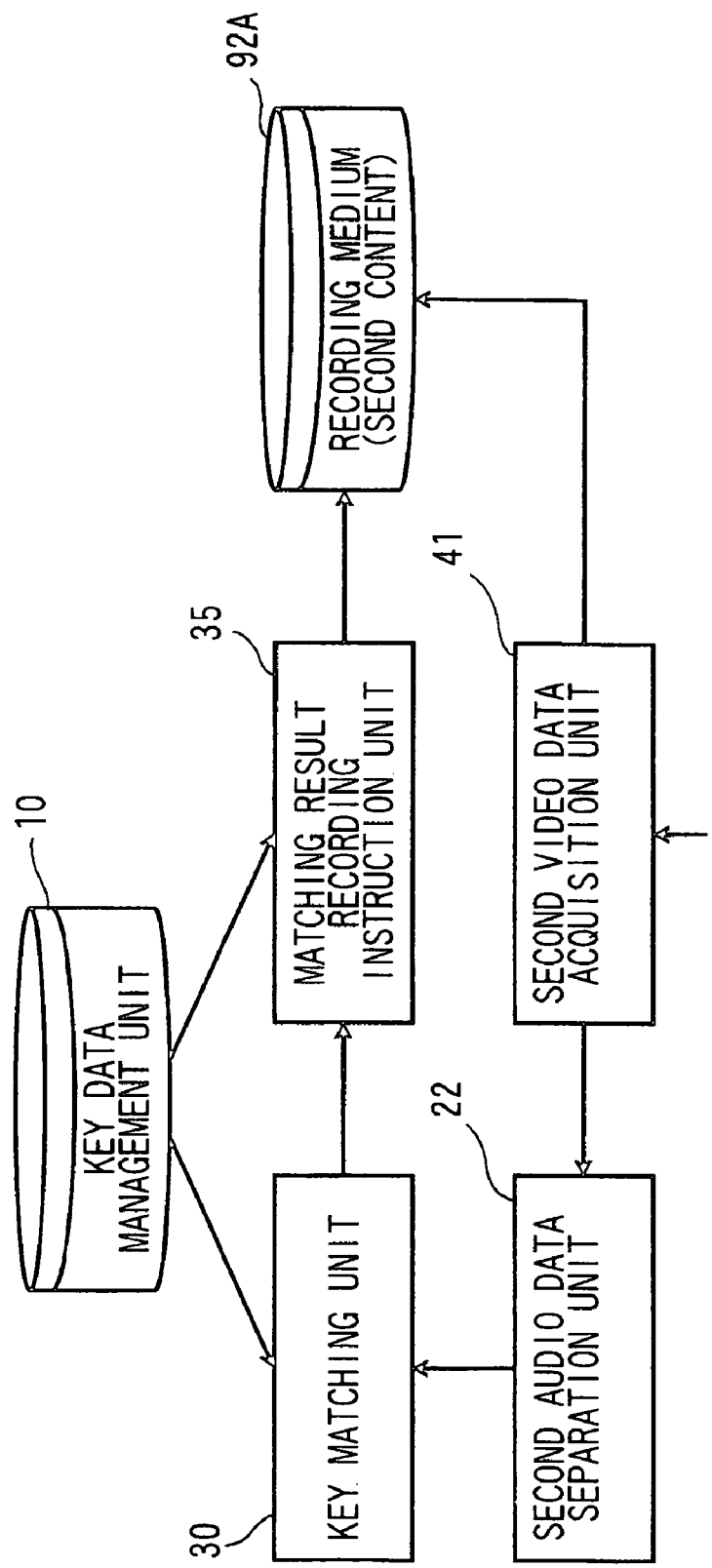
FIG. 35 is a block diagram showing a first structure of structural elements relating to key retrieval in the thirteenth embodiment.

(3) Structural Elements Relating to the Key Retrieval (3-1) First Structure of the Structural Elements Relating to the Key Retrieval FIG. 35 is a block diagram showing the first structure of the structural elements relating to the key retrieval in this embodiment.

The structural elements shown in FIG. 35 include a second video data acquisition unit 41, a second audio data separation unit 22, a key matching unit 30, a matching result recording instruction unit 35, a recording medium 92A for recording second content, and a key data management unit 10.

Figure 36:
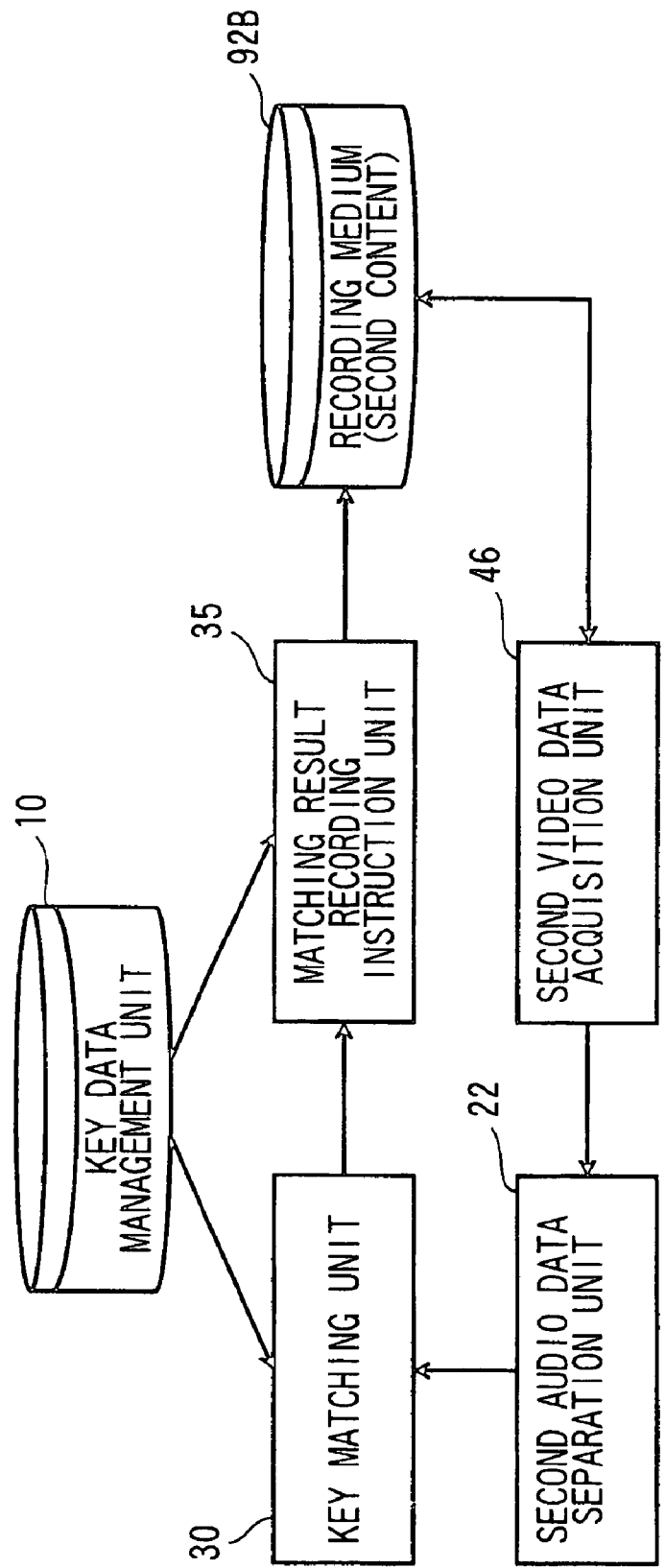
FIG. 36 is a block diagram showing another example of the first structure of the structural elements relating to the key retrieval in the thirteenth embodiment.

FIG. 36 is a block diagram showing another example of the first structure of the structural elements relating to the key retrieval in this embodiment.

A second video data acquisition unit 46 in FIG. 36 is different from the second video data acquisition unit 41 in FIG. 35 in that recording and processing are not performed on video/audio data acquired from the outside, but processing is performed on video/audio data recorded on a recording medium 92B.

The video/audio data or video/audio signals of the second content are recorded on the recording medium 92B in advance. Besides, information for division into units, such as video/audio titles and chapters, and information relating to those names and attributes are recorded on the recording medium 92B.

(3-2) Second Structure of the Structural Elements Relating to the Key Retrieval

Figure 37:
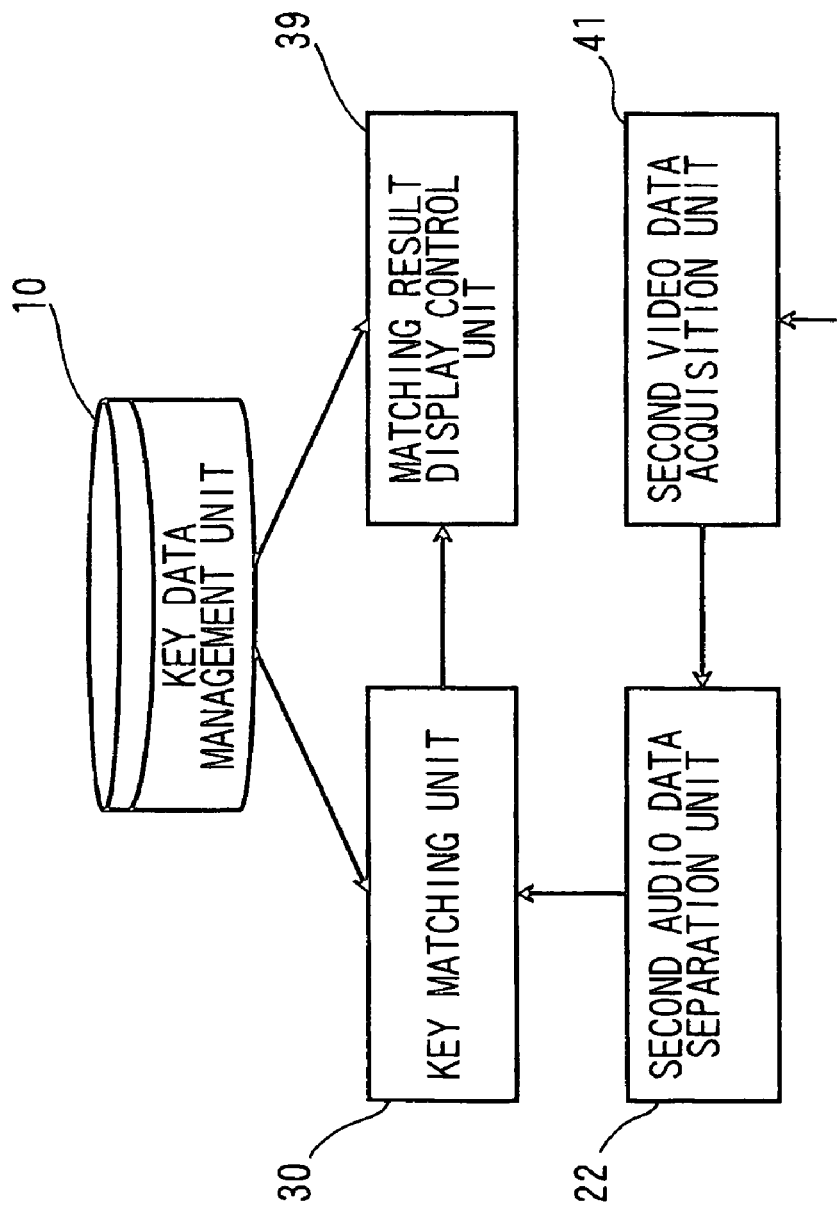
FIG. 37 is a block diagram showing a second structure of the structural elements relating to the key retrieval in the thirteenth embodiment.

FIG. 37 is a block diagram showing a second structure of the structural elements relating to the key retrieval in this embodiment.

In FIG. 37, instead of the matching result recording instruction unit 35, a matching result display control unit 39 is provided.

The matching result display control unit 39 acquires key data detected in a key matching unit 30 from a key data management unit 10. Then, according to the attribute of a retrieval key in this key data, a control is performed to carry out display as metadata on a not-shown display device. For example, text information such as a corner title, time information from a division position, figures and characters to represent the other attributes are displayed on the display device to display the second video data.

Incidentally, the matching result display control unit 39 can be provided in place of or in addition to the matching result recording instruction unit 35. Also with respect to the matching result recording instruction unit 35 in the third and the fourth embodiments, similarly, the matching result display control unit 39 can be provided in place of or in addition to that. The display device may be different from the video data display. Besides, the second video data acquisition unit 41 does not perform recording on the video/audio data acquired from the outside, but may perform only processing thereon, and the recording medium 92A may not be provided.

(3-3) Third Structure of the Structural Elements Relating to the Key Retrieval

Figure 38:
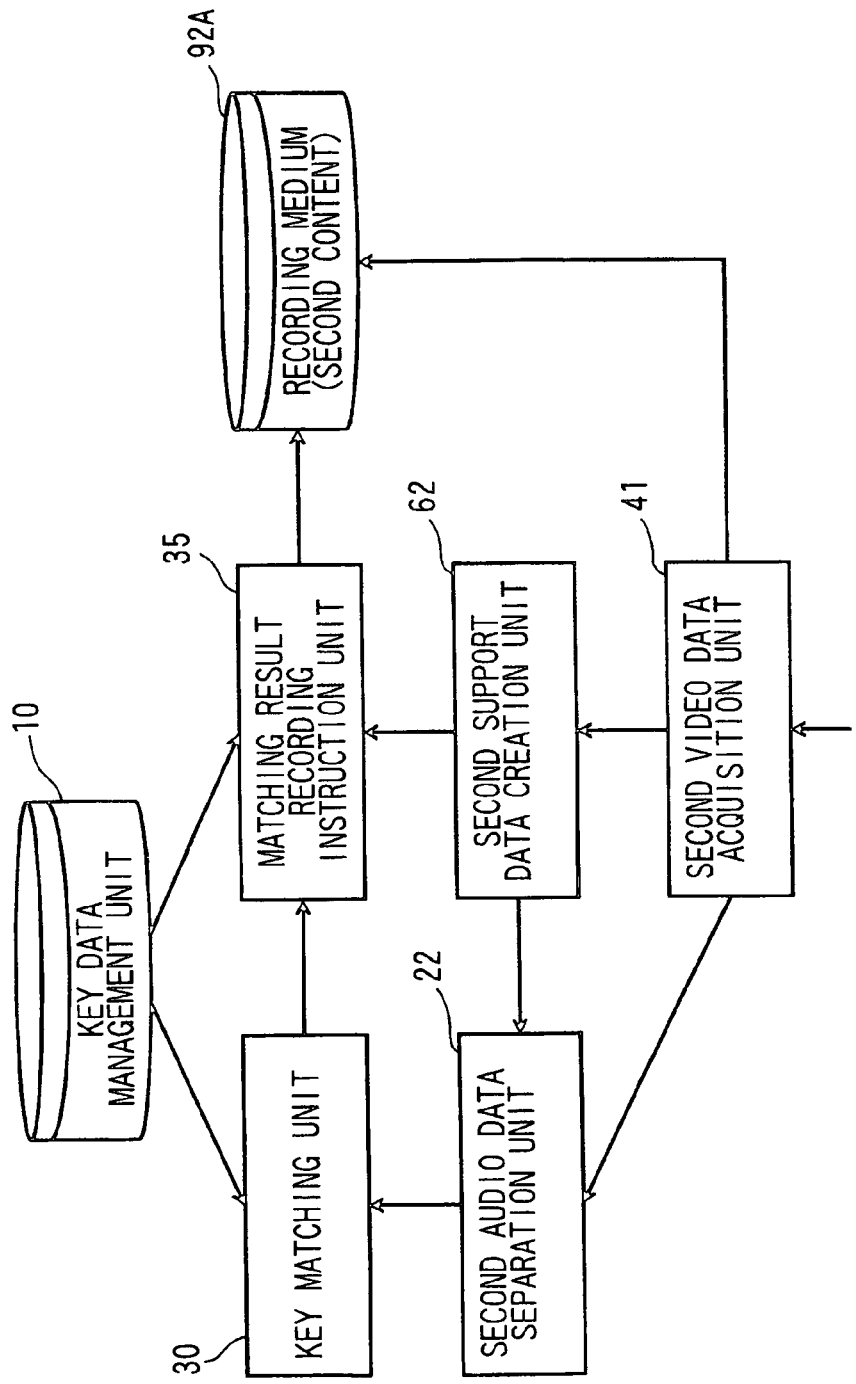
FIG. 38 is a block diagram showing a third structure of the structural elements relating to the key retrieval in the thirteenth embodiment.

FIG. 38 is a block diagram showing a third structure of the structural elements relating to the key retrieval in this embodiment.

In FIG. 38, in addition to the first structure shown in FIG. 35, a second support data creation unit 62 is provided.

The second support data creation unit 62 detects a change point of video data, and creates second support data. For example, a cut of a video image is detected, and information for division is created. Audio data may be used at the same time, or a division based on a similarity between video images may be made.

A matching result recording instruction unit 35 creates support data relating to second content, in addition to the second support data created in the second support data creation unit 62, and records it on a recording medium 92A. For example, text information, such as a name of a corner, is created in a portion divided in the second support data creation unit 62.

Figure 39:
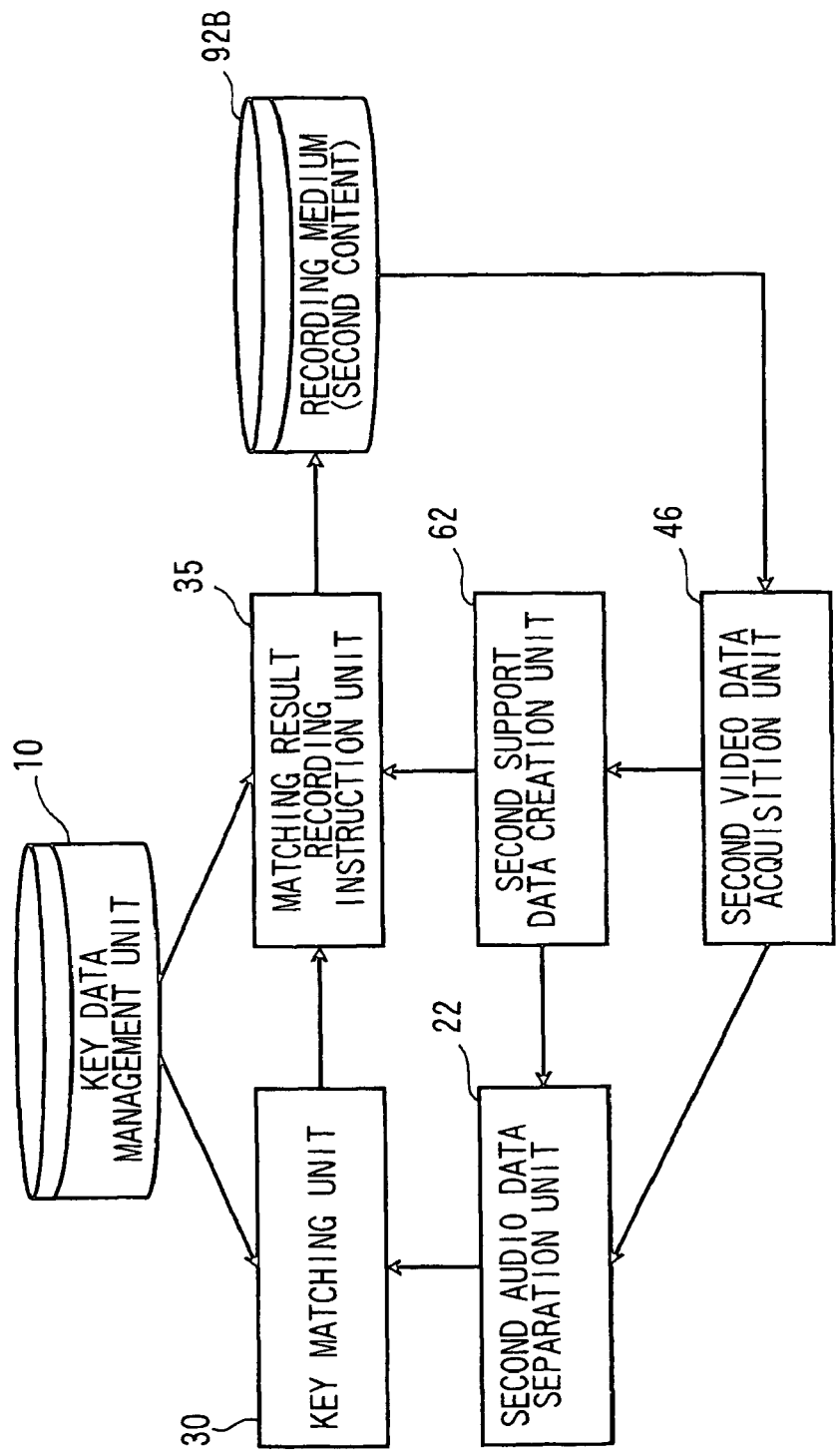
FIG. 39 is a block diagram showing another example of the third structure of the structural elements relating to the key retrieval in the thirteenth embodiment.

FIG. 39 is a block diagram showing another example of the third structure of the structural elements relating to the key retrieval in this embodiment.

A second video data acquisition unit 46 in FIG. 39 is different from the second video data acquisition unit 41 in FIG. 38 in that recording and processing are not performed on video/audio data acquired from the outside, but processing is performed on video/audio data recorded on a recording medium 92B.

(3-4) Fourth Structure of the Structural Elements Relating to the Key Retrieval

Figure 40:
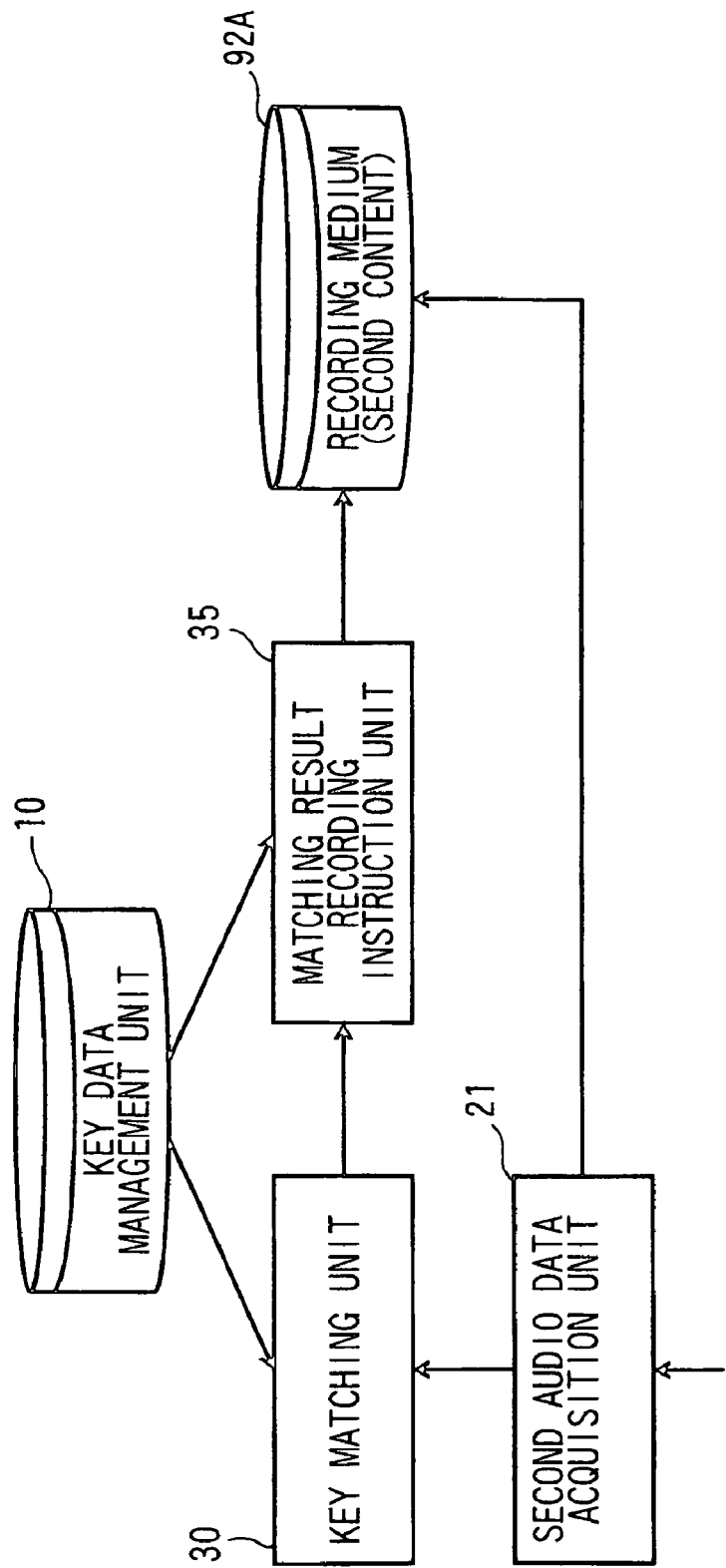
FIG. 40 is a block diagram showing a fourth structure of the structural elements relating to the key retrieval in the thirteenth embodiment.

FIG. 40 is a block diagram showing the fourth structure of the structural elements relating to the key retrieval in this embodiment.

A different point between this structure and the first structure is that although the video/audio data is processed in the first structure, only audio data is processed in this structure.

Figure 41:
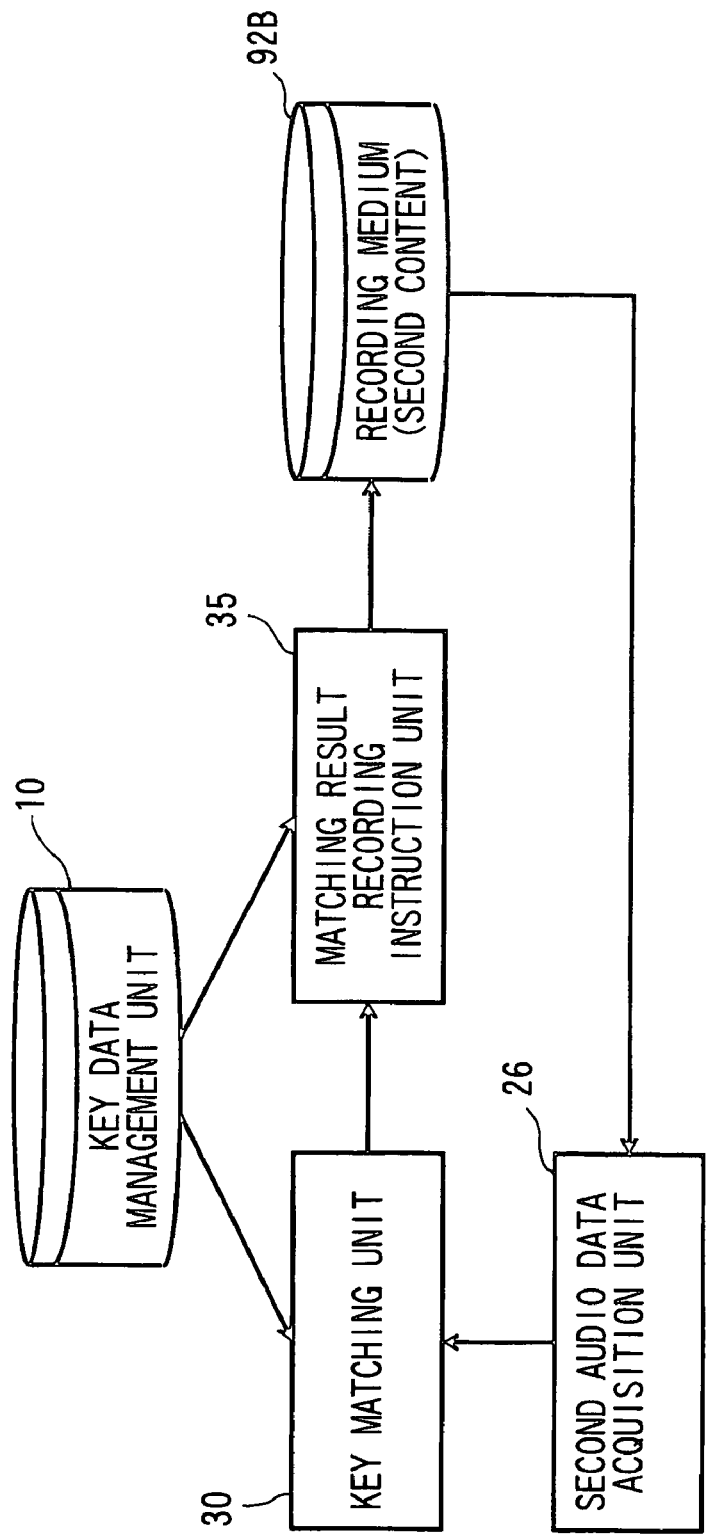
FIG. 41 is a block diagram showing another example of the fourth structure of the structural elements relating to the key retrieval in the thirteenth embodiment.

FIG. 41 is a block diagram showing another example of the fourth structure.

A second audio data acquisition unit 26 in FIG. 41 is different from the second audio data acquisition unit 21 in FIG. 40 in that processing is not performed on audio data acquired from the outside, but processing is performed on audio data recorded on a recording medium 92B.

The audio data or audio signals of second content are recorded on the recording medium 92B in advance. Besides, information for division into units, such as audio titles and chapters, and information relating to those names and attributes are recorded on the recording medium 92B.

(3-5) Fifth Structure of the Structural Elements Relating to the Key Retrieval

Figure 42:
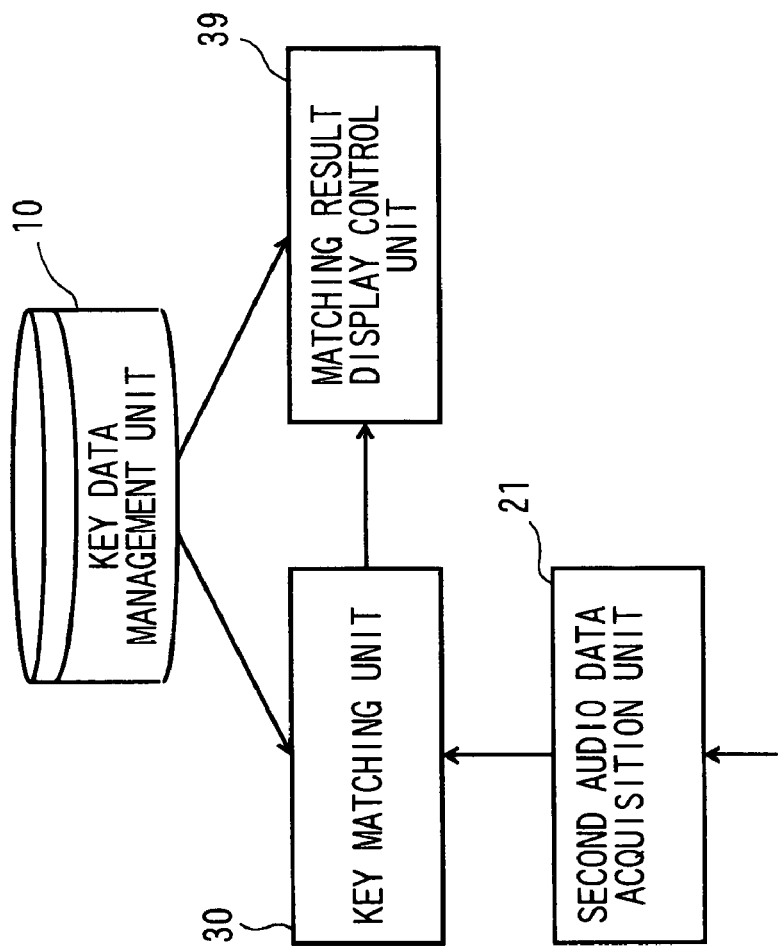
FIG. 42 is a block diagram showing a fifth structure of the structural elements relating to the key retrieval in the thirteenth embodiment.

FIG. 42 is a block diagram showing a fifth structure of the structural elements relating to the key retrieval in this embodiment.

A different point between this structure and the second structure is that although the video/audio data is processed in the second structure, only audio data is processed in this structure.

Fourteenth Embodiment

A video/audio processing apparatus according to a fourteenth embodiment of the invention will be described with reference to FIGS. 43, 44 and 45.

The video/audio processing apparatus according to the fourteenth embodiment is an apparatus for creating key data, as the source of metadata, including a retrieval key and key relevant data in the case where the metadata is created as support data to support a user so that when the user reproduces, edits or retrieves video/audio data, the user can perform the reproduction, editing or retrieval in a desired operation. The video/audio processing apparatus of this embodiment has, in addition to the function, a function to selectively acquire video/audio data as the use object data based on the key data and to cause the metadata as the support data to be recorded.

Figure 43:
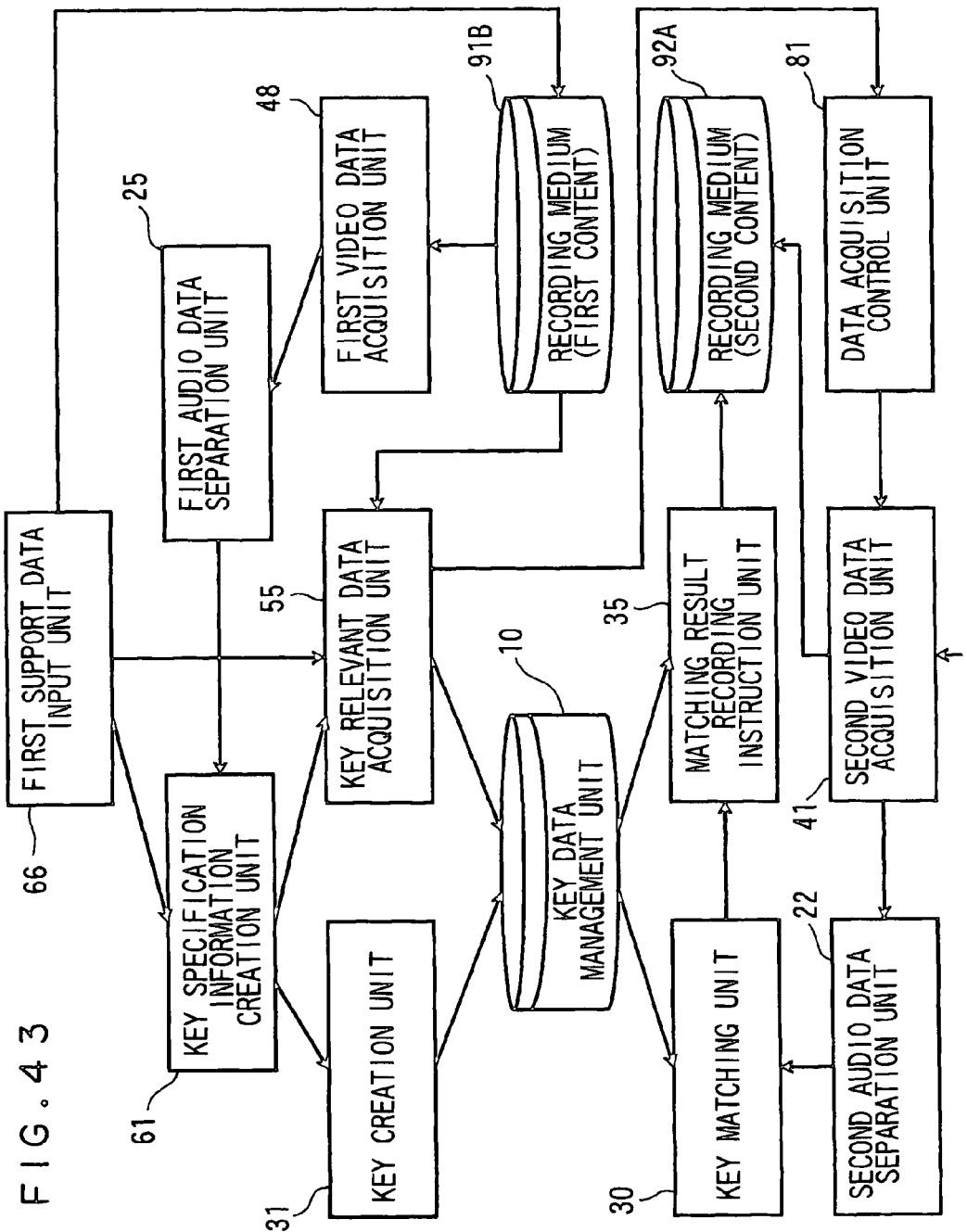
FIG. 43 is a block diagram showing a structure of a fourteenth embodiment of a video/audio processing apparatus of the invention.

FIG. 43 is a block diagram showing the structure of the video/audio processing apparatus according to the fourteenth embodiment of the invention.

A different point between this embodiment and the thirteenth embodiment is that a data acquisition control unit 81 is provided.

(1) Structure of the Video/Audio Processing Apparatus

FIG. 43 shows the structure of the video/audio processing apparatus according to this embodiment.

The video/audio processing apparatus shown in FIG. 43 includes, as structural elements relating to key creation, a first video data acquisition unit 48, a first audio data separation unit 25, a first support data input unit 66, a key specification information creation unit 61, a key creation unit 31, a key relevant data acquisition unit 55 and a recording medium 91B on which first content is recorded. Besides, as structural elements relating to key retrieval, there are provided a data acquisition control unit 81, a second video data acquisition unit 41, a second audio data separation unit 22, a key matching unit 30, a matching result recording instruction unit 35 and a recording medium 92A for recording second content. Further, as a common structural elements, a key data management unit 10 is provided.

(2) Structural Elements Relating to the Key Creation

As the structural elements relating to the key creation in this embodiment, although those similar to FIG. 24 of the seventh embodiment are exemplified, similarly to the case of the thirteenth embodiment, any structure described in the seventh to the ninth embodiments may be adopted. That is, the first support data creation unit 65 may be provided instead of or in addition to the first support data input unit 66, or the first video data acquisition unit 43 to perform recording and processing to the recording medium 91A and on video/audio data acquired from the outside may be provided instead of the first video data acquisition unit 48 to perform processing on video/audio data recorded on the recording medium 91B.

Besides, similarly to the first embodiment, there may be provided a recording medium 91B, a first video data acquisition unit 48, a video data specification unit 47, a first audio data separation unit 25, a key creation unit 31, a key relevant data acquisition unit 55 and a key data management unit 10. The first video data acquisition unit 43 to perform recording and processing to the recording medium 91A and on video/audio data acquired from the outside may be provided instead of the first video data acquisition unit 48 to perform processing on video/audio data recorded on the recording medium 91B.

(3) Structural Elements Relating to the Key Retrieval

Figure 44:
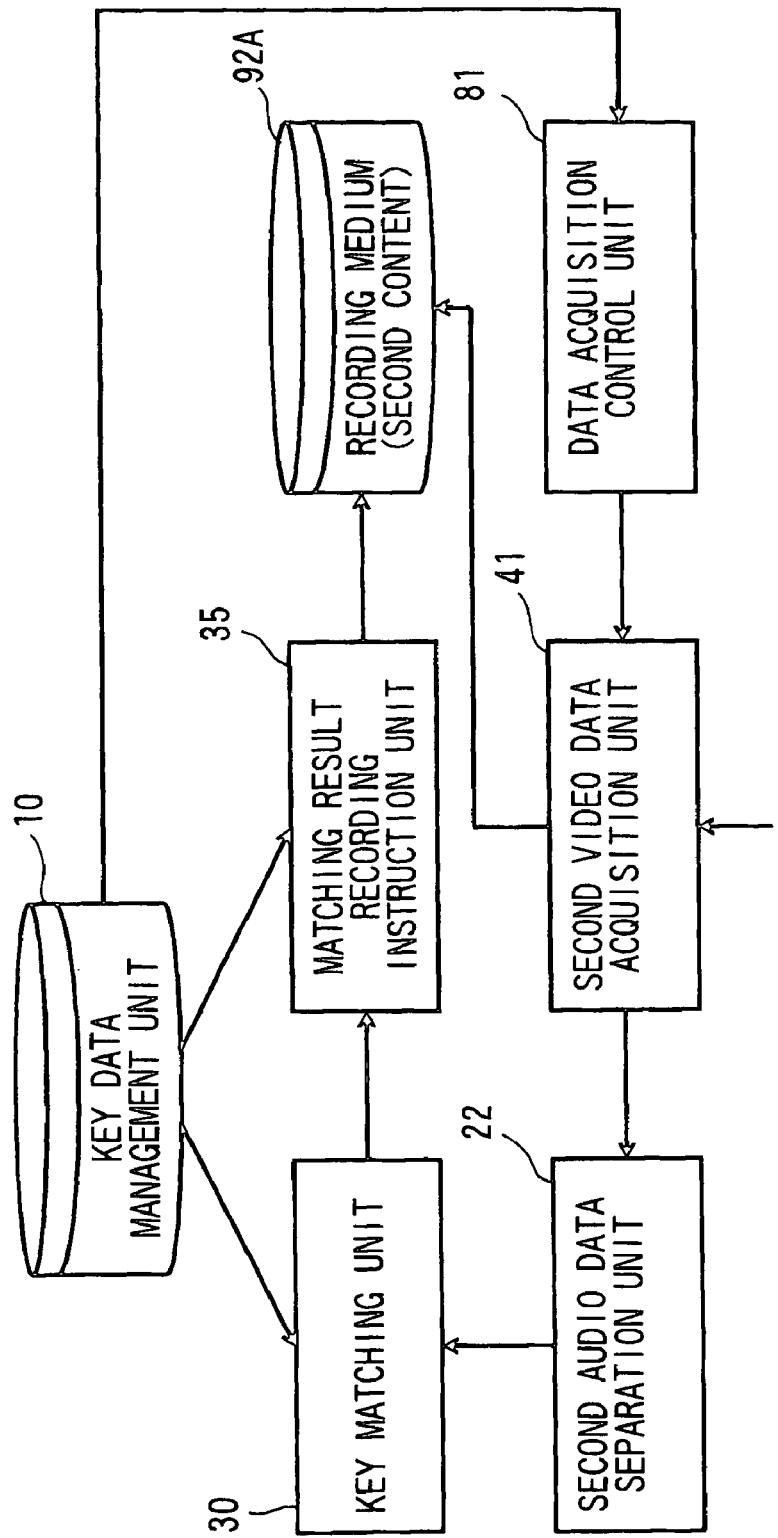
FIG. 44 is a block diagram showing structural elements relating to key retrieval in the fourteenth embodiment.

FIG. 44 is a block diagram showing the structural elements relating to the key retrieval in this embodiment.

The structural elements shown in FIG. 44 include a data acquisition control unit 81, a second video data acquisition unit 41, a second audio data separation unit 22, a key matching unit 30, a matching result recording instruction unit 35, a recording medium 92A for recording second content, and a key data management unit 10.

The data acquisition control unit 81 performs a control to limit data acquired from the outside in the second video data acquisition unit 41 to those satisfying a predetermined condition. For example, the attribute of a program relating to the data acquired from the outside is acquired based on an electronic program guide or program metadata, and only video/audio data of the program coincident with or partially coincident with the attribute of the program of the first content acquired as the key relevant data in the key relevant data acquisition unit 55 is acquired. A program satisfying a predetermined condition is specified or retrieved in advance, and channel setting is automatically performed at the time of program broadcast to perform reception, and automatic processing may be performed (reservation).

Only video/audio data of programs coincident or partially coincident with each other in, as the condition relating to the attributes of the programs, a program title, a genre, broadcast date and time (a day of the week, time, date), a broadcast channel (broadcast station), a production source, a program group (program series, derivation source program) and the like are acquired. By this, it is possible to avoid the occurrence of such a situation that a load is increased by performing a processing on irrelevant video/audio data or support data is erroneously created.

Figure 45:
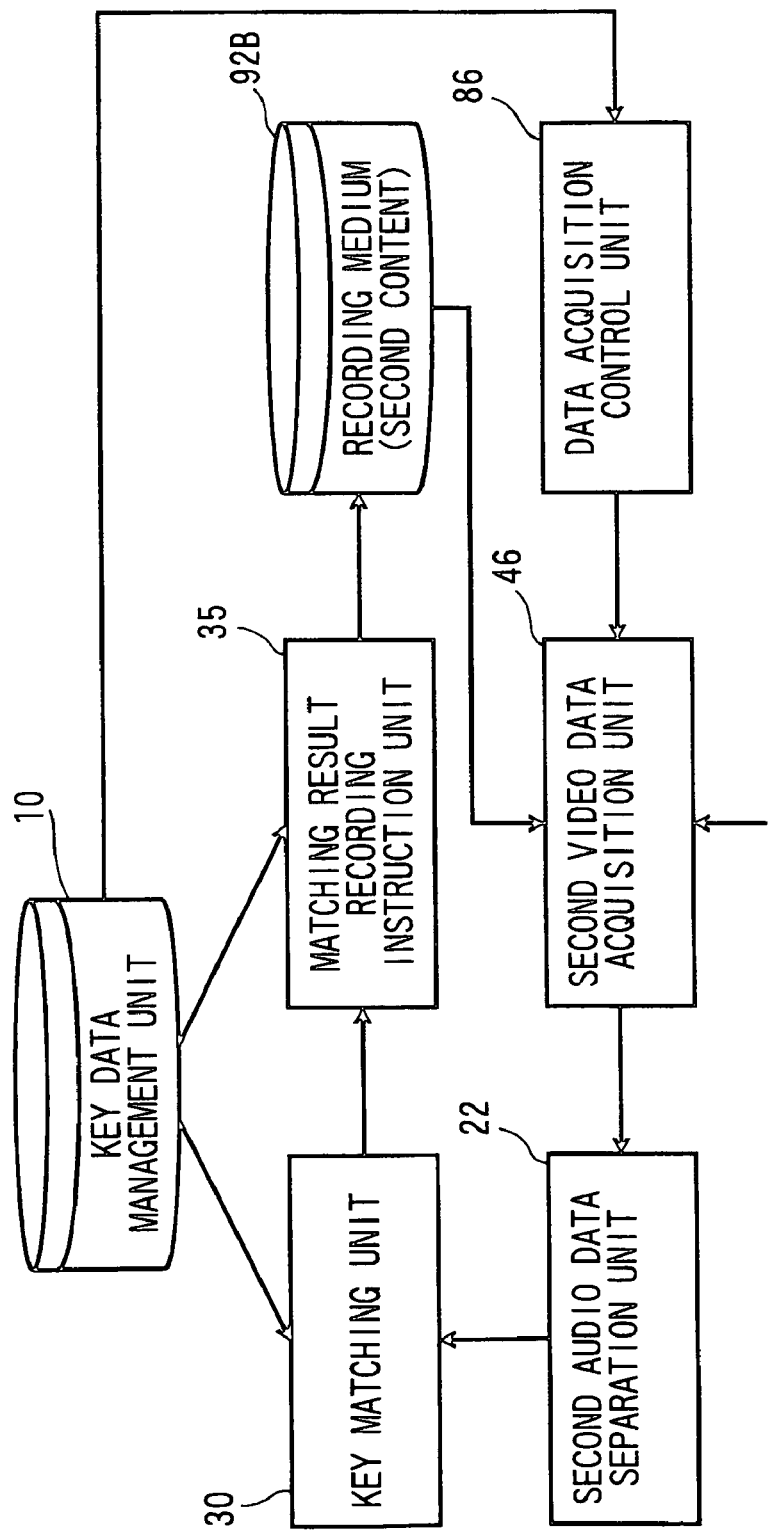
FIG. 45 is a block diagram showing another example of the structural elements relating to the key retrieval in the fourteenth embodiment.

FIG. 45 is a block diagram showing another example of the structural elements relating to the key retrieval in this embodiment.

A second video data acquisition unit 46 in FIG. 45 is different from the second video data acquisition unit 41 in FIG. 44 in that recording and processing are not performed on video/audio data acquired from the outside, but processing is performed on video/audio data recorded on a recording medium 92B.

A data acquisition control unit 86 performs a control to limit data to be acquired in the second video data acquisition unit 46 to those satisfying a predetermined condition among the recoded data. For example, attributes of programs relating to the recorded video data are acquired based on support data including program metadata, and only video/audio data of programs coincident with or partially coincident with the attribute of a program of first content acquired as key relevant data in the key relevant data acquisition unit 55 is acquired.

The key relevant data acquisition unit 55 acquires the key relevant data relevant to a section of video/audio data specified in the key specification information creation unit 61. As the key relevant data, there exists the support data recorded on the recording medium 91B or the support data inputted in the first support data input unit 66. These first support data may include information relating to a program of the first content acquired from an electronic program guide or metadata provided by broadcast or from the outside, for example, as attributes of the program, a program title, a genre, broadcast date and time (a day of the week, time, date), a broadcast channel (broadcast station), a production source, a program group (program series, derivation source program) and the like.

(5) Processing in the Video/Audio Processing Apparatus

Next, processing in the video/audio processing apparatus of this embodiment will be described with reference to FIGS. 46 to 50.

Figure 46:
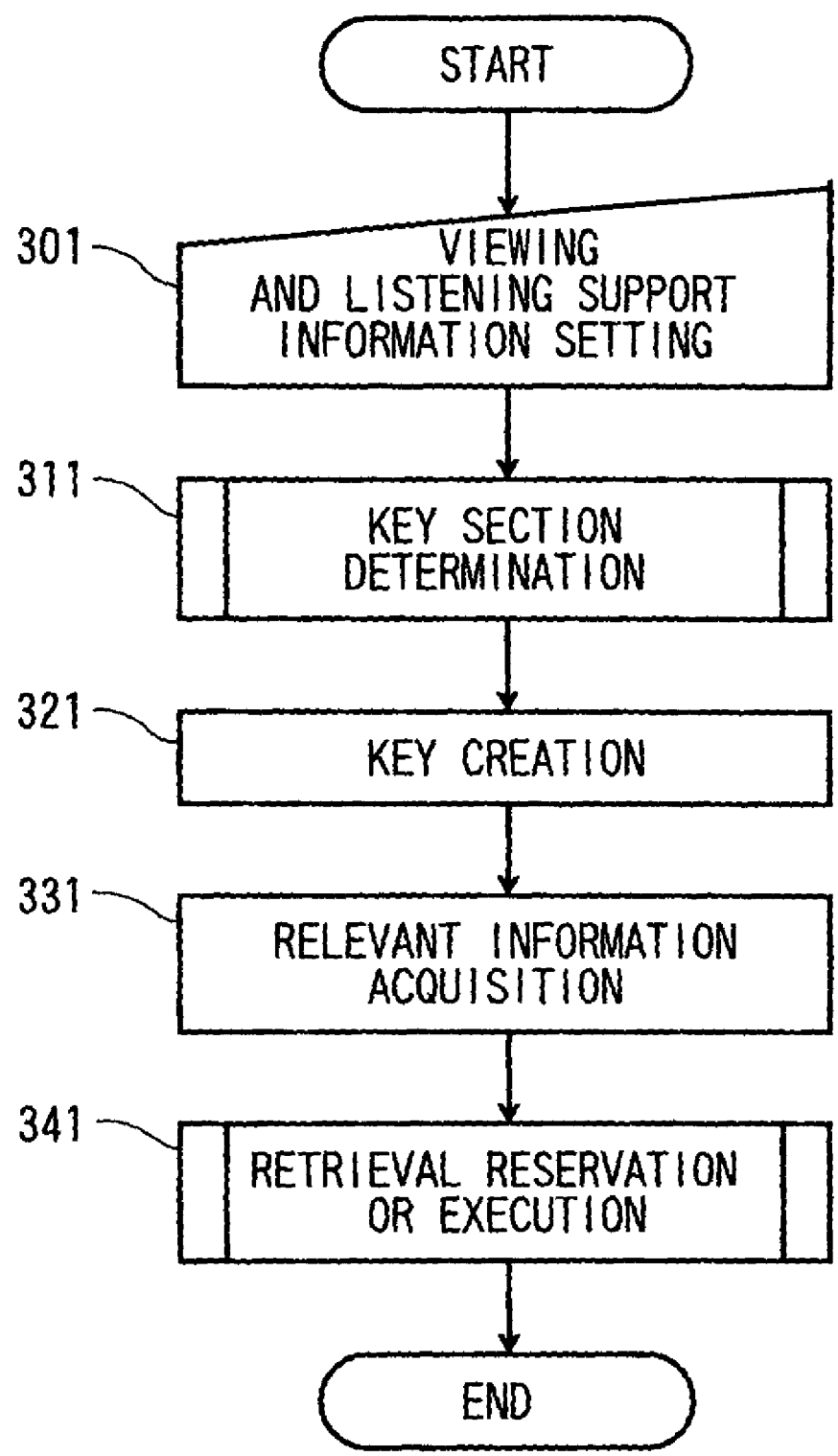
FIG. 46 is a flowchart showing a processing in the fourteenth embodiment.

FIG. 46 is a flowchart showing a processing in this embodiment.

In the first support data input unit 66, viewing and listening support information is set [viewing and listening support information setting] (step S301).

In the key specification information creation unit 61, a key section is determined [key section determination] (step S311).

In the key creation unit 31, a key is created [key creation] (step S321).

In the key relevant data acquisition unit 55, relevant information is acquired [relevant information acquisition] (step S331).

In the data acquisition control unit 81, retrieval reservation is performed or in the data acquisition control unit 86 or the like, execution is performed [retrieval reservation or execution] (step S341)

Figure 47:
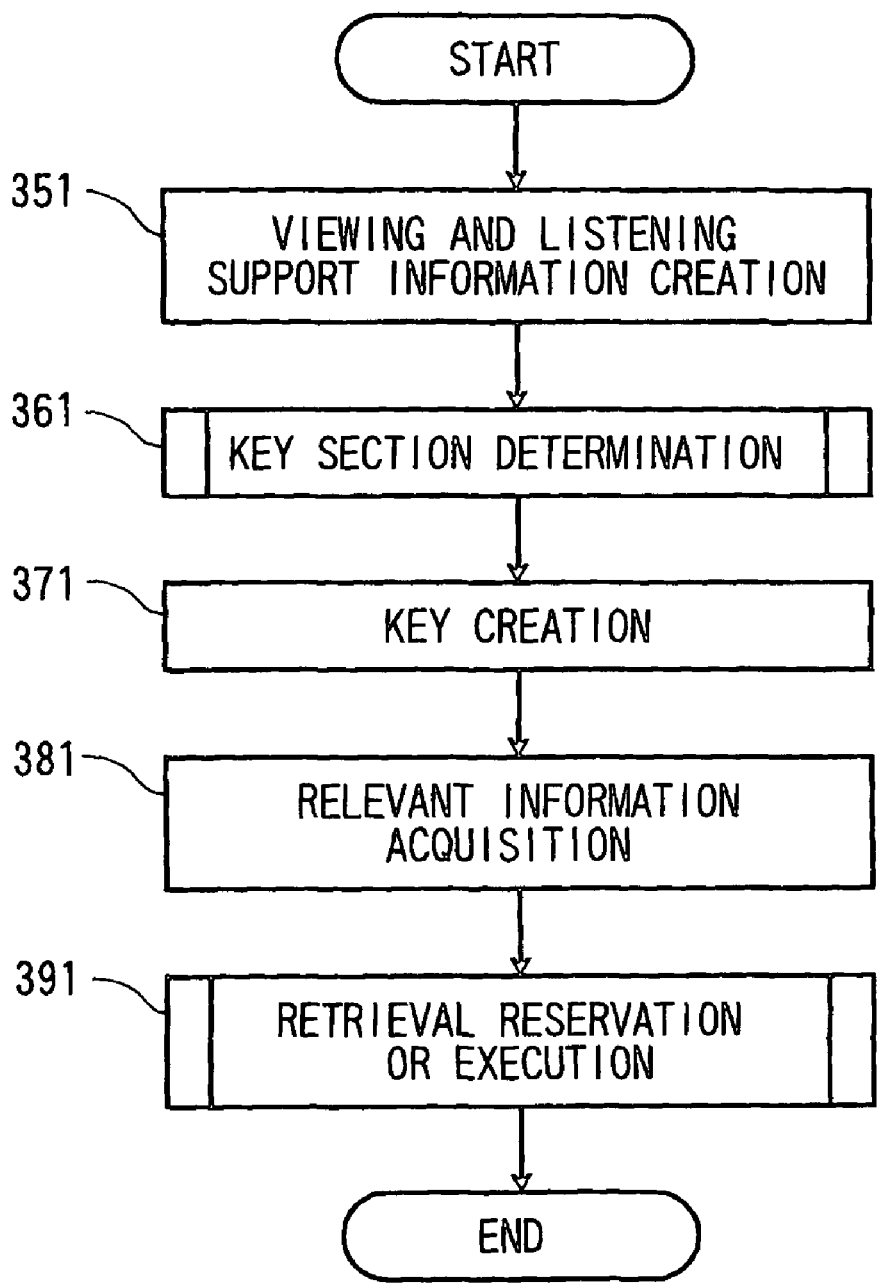
FIG. 47 is a flowchart showing a processing in another structure of the fourteenth embodiment.

FIG. 47 is a flowchart showing a processing in another structure of this embodiment.

In the first support data creation unit 65, viewing and listening support information is created [viewing and listening support information creation] (step S351).

In the key specification information creation unit 61, a key section is determined [key section determination] (step S361).

In the key creation unit 31, a key is created [key creation] (step S371).

In the key relevant data acquisition unit 55, relevant information is acquired [relevant information acquisition] (step S381).

In the data acquisition control unit 81, retrieval reservation is performed, or in the data acquisition control unit 86 or the like, execution is performed [retrieval reservation or execution] (step S391).

Next, the processing of [retrieval reservation or execution] of step S341 of FIG. 46 and S391 of FIG. 47 will be described with reference to FIGS. 48 to 50.

Figure 48:
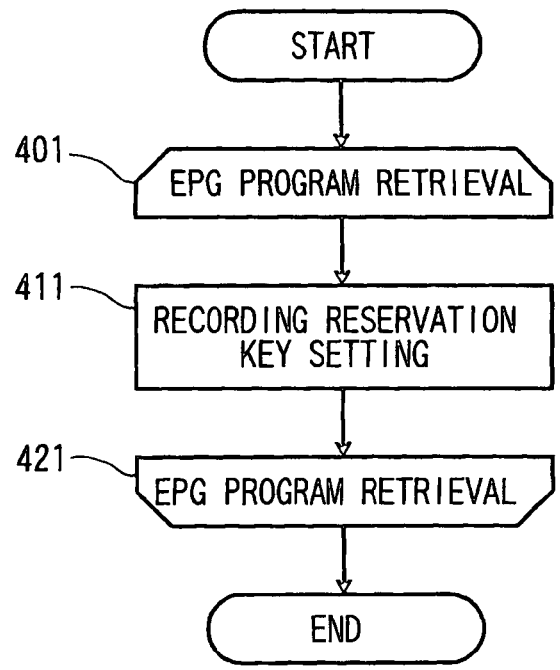
FIG. 48 is a flowchart showing a processing of a data acquisition control unit 81 relating to [retrieval reservation or execution] of step S341 of FIG. 46 and S391 of FIG. 47.

FIG. 48 is a flowchart showing the processing of the data acquisition control unit 81 in this embodiment.

A loop in which from an electronic program guide (EPG), programs satisfying a predetermined condition are retrieved from programs which can be acquired after this, and a processing is performed on each of them [EPG program retrieval] (step S401 to step S421).

With respect to each of them, recording reservation is performed and a key for performing key retrieval at the time of recording is set [recording reservation key setting] (step S411).

Figure 49:
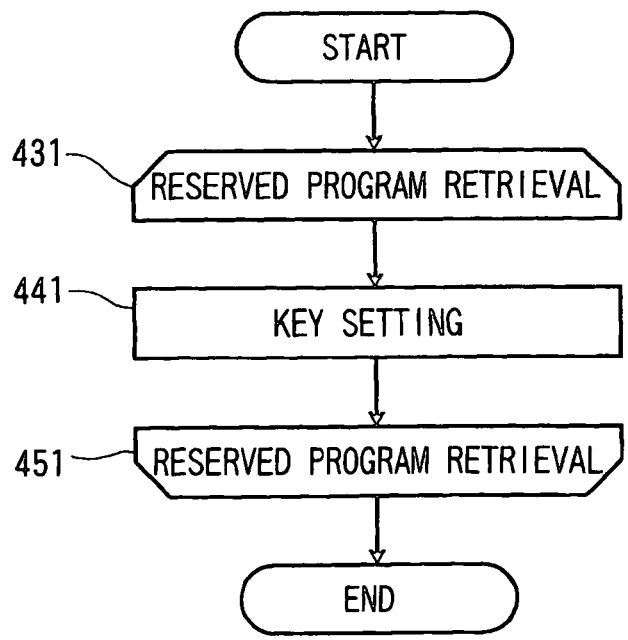
FIG. 49 is a flowchart showing another processing of the data acquisition control unit 81 relating to [retrieval reservation or execution] of step S341 of FIG. 46 and S391 of FIG. 47.

FIG. 49 is a flowchart showing another processing of the data acquisition control unit 81 in this embodiment.

A loop in which from a recording preservation list to manage recording reservation, programs satisfying a predetermined condition are retrieved from recording-reserved programs, and a processing is performed on each of them [reserved program retrieval] (step S431 to step S451).

With respect to each of them, a key for performing key retrieval at the time of recording is correlated with the recording reservation and is set [key setting] (step S441).

Figure 50:
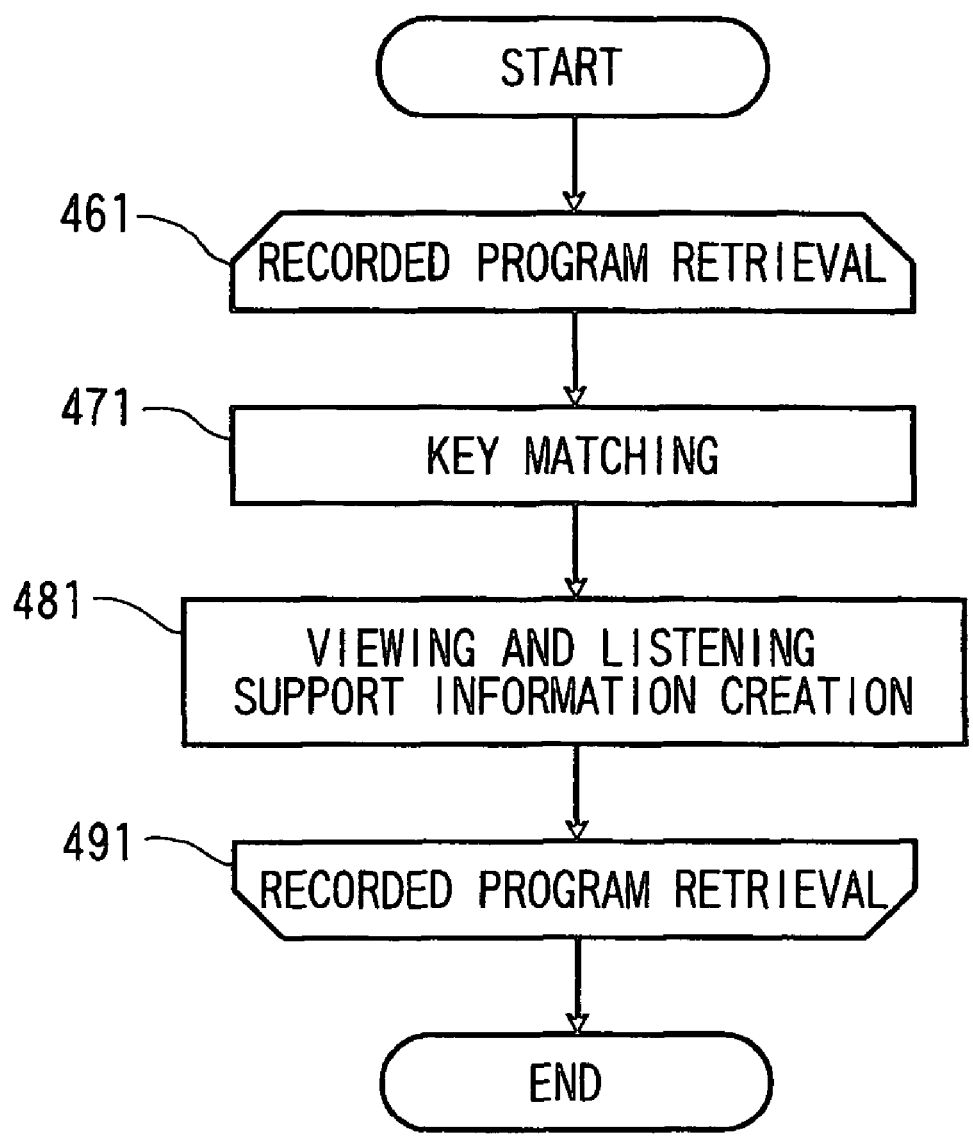
FIG. 50 is a flowchart showing a processing of a data acquisition control unit 86 and the like in another structure of the fourteenth embodiment.

FIG. 50 is a flowchart showing a processing of the data acquisition control unit 86 or the like in another structure of this embodiment.

A loop in which in the data acquisition control unit 86 and the second vide data acquisition unit 46, programs satisfying a predetermined condition are retrieved and acquired from recorded programs in the recording medium 92B, and a processing is performed on each of them [recorded program retrieval] (step S461 to S491)

With respect to each of them, in the key matching unit 30, matching against a retrieval key is executed [key matching] (step S471).

In the matching result recording instruction unit 35, second support data is created based on the key matching result [viewing and listening support information creation] (step S481).

(6) Specific Example of the Processing in the Video/Audio Processing Apparatus

Subsequently, a specific example of the processing in the video/audio processing apparatus of this embodiment will be described with reference to FIG. 51.

FIG. 51 is a view for explaining an example in a case where a chapter (chapter division and chapter name setting) is treated as support data. First content (program 1-1) and second content (program 1-2) are 30-minute programs, the left indicates correspondence to the time of the program starting end (time 0:00:00.00), and the right indicates correspondence to the time of the program terminal end (time 0:30:00.00).

(a) An example of first support data input in the first support data input part 66. With respect to the first content, chapter division and chapter name setting are performed as the first support data.

(b1) Example (Chapter Division Point 1) of Key Section Determination in the Key Specification Information Creation Unit 61.

[acoustic key with a definite time length before or after a division point] X1 and Y1. Although the definite time may be, for example, several seconds, it may be 8 seconds corresponding to about four measures of music, or 15 seconds corresponding to a unit of a Cm. In case redress is made by partial coincidence or the like at the time of matching, a longer time may be adopted. Besides, consideration is given to the attenuation of sound before separation, the effect of fade-out or the like, and the tendency of the length of a silence portion, and the like, time lengths before and after a division point may be made different from each other, for example, X1 before the chapter division point is 10 seconds, and Y1 after that is 5 seconds. In any case, since the chapter division point exists at the terminal end of X1 and the starting end of Y1, it is managed as key relevant information of each of them.

In the input of the support data, as in the case where a section is specified and a chapter name is inputted, in the case where it is possible to discriminate which of the front and the back of a boundary is watched, only the key (Y1) of the watched side may be used. Besides, acoustic features before and after are analyzed, and for example, in the case where speech exists before a silence portion in the vicinity of the chapter division point, and music exists after that, only the music side (Y1) may be used.

[acoustic key of near music portion] Z1. A music portion (having a definite time or more) nearest (within a range of several seconds) to the chapter division point is retrieved, and the definite time from the music portion boundary is made a key. For example, a section of four seconds from a point two seconds after the chapter division point is made the key. In this case, since the chapter division point is located two seconds before the starting end of Z1, it is managed as key relevant information.

Here, further, the mutual information of relevant keys can also be managed as the key relevant information. For example, since there are X1, Y1 and Z1 relevant to the same chapter division point, information to discriminate between the respective keys, or information to simply indicate that there are three keys are managed.

(b2) Example (Chapter Division Point 2) of Key Section Determination in the Key Specification Information Creation Unit 61.

[acoustic key having definite time length before or after a division point] X2 and Y2. Incidentally, keys may be selected based on the sound of a determined section. For example, the magnitude of sound and the inclusion of music are judged, and a key not including a loud sound, a key not including the music, and the like may be deleted from keys.

[acoustic key of an effect sound portion lying astride a division point] Z2. When a portion in the vicinity of the chapter division point is a music (effect sound) portion, the boundaries of the music portion before and after (within a range of several seconds) the chapter division point are retrieved, and the section therebetween is made a key.

Besides, the forward boundary of the chapter division point is retrieved, and a section of a definite time from that may be made the key. For example, a section of two seconds from a point one second before the chapter division point is made the key.

Here, further, the mutual information of relevant keys can be managed as the key relevant information. For example, since there are X1, Y1, Z1, X2, Y2 and Z2 relevant to the same chapter name setting, information to discriminate between the respective keys, or information to merely indicate that there are six keys is managed.

Besides, as another description to FIG. 51, in the structure of FIG. 26, 27 or 29, (a) chapter division based on a video feature is performed in the first support data creation unit 65. Further, chapter name setting may be performed in the first support data input unit 66. With respect to the chapter division based on the video feature, reference is made to (b). By detection of switching (cut) of scenes with image features, the chapter division is made at the boundary between a shot A1 and a shot B1, and between a shot A2 and a shot B2. A judgment may be made inclusive of silence of an acoustic feature.

(c) The matching result recording instruction unit 35. It is assumed that keys Y1, Z1, X2 and Z2 are detected with respect to the second content. Based on the key relevant information of each of them, chapter division and chapter name setting are performed as the second support data. For example, the chapter division is made at a point two seconds before the starting end of the key Z1 or at the starting end of the key Y1, the chapter division is made at a point one second after the starting end of the key Z2 or at the terminal end of the key X2, and the chapter name setting is made therebetween.

In the case where plural keys are detected, selection may be made based on scores of matching, priorities previously assigned to keys, or the like, or determination may be made based on a majority decision. For example, in the case where three keys of the keys X1, Y1 and Z1 relevant to the chapter division point 1 are managed as the key relevant information, the chapter division may be executed when two keys, which become the greater part thereof, are detected. Besides, in the case where six keys of the keys X1, Y1, Z1, X2, Y2 and Z2 relating to the chapter name setting are managed, the chapter name setting may be executed when four keys, which become the greater part thereof, are detected.

As another example of the support data, [play list] instead of [chapter name setting]. One of previously divided chapters is selected, and a new play list is created or is added to an existing play list. A key relevant to the chapter is created, and the play list is managed as the key relevant information. In the matching result recording instruction unit 35, when the key is detected, based on the key relevant information, in addition to the chapter division, addition to the play list is performed. For example, in the case where a chapter of a corner portion in a program is made a play list, a function is realized in which the corner is chapter-divided from every broadcast and is added to the play list.

MODIFIED EXAMPLE

The invention is not limited to the respective embodiments, and can be variously modified within the scope not departing from the gist.

For example, in the respective embodiments, although the metadata is used as the support data, another data format may be used as long as the information can support reproduction, editing and retrieval.

INDUSTRIAL APPLICABILITY

The invention is applied to, for example, a HDD (hard disk) recorder, a DVD recorder, a personal computer, and a music reproducing apparatus having a built-in HDD.

What is claimed is:

1. An information processing apparatus for creating support data to support a user so that when the user reproduces, edits, or retrieves use object data including video and audio data or only audio data, the user can perform reproduction, editing, or retrieval in a desired operation, the information processing apparatus comprising:
    a key audio data acquisition unit configured to acquire key audio data for creating the support data;
    a key specification information input unit configured to input key specification information for specifying a whole or partial section of the key audio data;
    a key creation unit configured to create audio pattern data as a retrieval key by cutting the whole or partial section of the key audio data based on the key specification information;
    a key data retrieval unit configured to retrieve a marker position or a division position in the key audio data on the basis of the key specification information;
    a key relevant data acquisition unit configured to acquire key relevant data relevant to the key audio data and including operation attribute information relevant to the operation at the reproduction, the editing, and the retrieval, based on the key specification information; and
    a support data creation unit configured to create the support data by matching key data including the audio pattern data and the key relevant data against the user object data,
    wherein the key relevant data acquisition unit creates the operation attribute information to specify an operation at the time of the matching based on a positional relation between the position information of the marker or the division retrieved in the key data retrieval unit and the range specified in the key specification information; and
    the support data creation unit includes
        an audio data acquisition unit configured to acquire only audio data as use object audio data from the use object data;
        a key data management unit configured to add the key relevant data to the audio pattern data and to record them as key data;
        a key matching unit configured to match the use object audio data against the audio pattern data based on a predetermined condition and to output matching result information, which indicates a position to satisfy the predetermined condition in the use object audio data, and to output the operation attribute information associated with the audio pattern data; and
        a matching result recording instruction unit configured to record the outputted matching result information as the support data onto a recording medium in accordance with the output operation attribute information.

2. The information processing apparatus according to claim 1, wherein the key data retrieval unit retrieves a marker range or a division unit coincident with a range specified in the key specification information and acquires it as the information of the marker or the division.

3. The information processing apparatus according to claim 1, wherein the key data retrieval unit retrieves a marker position or a division position coincident with one of a starting end and a terminal end of a range specified in the key specification information, and acquires, as the information of the marker or the division, one of the marker position, a ma range including the marker position, the division position, and a division unit including the division position.

4. The information processing apparatus according to claim 1, wherein the key data retrieval unit retrieves a marker position or a division position close to one of a starting end and a terminal end of a range specified in the key specification information, and acquires, as the information of the marker or the division, one of the marker position, a marker range including the marker position, the division position, and a division unit including the division position.

5. The information processing apparatus according to claim 1,
wherein based on a positional relation between the position information of the marker or division retrieved in the key data retrieval unit and the range specified in the key specification information, the key relevant data acquisition unit creates operation attribute information to regulate a determination method of a recording position on the basis of a section detected in the matching result, and
the matching result recording instruction unit determines a position in the use object data in accordance with the matching result information and the operation attribute information and records the marker or information to divide the use object data as the support data at the determined position.

6. The information processing apparatus according to claim 5, wherein
the key relevant data acquisition unit creates the operation attribute information to regulate a creation method of text information relevant to the matching result, and
the matching result recording instruction unit creates the text information relevant to the matching result information in accordance with the matching result information and the operation attribute information, relates it with the recorded marker or the division portion, and records the created text information as the support data.

7. The information processing apparatus according to claim 6, wherein
the key data includes text information relevant to the key data, and
the matching result recording instruction unit creates the text information relevant to the matching result in accordance with a creation method of the regulated text information and based on the text information relevant to the key data.

8. The information processing apparatus according to claim 6, wherein
the key relevant data acquisition unit acquires text information relevant to the information of the marker or the division retrieved in the key data retrieval unit, and
the matching result recording instruction unit creates text information relevant to the matching result in accordance with a creation method of the regulated text information and based on the text information relevant to the information of the marker or the division, relates it with the recorded marker or the divided portion, and records the created text information as the support data.

9. The information processing apparatus according to claim 1, wherein
the key data includes text information relevant to the key data, and
the matching result recording instruction unit creates text information relevant to the matching result in accordance with a creation method of previously regulated text information and based on the text information relevant to the key data, and records the text information relevant to the matching result as the support data.

10. The information processing apparatus according to claim 9, wherein
the key relevant data acquisition unit acquires title information relevant to the key audio data based on the key specification information, and
the matching result recording instruction unit records, as the support data, title information relevant to all of a series of use object data included in the matching result.

11. The information processing apparatus according to claim 1, wherein the support data is metadata.

12. An information processing apparatus for creating support data to support a user so that when the user reproduces, edits, or retrieves use object data including video and audio data or only audio data, the user can perform reproduction, editing, or retrieval in a desired operation, the information processing apparatus comprising:
a first support data input unit configured to input first support data relating to first use object data;
a key audio data acquisition unit configured to acquire key audio data relevant to the first support data;
a key specification information creation unit configured to create key specification information for selecting a partial section of the key audio data based on the inputted first support data;
a key creation unit configured to create audio pattern data as a retrieval key by cutting the partial section of the key audio data based on the key specification information;
a key data retrieval unit configured to retrieve a marker position in the key audio data or a division position on the basis of the key specification information;
a key relevant data acquisition unit configured to acquire key relevant data relevant to the key audio data and including operation attribute information relevant to the operation at the reproduction, the editing, and the retrieval, based on the key specification information; and
a second support data creation unit configured to create second support data by matching key data including the audio pattern data and the key relevant data against the use object data,
wherein the key relevant data acquisition unit creates the operation attribute information to specify an operation at the time of the matching based on a positional relation between the marker or division position information in the first support data and the range specified in the key specification information; and
the second support data creation unit includes
an audio data acquisition unit configured to acquire only audio data as use object audio data from the use object data;
a key data management unit configured to add the key relevant data to the audio pattern data and to record it as key data;
a key matching unit configured to match the use object audio data against the audio pattern data based on a predetermined condition and to output matching result information, which indicates a position to satisfy the predetermined condition in the use object audio data, and to output the operation attribute information associated with the audio pattern data; and
a matching result recording instruction unit configured to cause the outputted matching result information as the second support data to be recorded on a recording medium based on the output operation attribute information.

13. The information processing apparatus according to claim 12, wherein the first support data input unit comprises:
a first support data creation unit configured to detect a change point of the key audio data and to create the first support data.

14. The information processing apparatus according to claim 12, wherein
the first support data is marker or division information, and
the key relevant data acquisition unit acquires, as the key relevant information, the marker or division information in the first support data.

15. The information processing apparatus according to claim 14, wherein the key specification information creation unit creates, as the key specification information, a range coincident with a marker range or a division unit in the first support data.

16. The information processing apparatus according to claim 14, wherein the key specification information creation unit determines, as a first end point, one of a marker position in the first support data, a division position, a starting end of a marker range, a terminal end of the marker range, a starting end of a division unit, and a terminal end of the division unit,
determines a second end point at one of forward and backward sides of the first end point by a previously specified method, and
creates, as the key specification information, a range between the first end point and the second end point.

17. The information processing apparatus according to claim 14, wherein the key specification information creation unit determines a first end point close to one of a marker position in the first support data, a division position, a starting end of a marker range, a terminal end of the marker range, a starting end of a division unit, and a terminal end of the division unit,
determines a second end point at one of forward and backward sides of the first end point by a previously specified second method, and
creates, as the key specification information, a range between the first end point and the second end point.

18. The information processing apparatus according to claim 14, wherein
the key relevant data acquisition unit creates operation attribute information to regulate, based on a positional relation between the marker or division position information in the first support data and the range specified in the key specification information, a determination method of a recording position relative to a section detected in the matching result information, and
the matching result recording instruction unit determines a position in the use object data in accordance with the matching result information and the operation attribute information and records the marker or information to divide the use object data as the second support data at the determined position.

19. The information processing apparatus according to claim 18, wherein
the key relevant data acquisition unit creates operation attribute information to regulate a creation method of text information relevant to the matching result, and
the matching result recording instruction unit creates the text information relevant to the matching result information in accordance with the matching result information and the operation attribute information, correlates it with the recorded marker or the division portion, and records the created text information as the support data.

20. The information processing apparatus according to claim 19, wherein
the key relevant data acquisition unit acquires text information relevant to the marker or division information in the first support data, and
the matching result recording instruction unit creates the text information relevant to the matching result information in accordance with the regulated creation method of the text information and based on the text information relevant to the marker or division information, correlates it with the recorded marker or the divided portion, and records the created text information as the support data.

21. The information processing apparatus according to claim 12, wherein
the key data includes text information relevant to the key data, and
the matching result recording instruction unit creates text information relevant to the matching result in accordance with a previously regulated creation method of text information and based on text information relevant to the key data, and
records the text information relevant to the matching result as the support data.

22. The information processing apparatus according to claim 21, wherein
the key relevant data acquisition unit acquires title information relevant to the key audio data based on the key specification information, and
the matching result recording instruction unit records, as support data, title information relevant to a series of the whole use object data included in the matching result.

* * * * *